(12) United States Patent
Tomonaga et al.

(10) Patent No.: US 6,963,577 B1
(45) Date of Patent: Nov. 8, 2005

(54) PACKET SWITCH

(75) Inventors: Hiroshi Tomonaga, Kawasaki (JP);
Naoki Matuoka, Kawasaki (JP);
Kenichi Kawarai, Kawasaki (JP);
Tsuguo Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 775 days.

(21) Appl. No.: 09/643,566

(22) Filed: Aug. 22, 2000

(30) Foreign Application Priority Data

Aug. 23, 1999 (JP) .................................. 11-235596

(51) Int. Cl.[7] ............................................ H04L 12/28
(52) U.S. Cl. ............... 370/412; 370/395.7; 370/395.71; 370/428
(58) Field of Search ............................ 370/389, 395.1, 370/395.4, 395.7, 395.71, 395.72, 412, 413, 370/415, 422, 428, 429, 465, 474, 230, 232, 370/378, 381, 386, 390, 292, 394, 395.42, 370/249, 368, 236, 237, 395.43, 399, 235, 370/230.1, 414, 395

(56) References Cited

U.S. PATENT DOCUMENTS

| | | | | |
|---|---|---|---|---|
| 5,406,556 A | * | 4/1995 | Widjaja et al. ............. | 370/381 |
| 5,418,781 A | * | 5/1995 | Kaufman et al. ........... | 370/413 |
| 5,440,549 A | * | 8/1995 | Min et al. .................... | 370/394 |
| 5,517,495 A | * | 5/1996 | Lund et al. .................. | 370/399 |
| 6,026,075 A | * | 2/2000 | Linville et al. ............. | 370/236 |
| 6,128,295 A | * | 10/2000 | Larsson et al. ............. | 370/389 |
| 6,141,346 A | * | 10/2000 | Caldara et al. ............. | 370/390 |
| 6,181,678 B1 | * | 1/2001 | Ha-Duong et al. ......... | 370/235 |
| 6,219,351 B1 | * | 4/2001 | Kilkki ........................ | 370/412 |
| 6,249,520 B1 | * | 6/2001 | Steely et al. ................ | 370/368 |
| 6,262,986 B1 | * | 7/2001 | Oba et al. .................... | 370/399 |
| 6,295,295 B1 | * | 9/2001 | Wicklund ................... | 370/392 |
| 6,345,040 B1 | * | 2/2002 | Stephens et al. ............ | 370/232 |
| 6,430,153 B1 | * | 8/2002 | Hughes et al. ........... | 370/230.1 |
| 6,539,025 B1 | * | 3/2003 | Manning et al. ............ | 370/414 |
| 6,542,502 B1 | * | 4/2003 | Herring et al. ............. | 370/390 |
| 6,590,901 B1 | * | 7/2003 | Jones ......................... | 370/428 |
| 6,606,326 B1 | * | 8/2003 | Herring ...................... | 370/412 |
| 6,611,527 B1 | * | 8/2003 | Moriwaki et al. .......... | 370/412 |
| 2001/0010692 A1 | * | 8/2001 | Sindhu et al. .............. | 370/395 |

FOREIGN PATENT DOCUMENTS

| | | |
|---|---|---|
| JP | 5-216745 | 8/1993 |
| JP | 9-34783 | 2/1997 |

* cited by examiner

Primary Examiner—Phirin Sam
(74) Attorney, Agent, or Firm—Katten Muchin Rosenman LLP

(57) ABSTRACT

A packet switch includes an input buffer memory unit having a logic queue corresponding to an output line, a control module for a first pointer indicating a scheduling start input line, a control module for a second pointer indicating a scheduling start output line of scheduling target outlines, a request management control module for retaining transmission request data about a desired output line, a scheduling processing module for starting a retrieval from within plural pieces of transmission request data from the output line indicated by the second pointer, and selecting an output line that is not ensured by other input lines, a packet buffer memory unit for temporarily storing a plurality of fixed-length packets and sequentially outputting the fixed-length packets, a switch unit for switching the fixed-length packets outputted from the packet buffer memory unit, and an address management unit for segmenting an address of the packet buffer memory unit into fixed-length blocks for a plurality of packets, and managing the address on a block basis. With this construction, the memory address is managed on the block basis, and a memory capacity can be reduced by giving an intra-block individual address per queue when in writing or reading.

33 Claims, 50 Drawing Sheets

FIG.25

```
-- ACQUISITION OF ADDRESS
   IF INI_CNT < MAX            -- ACQUIRED FROM ADDRESS GENERATION COUNTER
      INI_CNT ++
      W_ADR = INI_CNT
   ELSE                        -- ACQUIRED FROM FREE ADDRESS FIFO
      W_ADR = EMP_S_PNT
      EMP_S_PNT = LINK(EMP_S_PNT)
   ENDIF

-- UPDATING OF POINTER LINK
   IF CNT_L(BUF) = 0           -- PROCESSING WHEN CELL BUFFER IS FREE
      S_PNT(BUF) = W_ADR
      E_PNT(BUF) = W_ADR
   ELSE                        -- PROCESSING WHEN CELL BUFFER IS NOT FREE
      LINK(E_PNT(BUF)) = W_ADR
      E_PNT(BUF) = W_ADR
   ENDIF

-- UPDATING OF COUNTER
   CNT_L(BUF) ++
   CNT_S(QOS) ++

-- UPDATING OF BUFFER ADDRESS
   BUF_A(W_ADR) <= W_ADR

-- UPDATING OF BITMAP
   IF CELL(M) = 0              -- CASE OF UNICAST CELL
      BMAP(W_ADR) <= BITMAP(CELL(UC-TAG))
   ELSE                        -- CASE OF MULTICAST CELL
      BMAP(W_ADR) <= CELL(MC-TAG)
   ENDIF
```

```
INI_CNT:        INITIAL ADDRESS GENERATION COUNTER
MAX:            BUFFER LENGTH IN USE
W_ADR:          WRITE ADDRESS
EMP_S_PNT:      FREE ADDRESS FIFO START POINTER
LINK(x):        ADDRESS LINKED TO ADDRESS x
CNT_L(x):       INDIVIDUAL BUFFER QUEUE LENGTH OF BUFFER x
CNT_M(x):       MULTICAST BUFFER QUEUE LENGTH OF QoS CLASS x
CNT_S(x):       COMMON BUFFER QUEUE LENGTH OF QoS CLASS x
S_PNT(x):       START POINTER OF BUFFER x
E_PNT(x):       END POINTER OF BUFFER x
BUF_A(x):       BUFFER ADDRESS OF ADDRESS x
CELL(x):        VALUE OF HEADER x OF INPUT CELL
BMAP(x):        ROUTING BIT (BITMAP) OF ADDRESS x
BITMAP(x):      CONVERT CODE x INTO BITMAP
```

FIG.28

```
-- ACQUISITION OF ADDRESS
  IF MC_TOP_E = 0              -- CASE OF MULSTICAST FIRST CELL
  -- UPDATING OF MC RELATED REGISTER
    MC_TOP = S_PNT(MC_QOS)
    MC_TOP_E = 1
    MC_ADD = MC_TOP
    MC_BMAP = BMAP(MC_TOP)
  -- UPDATING OF POINTER
    S_PNT(MC_QOS) = LINK(MC_TOP)
  -- UPDATING OF COUNTER
    CNT_M(MC_QOS)
  ELSE                          -- CASE OF MULTICAST SECOND CELL ONWARD
    IF INI_CNT < MAX            -- ACQUIRED FROM ADDRESS GENERATION COUNTER
      INI_CNT ++
      MC_ADD = INI_CNT
    ELSE                        -- ACQUIRED FROM FREE ADDRESS FIFO
      IF ADR_VAL = 1            -- WHEN FREE ADDRESS FIFO IS NOT FREE
        MC_ADD = EMP_S_PNT
        EMP_S_PNT = LINK(EMP_S_PNT)
      ELSE                      -- WHEN FREE ADDRESS FIFO IS FREE
        STOP MC OPERATION
      ENDIF
  -- UPDATING OF COUNTER
    CNT_S(MC_QOS) ++
  ENDIF
```

MC_TOP_E:   MULTICAST HEAD ADDRESS IS EFFECTIVE
MC_TOP:     MULTICAST HEAD ADDRESS
MC_QOS:     QoS NUMBER OF MULTICAST CELL
MC_ADD:     MULTICAST ADDED ADDRESS
MC_BMAP:    MULTICAST REMAINING ROUTING BIT (BITMAP)
BMAP(x):    ROUTING BIT (BITMAP) OF ADDRESS x
S_PNT(x):   START POINTER OF BUFFER x
E_PNT(x):   END POINTER OF BUFFER x
EMP_S_PNT:  FREE ADDRESS FIFO START POINTER
LINK(x):    ADDRESS LINKED TO ADDRESS x
CNT_M(x):   MULTICAST BUFFER QUEUE LENGTH OF QoS CLASS x
CNT_S(x):   COMMON BUFFER QUEUE LENGTH OF QoS CLASS x
INI_CNT:    INITIAL ADDRESS GENERATION COUNTER
MAX:        BUFFER LENGTH IN USE
ADR_VAL:    FREE ADDRESS IS EFFECTIVE

FIG.29

```
-- UPDATING OF POINTER
   LINE = TOP(MC_BMAP)
   BUF = LINE × 4 + MC_QOS
   IF CNT_L(BUF) = 0            -- PROCESS WHEN CELL BUFFER IS FREE
       S_PNT(BUF) = MC_ADD
       E_PNT(BUF) = MC_ADD
   ELSE                         -- PROCESS WHEN CELL BUFFER IS NOT FREE
       LINK(E_PNT(BUF)) = MC_ADD
       E_PNT(BUF) = MC_ADD
   ENDIF

-- UPDATING OF COUNTER
   CNT_L(BUF) ++

-- RETAINING OF BUFFER ADDRESS
   BUF_A(MC_ADD) = MC_TOP

-- UPDATING OF BITMAP
   MC_BMAP -= BITMAP(LINE)
   IF MC_BMAP = 0               -- JUDGING OF MULTICAST END
       MC_TOP_E = 0
   ENDIF
```

| | |
|---|---|
| TOP(x): | RETURN BIT NUMBER WITH 1 BEING SET FIRST AS VIEWED FROM 0 TH BIT IN BIT STRING x |
| LINE: | DISTRIBUTION OUTGOING ROUTE NUMBER |
| BUF: | DISTRIBUTION BUFFER NUMBER |
| CNT_L(x): | INDIVIDUAL BUFFER QUEUE LENGTH OF QoS CLASS x |
| S_PNT(x): | START POINTER OF BUFFER x |
| E_PNT(x): | END POINTER OF BUFFER x |
| MC_ADD: | MULTICAST ADDED ADDRESS |
| LINK(x): | ADDRESS LINKED TO ADDRESS x |
| BUF_A(x): | BUFFER ADDRESS OF ADDRESS x |
| MC_TOP: | MULTICAST HEAD ADDRESS |
| MC_BMAP: | MULTICAST REMAINING ROUTING BIT (BITMAP) |
| BITMAP(x): | CONVERT CODE x INTO BITMAP |
| MC_TOP_E: | MULTICAST HEAD ADDRESS IS EFFECTIVE |

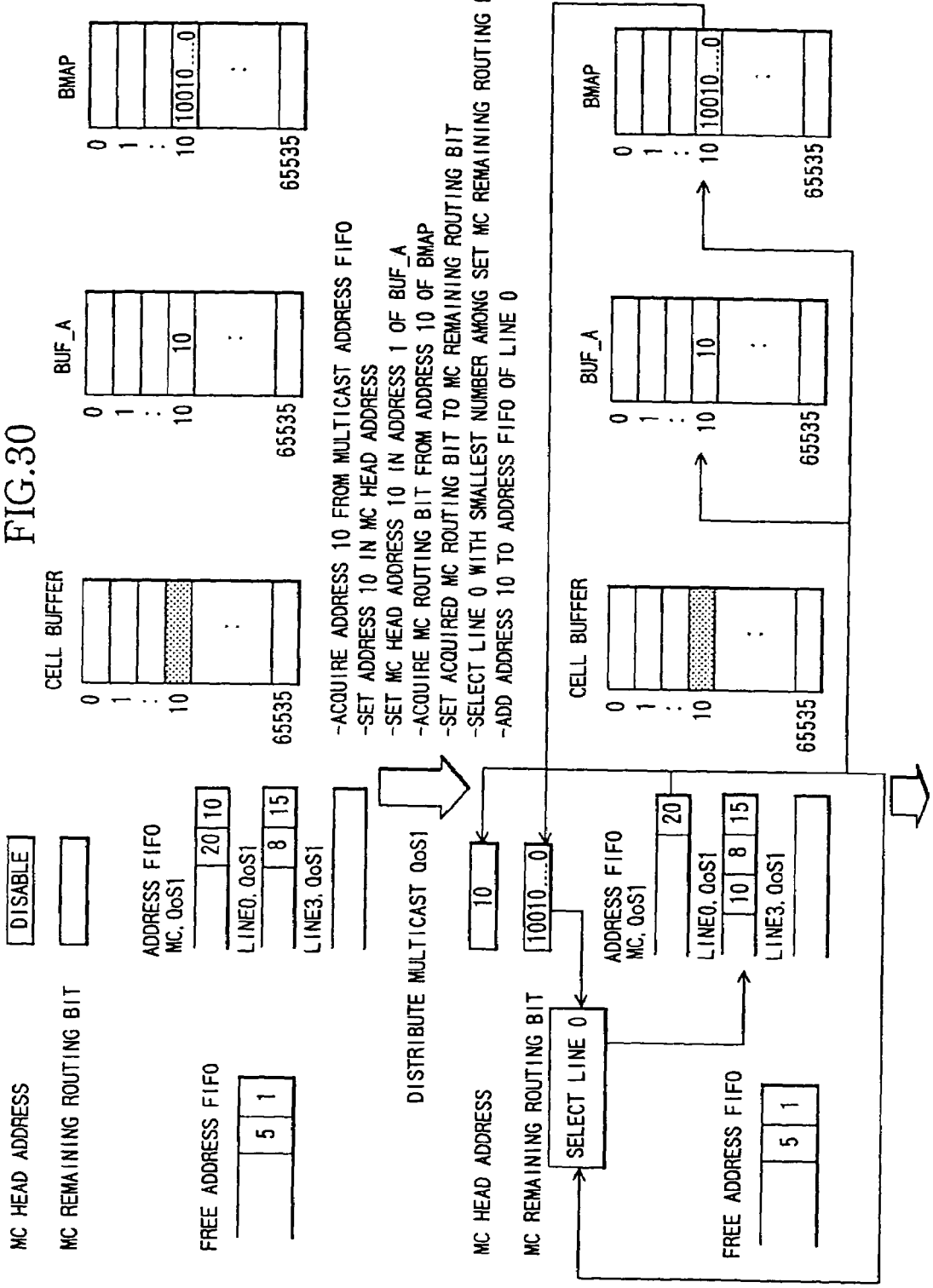

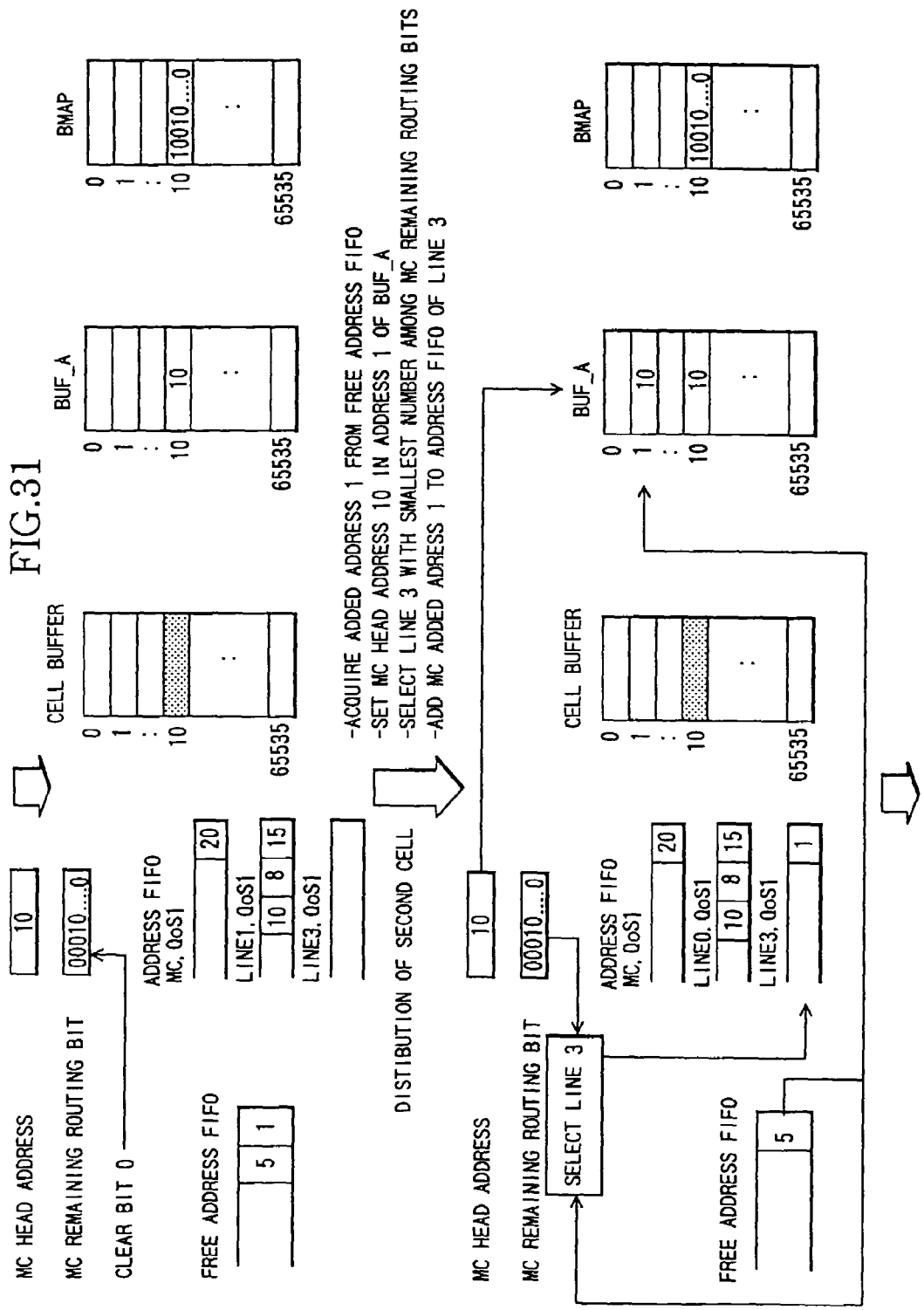

FIG.33

```
-- ACQUISITION OF ADDRESS
    BUF = LINE × 4 + QOS
    R_ADR = S_PNT(BUF)
    BUF_ADR = BUF_A(ADR)

-- ACQUISITION OF BITMAP
    BMAP = BMAP(BUF_ADR)

-- JUDGING OF READ-OUT ADDRESS RETURN
    IF R_ADR < > BUF_ADR
        LINK(EMP_E_PNT) = R_ADR
        EMP_E_PNT = R_ADR

-- UPDATING OF COUNTER
        CNT_S(QOS)

ENDIF

-- UPDATING OF POINTER
    S_PNT(BUF) = LINK(S_PNT(BUF))

-- UPDATING OF BITMAP
    BMAP = BITMAP(LINE)
    IF BMAP = 0              -- JUDGING OF END OF READING

-- RETURN OF BUFFER ADDRESS
        LINK(EMP_E_PNT) = BUF_ADR
        EMP_E_PNT = BUF_ADR

-- UPDATING OF COUNTER
        CNT_S(QOS)

ENDIF

-- UPDATING OF COUNTER
    CNT_L(BUF)
```

R_ADR:       READ-OUT ADDRESS
S_PNT(x):    START POINTER OF BUFFER x
BUF:         READ-OUT BUFFER NUMBER
LINE:        READ-OUT OUTGOING ROUTE NUMBER
QoS:         READ-OUT QoS NUMBER
BUF_A(x):    BUFFER ADDRESS OF ADDRESS x
BUF_ADR:     BUFFER ADDRESS CORRESPONDING TO READ-OUT ADDRESS x
BMAP(x):     ROUTING BIT (BITMAP) OF ADDRESS x
BMAP:        ROUTING BIT (BITMAP) CORRESPONDING TO BUFFER ADDRESS x
LINK(x):     ADDRESS LINKED TO ADDRESS x
EMP_E_PNT:   FREE ADDRESS FIFO END POINTER
CNT_S(x):    COMMON BUFFER QUEUE LENGTH OF QoS CLASS x
CNT_L(x):    INDIVIDUAL BUFFER QUEUE LENGTH OF QoS CLASS x
BITMAP(x):   CONVERT CODE x INTO BITMAP

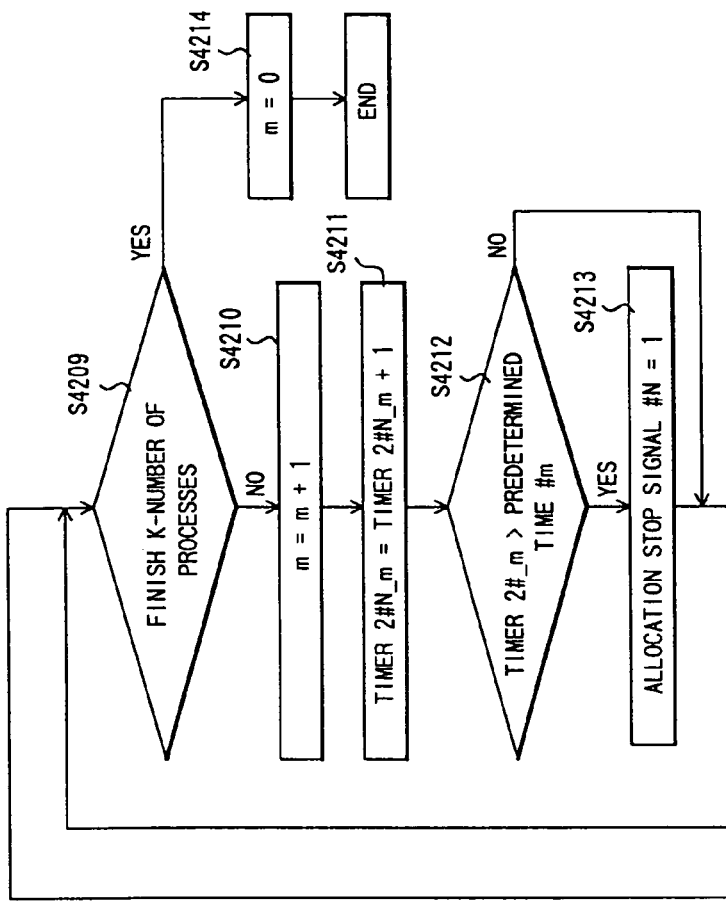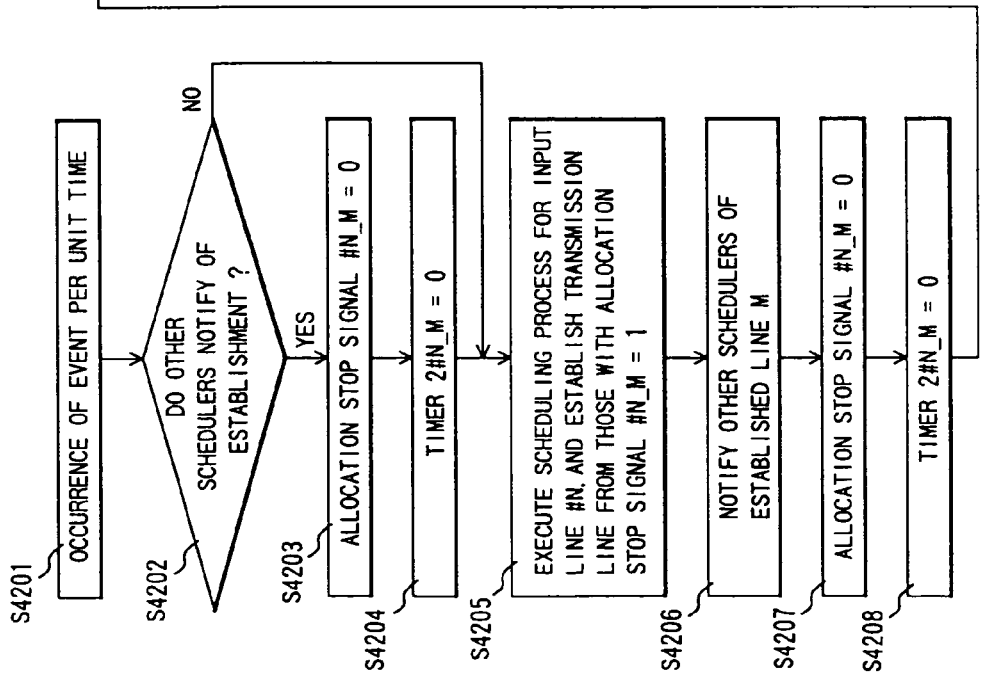
FIG.44

PACKET SWITCH

BACKGROUND OF THE INVENTION

The present invention relates to a packet switch applied to a cross-connect switch, a router, etc. and serving to forward (including transmitting and transferring as far as it is not particularly specified) fixed-length packets (cells), and more particularly to an input buffer type and input/output buffer type switch as one mode of a large-scale packet switch architecture.

With an explosive spread of the Internet and an advent of media dealing with large-capacity high-quality data over the recent years, more expectations have been given to a construction of an infra-structure for a large-scale communications network capable of flexibly dealing with the large-capacity data. Then, much attention is focused on a broadband switch having a switching capacity on the order of several hundreds of Giga-bytes to several Tera-bytes as a key for actualizing the network on that scale.

Of the packet switches, applied to those switches, for forwarding the fixed-length packets, the basic input buffer type switch (see FIG. 1) including a single FIFO type input buffer memory provided for every incoming route (input line (highway): HW), has a problem of HOL (Head Of Line) blocking, and it is known that a throughput is limited to 58.6% at the maximum. What is known as a method of avoiding this HOL blocking is to logically segmenting each input buffer memory of the input buffer unit into queues corresponding to the outgoing routes (output lines), and execute scheduling of a forwarding right in accordance with a predetermined algorithm (see FIG. 2).

Based on this method, an operation speed of the input buffer unit is decreased, and a large-capacity buffer unit using a general-purpose memory can be constructed. Further, a core switch serving as a common switch unit is bufferless and is therefore capable of minimizing the hardware, while a scheduler is capable of reducing the operation speed with a dispersion pipeline architecture (see FIG. 3).

Herein, the input buffer memory is shared between the logic outgoing queues, and hence it is required that an address used per queue be managed. If the input buffer memory comes to a large capacity, however, an address management memory (FIFO) also increases in capacity (see FIG. 4). An address link mode using pointers is, it has hitherto been known, used for reducing the capacity of the address management memory (see FIG. 5).

The general-purpose memory for configuring the input buffer unit may be classified into an SRAM that is comparatively small in capacity but is random-accessible at a high speed, and a DRAM that is large in capacity but requires a burst access in order to access at a high speed. In the case of increasing a capacity of a packet (cell) buffer memory by use of DRAM, a contrivance is that the burst access can be attained within a range of a packet length (see FIG. 6).

Further, a common device takes a dual architecture as a redundant architecture, wherein a cross-connection is provided for every block, and switching is effected through a selector. A reliability of the device is thereby enhanced (see FIG. 7). In the input buffer unit, a reading process is executed at the same speed with all package cards.

Further, as the services have been diversified, the interfaces corresponding to a wide range of speeds from a high speed down to a low speed have been provided. It is desired that the interfaces corresponding to the different line speeds be accommodated in mixture at a high efficiency in the common router and in the cross-connect switch.

According to conventional methods of accommodating those interfaces in mixture, the interfaces are accommodated in mixture in a way of multiplexing a plurality of low-speed lines and increasing port speeds of the router and of the cross-connect switch, or in a way of changing the speed with the buffer memory provided in the line interface. The former method, however, needs a packet multiplexer (MUX) for performing high-speed multiplexing in a temporary manner even when accommodating a comparatively small number of line interfaces. Further, according to the latter method, the low-speed interface available at a relatively low price requires a high-speed buffer memory.

The memory address management needs the address management memories corresponding to the buffer memory capacity even when using the address link mode. By contrast, there is a method of utilizing a part of buffer memory area as an address management memory. According to this method, however, the number of accesses to the packet buffer memory increases, which might become a bottle neck to high-speed accessing (see FIG. 8).

Moreover, in the case of actualizing a multicast function, the same packet buffer memory is used in a plurality of logic outgoing route queues, and therefore the address link is unable to be configured, with the result that the address link mode can not be applied (see FIG. 9).

The packet buffer memories are, if having a scheme to use the memories at a speed as high as possible, required to be set in parallel. A parallelism for processing the packets is, however, restricted by a packet length. For instance, it is 53 bytes in ATM (Asynchronous Transfer Mode). In that case, if processed in all-bit parallel, it follows that all pieces of data are read by one single access. Thus, when increasing the parallelism, the burst access in the case of using the DRAM can not be applied, and this makes the high-speed access impossible (see FIG. 10).

The dual architecture is taken as the redundant architecture of the input buffer unit, and hence both of a hardware quantity and the number of inter-block connections are doubled, resulting in an increase in costs. Herein, it might be considered that an N+1 redundant architecture is adopted for decreasing the costs, however, the common switches (core switches) disposed at the rear stage of the input buffer unit may be conceived as one cluster on the whole. It is therefore difficult to apply this redundant architecture.

Further, when the schedulers are disposed in dispersion in the respective input buffer units, transmission routes for the scheduling data are connected in ring, and hence, if one piece of package card is removed from between the input buffer units, the data transmission is inevitably cut (see FIG. 11).

SUMMARY OF THE INVENTION

Accordingly, it is a first object of the present invention to provide a packet switch capable of reducing a memory capacity by managing a memory address on a block basis and giving an intra-block individual address per queue when in writing or reading.

It is a second object of the present invention to provide a packet switch capable of eliminating a necessity for disposing a packet multiplexer (MUX) needed in the case of accommodating a small number of lines and a high-speed buffer memory in a low-speed interface, and of accommodating in mixture all line interfaces corresponding to a high speed down to a low speed.

It is a third object of the present invention to provide a packet switch capable of configuring a large-capacity packet (cell) buffer memory in a way of actualizing a high-speed access.

It is a fourth object of the present invention to provide a packet switch capable of reducing a required buffer memory capacity in a packet multi/demultiplexer (DMUX) on an output side.

To accomplish the above objects, according to a first aspect of the present invention, a packet switch comprises an input buffer memory unit having a logic queue corresponding to an output line, a control module for a first pointer indicating a scheduling start input line, a control module for a second pointer indicating a scheduling start output line of scheduling target outlines, a request management control module for retaining transmission request data about a desired output line, a scheduling processing module for starting a retrieval from within plural pieces of transmission request data from the output line indicated by the second pointer, and selecting an output line that is not ensured by other input lines, a packet buffer memory unit for temporarily storing a plurality of fixed-length packets and sequentially outputting the fixed-length packets, a common switch unit for switching the fixed-length packets outputted from said packet buffer memory unit, and an address management unit for segmenting an address of said packet buffer memory unit into fixed-length blocks for a plurality of packets, and managing the address on a block basis.

In this construction, the address management unit may manage the addresses by flags indicating which sequence number in the block and which address related to this indicated sequence number the multicast is completed with.

According to a second aspect of the present invention, a packet switch comprises an input buffer memory unit having a logic queue corresponding to an output line, a control module for a first pointer indicating a scheduling start input line, a control module for a second pointer indicating a scheduling start output line of scheduling target outlines, a request management control module for retaining transmission request data about a desired output line, a scheduling processing module for starting a retrieval from within plural pieces of transmission request data from the output line indicated by the second pointer selecting an output line that is not ensured by other input lines, a packet buffer memory unit for temporarily storing a plurality of fixed-length packets and sequentially outputting the fixed-length packets, a common switch unit for switching the fixed-length packets outputted from the packet buffer memory unit, and an address management unit for temporarily writing the packets to a multicast-oriented memory for multicasting to a plurality of output lines, reading the packets corresponding to the number of multicasts, with a scheme to distribute the packets to a desired FIFO memory, retaining the number of multicasts and addresses thereof according to the addresses after being distributed in order to logically actualize the distribution of not the packets but by use of only the addresses, and thus making an address management of the packet buffer memory unit.

In each of these packet switches, the packet buffer memory unit may have a large-capacity memory that is high-speed accessible only when in a burst access and is disposed at a front stage, and a high-speed random accessible memory disposed at a rear stage. Only the rear-stage memory is normally used. When the rear-stage memory is full of packet data, the packet data may be temporarily stored in the front-stage memory, and the packet data may be transferred back to the rear-stage memory when a free area comes out.

Further, the packet buffer memory unit may have a queue memory using a small-capacity high-speed random accessible memory disposed at a front stage, and a large-capacity low-speed access memory disposed in parallel at a rear stage. A writing operation to the rear-stage memory may be effected in parallel from the front-stage memory, and a reading operation from the rear-stage memory may be effected by selecting only a queue memory with no conflict.

The packet buffer memory unit may also have a queue memory using a small-capacity high-speed random accessible memory disposed at a front stage, and a queue memory using a large-capacity memory that is high-speed accessible only when in a burst access and disposed at a rear stage. A writing operation to the rear-stage memory may be effected batchwise just when a plurality of packets are accumulated in the front-stage memory, and the plurality of packets may be read batchwise from the rear-stage memory.

Moreover, the packet buffer memory may execute time-division-multiplexing of the fixed-length packets of the plurality of input lines onto one signal input line in an established manner, and may include memories disposed in parallel corresponding to every input line before being multiplexed, and the writing and reading to and from the respective memories may be executed in parallel.

The common switch unit may be based on a bit-slice architecture and has slice switches of which at least one slice switch is used as a redundant switch, and switching to the redundant slice switch can be thereby done every time the slice switch receives maintenance and comes to a fault.

Further, the packet buffer memory unit may be set dual on the input side and the output side of the common switch unit. Packet data may be distributed to the packet buffer memory unit disposed on the output side along a route preset in the common switch unit, and the switching can be thereby done when in maintenance and in fault.

Schedulers each including the control modules of the first and second pointers, the request management control module and the scheduling processing module, may be disposed in dispersion. A switch unit for selecting scheduling data between adjacent input buffer units among the input buffer units including the input buffer memory units, may be further provided, and the switching can be thereby done when in maintenance and in fault.

According to a third aspect of the present invention, a packet switch comprises an input buffer memory unit having a logic queue corresponding to an output line, a control module for a first pointer indicating a scheduling start input line, a control module for a second pointer indicating a scheduling start output line of scheduling target outlines, a request management control module for retaining transmission request data about a desired output line, a scheduling processing module for starting a retrieval from within plural pieces of transmission request data from the output line indicated by the second pointer, and selecting an output line that is not ensured by other input lines, a packet buffer memory unit for temporarily storing a plurality of fixed-length packets and sequentially outputting the fixed-length packets, a common switch unit for switching the fixed-length packets outputted from the packet buffer memory unit, and an address management unit for performing an address management of the packet buffer memory unit. The packet buffer memory unit has a large-capacity memory that is high-speed accessible only when in a burst access and is disposed at a front stage, and a high-speed random accessible memory disposed at a rear stage. Only the rear-stage memory is normally used. When the rear-stage memory is full of packet data, the packet data are temporarily stored in the front-stage memory, and the packet data are transferred back to the rear-stage memory when a free area comes out.

According to a fourth aspect of the present invention, a packet switch comprises an input buffer memory unit having a logic queue corresponding to an output line, a control module for a first pointer indicating a scheduling start input line, a control module for a second pointer indicating a scheduling start output line of scheduling target outlines, a request management control module for retaining transmission request data about a desired output line, a scheduling processing module for starting a retrieval from within plural pieces of transmission request data from the output line indicated by the second pointer, and selecting an output line that is not ensured by other input lines, a packet buffer memory unit for temporarily storing a plurality of fixed-length packets and sequentially outputting the fixed-length packets, a common switch unit for switching the fixed-length packets outputted from the packet buffer memory unit, and an address management unit for performing an address management of the packet buffer memory unit. The packet buffer memory unit has a queue memory using a small-capacity high-speed random accessible memory disposed at a front stage, and a large-capacity low-speed access memory disposed in parallel at a rear stage. A writing operation to the rear-stage memory is effected in parallel from the front-stage memory, and a reading operation from the rear-stage memory is effected by selecting only a queue memory with no conflict.

According to a fifth aspect of the present invention, a packet switch comprises an input buffer memory unit having a logic queue corresponding to an output line, a control module for a first pointer indicating a scheduling start input line, a control module for a second pointer indicating a scheduling start output line of scheduling target outlines, a request management control module for retaining transmission request data about a desired output line, a scheduling processing module for starting a retrieval from within plural pieces of transmission request data from the output line indicated by the second pointer, and selecting an output line that is not ensured by other input lines, a packet buffer memory unit for temporarily storing a plurality of fixed-length packets and sequentially outputting the fixed-length packets, a common switch unit for switching the fixed-length packets outputted from the packet buffer memory unit, and an address management unit for performing an address management of the packet buffer memory unit. The packet buffer memory unit has a queue memory using a small-capacity high-speed random accessible memory disposed at a front stage, and a queue memory using a large-capacity memory that is high-speed accessible only when in a burst access and disposed at a rear stage. A writing operation to the rear-stage memory is effected batchwise just when a plurality of packets are accumulated in the front-stage memory, and the plurality of packets are read batchwise from the rear-stage memory.

According to a sixth aspect of the present invention, a packet switch comprises an input buffer memory unit having a logic queue corresponding to an output line, a control module for a first pointer indicating a scheduling start input line, a control module for a second pointer indicating a scheduling start output line of scheduling target outlines, a request management control module for retaining transmission request data about a desired output line, a scheduling processing module for starting a retrieval from within plural pieces of transmission request data from the output line indicated by the second pointer, and selecting an output line that is not ensured by other input lines, a packet buffer memory unit for temporarily storing a plurality of fixed-length packets and sequentially outputting the fixed-length packets, a common switch unit for switching the fixed-length packets outputted from the packet buffer memory unit, and an address management unit for performing an address management of the packet buffer memory unit. The packet buffer memory executes time-division-multiplexing of the fixed-length packets of the plurality of input lines onto one signal input line in an established manner, and includes memories disposed in parallel corresponding to every input line before being multiplexed, and the writing and reading to and from the respective memories are executed in parallel.

In each of the construction of the packet switches, the common switch unit may be based on a bit-slice architecture and has slice switches of which at least one slice switch is used as a redundant switch, and switching to the redundant slice switch can be thereby done every time the slice switch receives maintenance and comes to a fault.

Furthermore, the packet buffer memory unit may be set dual on the input side and the output side of the common switch unit. Packet data may be distributed to the packet buffer memory unit disposed on the output side along a route preset in the common switch unit, and the switching can be thereby done when in maintenance and in fault.

Moreover, schedulers each including the control modules of the first and second pointers, the request management control module and the scheduling processing module, may be disposed in dispersion. A switch unit for selecting scheduling data between adjacent input buffer units among the input buffer units including the input buffer memory units, may be further provided and the switching can be thereby done when in maintenance and in fault.

According to a seventh aspect of the present invention, a packet switch comprises a scheduling processing module for executing a scheduling process at a certain fixed speed, a first timer processing module for measuring a packet slot time obtained from a scheduling speed for an input line speed, and a second timer processing module for measuring a packet slot time obtained from a scheduling speed for an output line speed. When the scheduling process for a certain input line is executed, the first timer processing module starts the measurement. The scheduling process for that input line is stopped during a period for which the first timer processing module thereafter measures a predetermined time, and the scheduling corresponding to the input line speed is thus actualized.

In this construction, when an establishment for a certain output line is made, the second timer processing module may start the measurement. The establishment for the same output line may be stopped during a period for which the second timer processing module thereafter measures a predetermined time, and a traffic flow to the same output line may be restrained to an output line speed or lower.

Further, the start of the measurement of each of the first and second timer processing modules may be triggered neither by scheduling nor by the establishment but by a fixed time interval.

Moreover, when the scheduling process is executed in a way of pipeline processing, the scheduling for a relevant input line at pipeline processing N-stages anterior and posterior on the basis of a ratio of a scheduling speed to an input line speed, may be stopped, and the scheduling corresponding to the input line speed is thereby actualized.

The second timer processing module, when executing the scheduling process in a way of pipeline processing, may execute the control independently for every pipeline process on the basis of a pipeline number and an output line number, and the scheduling corresponding to the respective output line speed on the average may be actualized by keeping a predetermined interval in each pipeline process.

According to the present invention, the memory address is managed on the block basis, and the memory capacity can be reduced by giving the intra-block individual address per queue when in writing or reading.

According to the present invention, it is unnecessary to dispose the packet multiplexer (MUX) which has hitherto been required when accommodating the small number of lines and the high-speed buffer memory in the low-speed interface.

Further, according to the present invention, the packet (cell) buffer memory can be constructed in a way of actualizing the high-speed access.

Moreover, according to the present invention, the required buffer memory capacity in the packet multi/demultiplexer (DMUX) on the output side can be decreased.

BRIEF DESCRIPTION OF THE DRAWINGS

These objects and advantages of this invention will become more apparent and more readily appreciated from the following detailed description of the presently preferred exemplary embodiments, taken in conjunction with the accompanying drawings of which:

FIG. 25 is an explanatory diagram showing a writing operation;

FIG. 28 is an explanatory diagram showing the multicasting;

FIG. 29 is an explanatory diagram showing the multicasting;

FIG. 30 is an explanatory diagram showing a multicast distribution;

FIG. 31 is an explanatory diagram showing the multicast distribution;

FIG. 33 is an explanatory diagram showing a reading operation;

FIG. 44 is an explanatory diagram showing the scheduling process corresponding to the output line speed;

DETAILED DESCRIPTION OF THE PREFERRED EMBODIMENTS

Next, embodiments of the present invention will hereinafter be described with reference to the accompanying drawings.

[Address Management Architecture of Packet Switch]

In a packet switch in one embodiment of the present invention, memory addresses are managed on a block basis, and the individual address in the block is given per queue when in a writing or reading process, thereby reducing a memory capacity.

Figure 2:
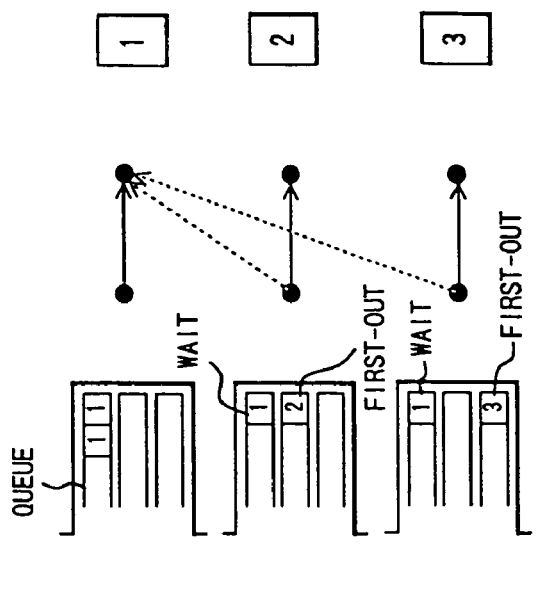
FIG. 2 is an explanatory block diagram showing the input buffer unit of the packet switch.
Figure 1:
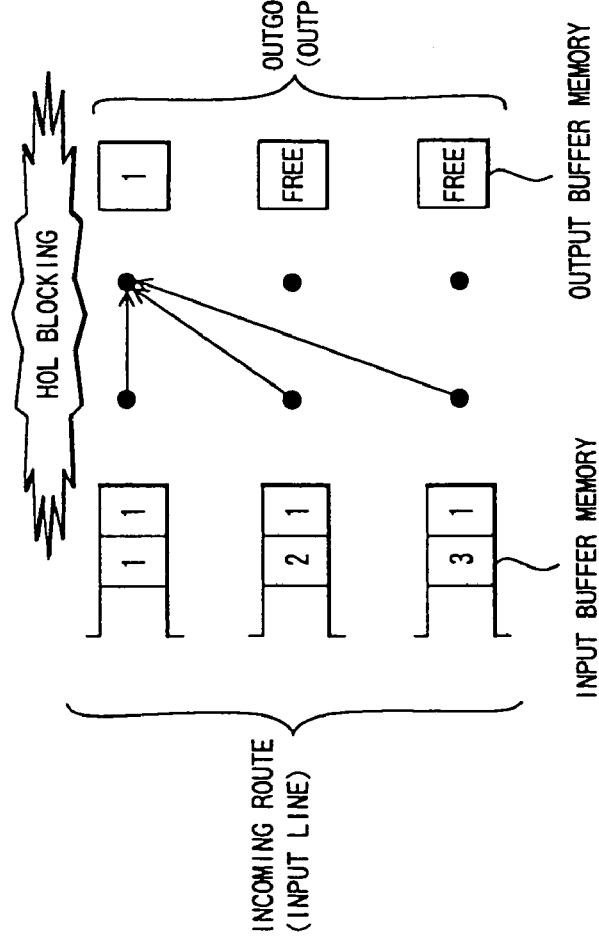
FIG. 1 is an explanatory block diagram showing an input buffer unit of a packet switch.
Figure 3:
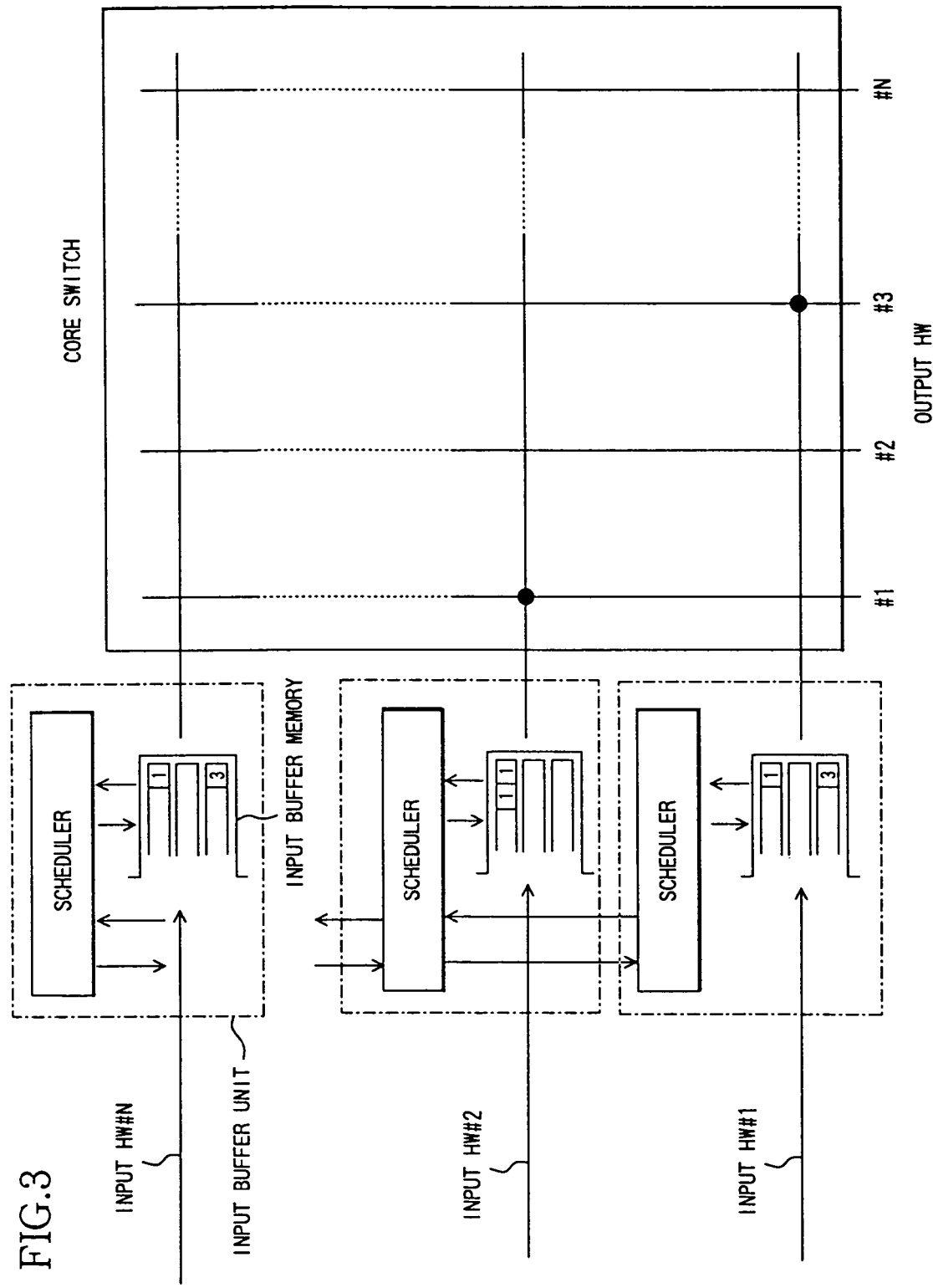
FIG. 3 is an explanatory block diagram showing the input buffer unit of the packet switch.
Figure 4:
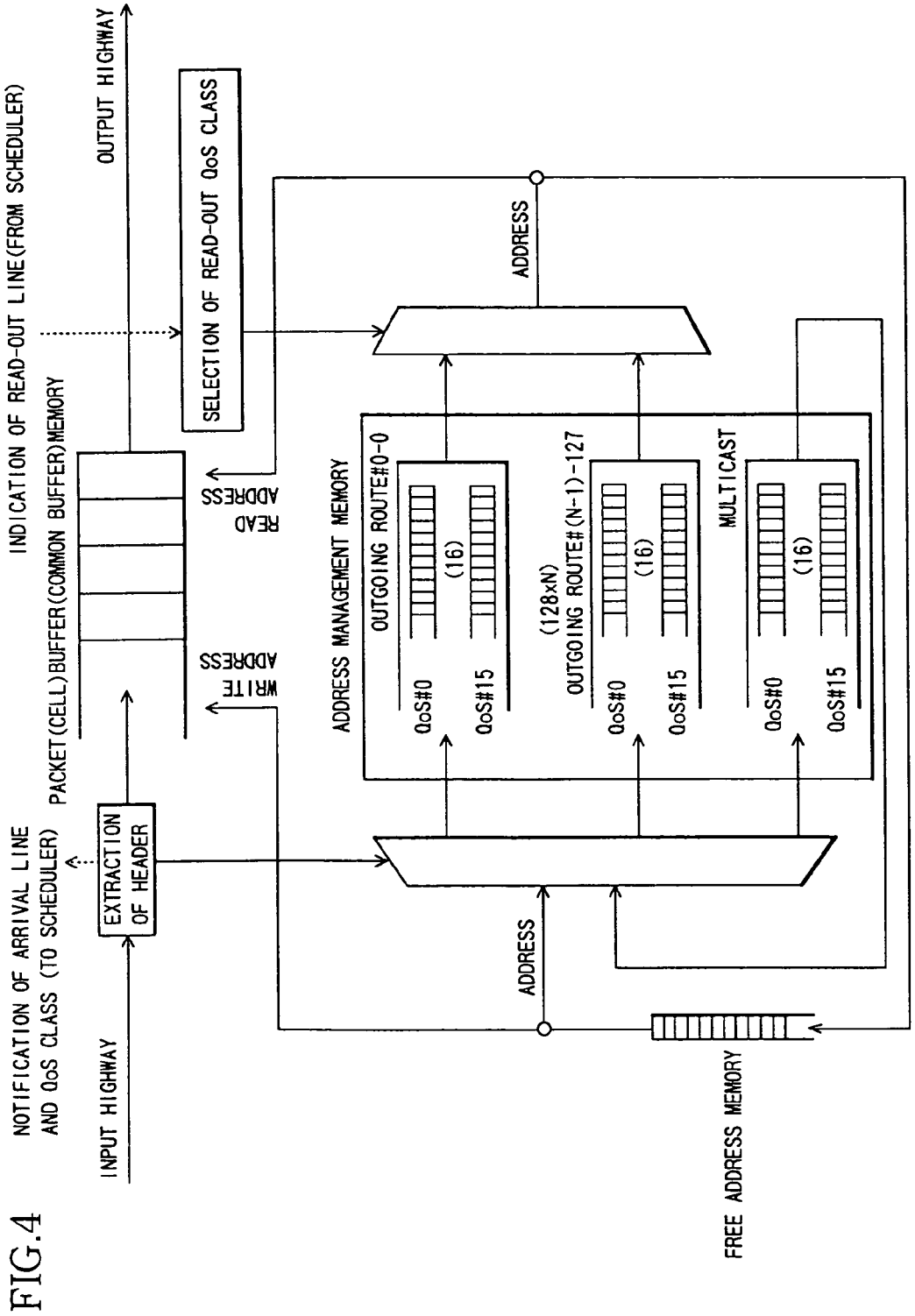
FIG. 4 is an explanatory block diagram showing the input buffer unit of the packet switch.
Figure 5:
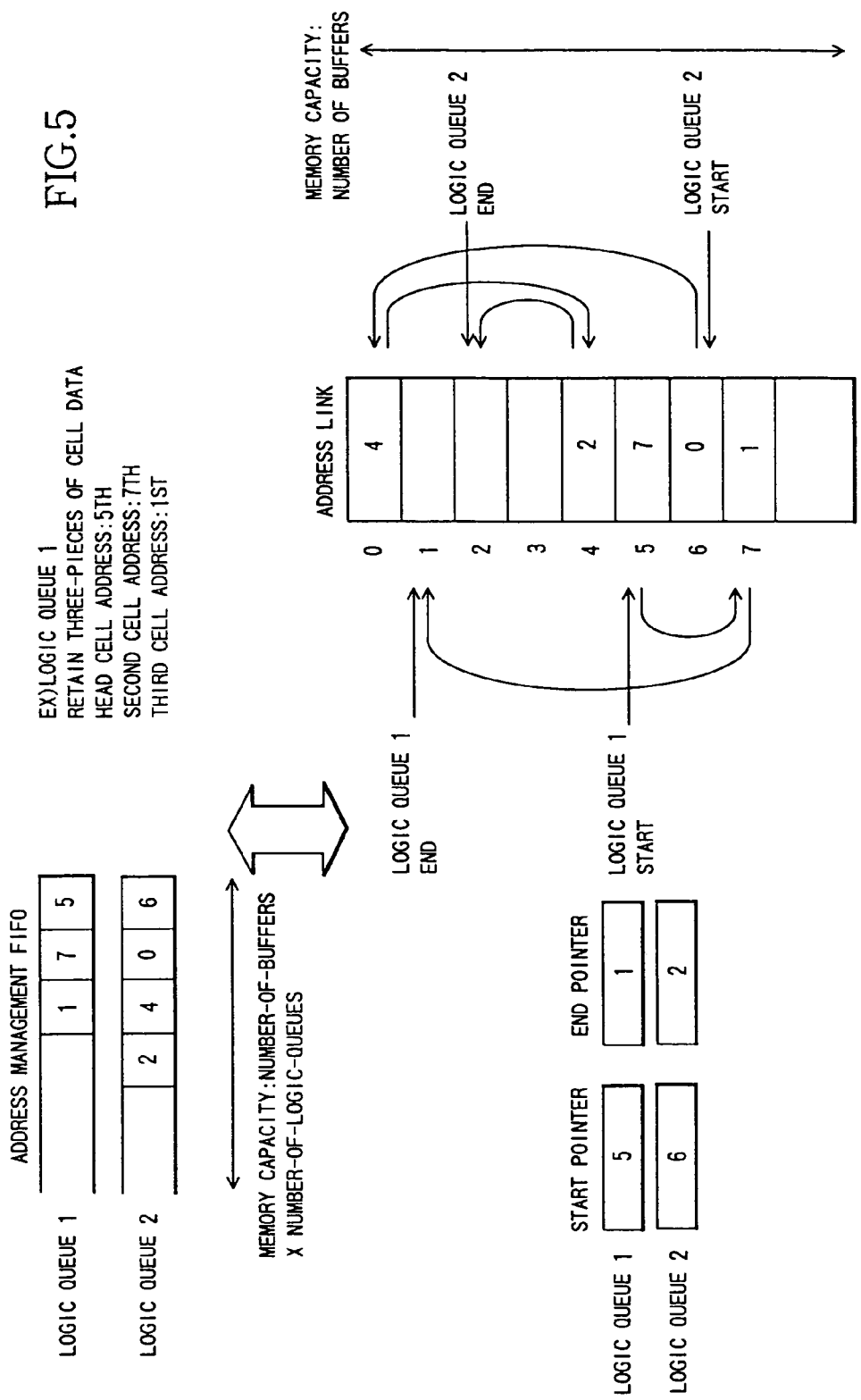
FIG. 5 is an explanatory diagram showing an address management FIFO of the packet switch.
Figure 6:
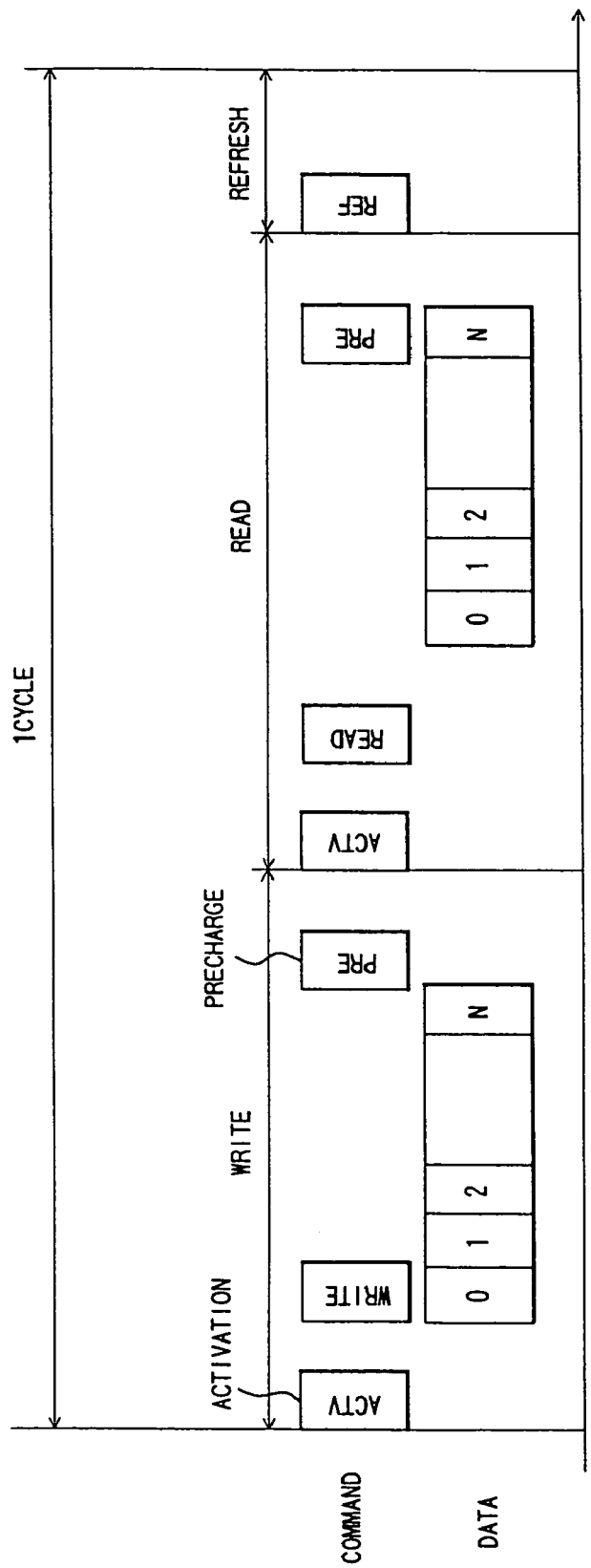
FIG. 6 is an explanatory diagram showing a burst access relative to a DRAM of the packet switch.
Figure 7:
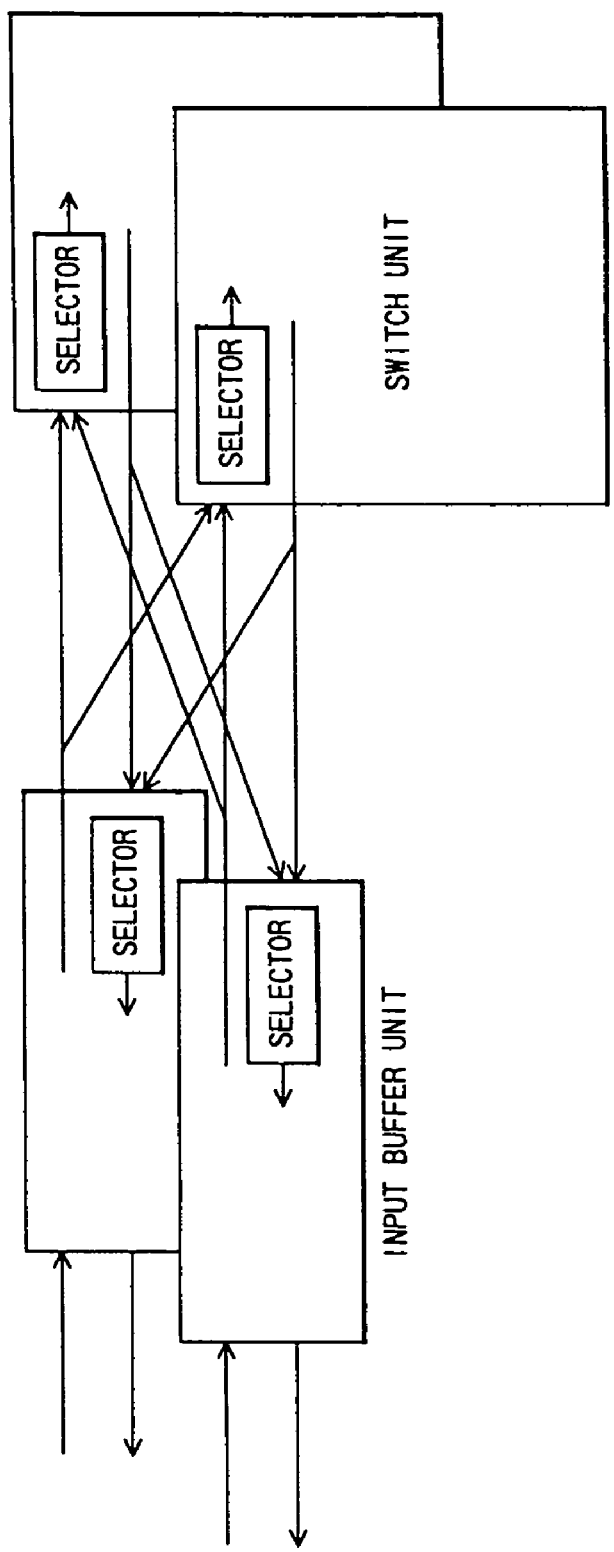
FIG. 7 is an explanatory block diagram showing a dual architecture of an input buffer unit and a switch unit of the packet switch.
Figure 8:
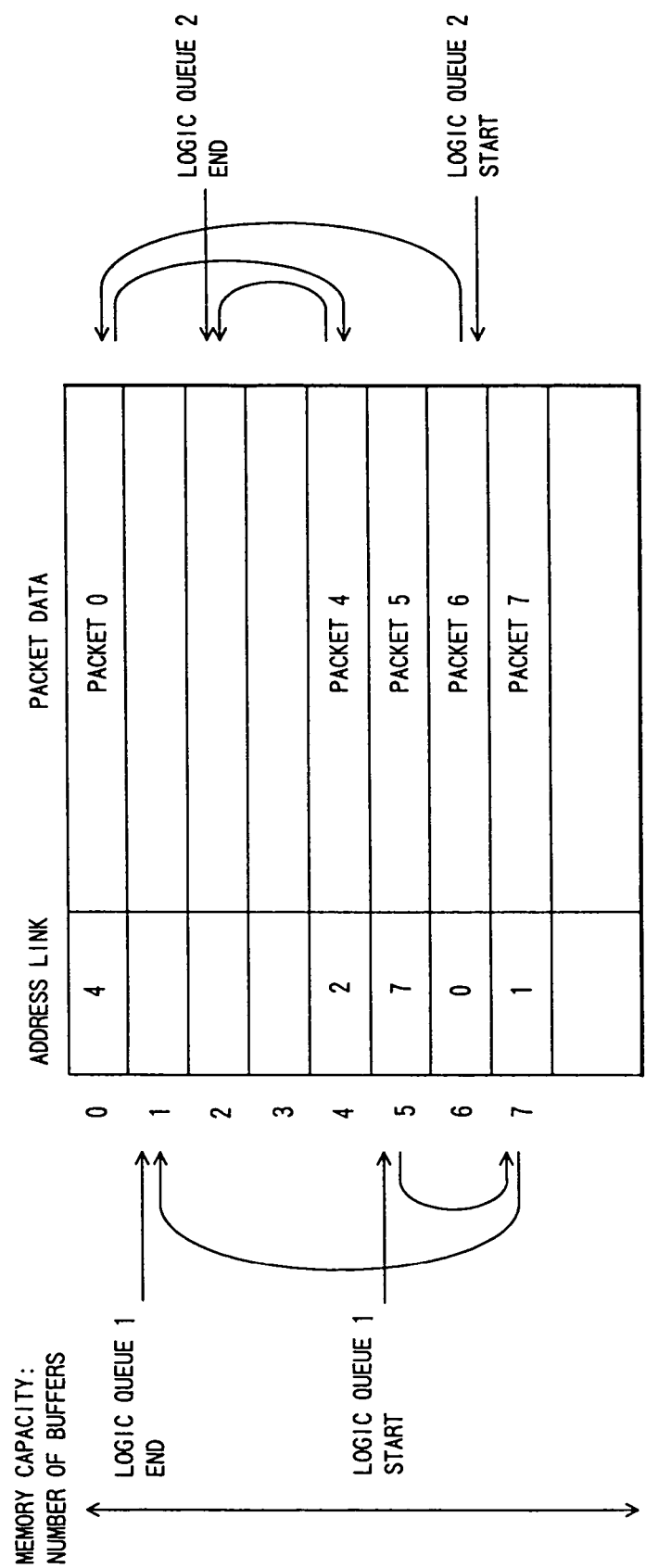
FIG. 8 is an explanatory block diagram showing how a packet buffer memory of the packet switch and an address link are shared.
Figure 9:
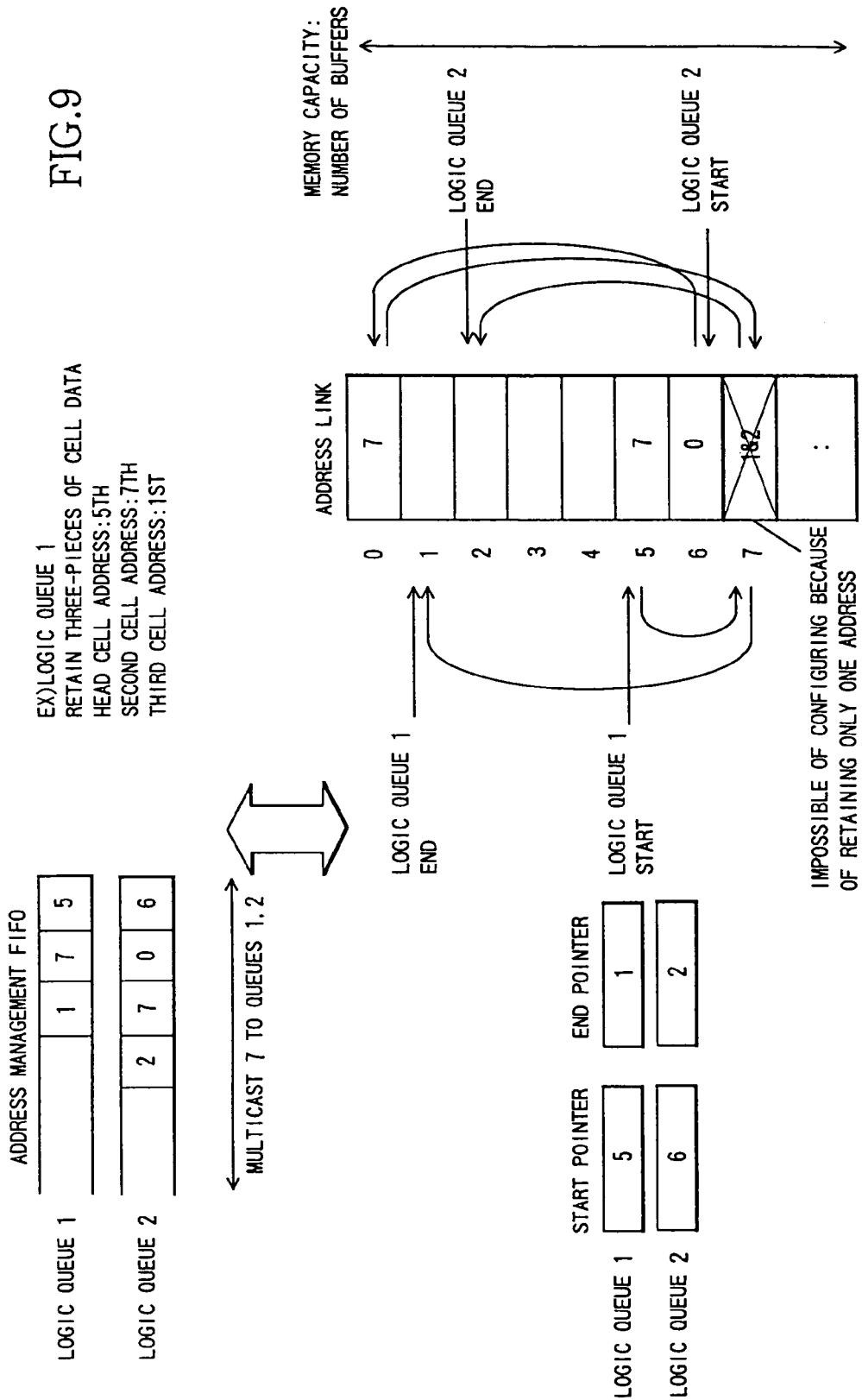
FIG. 9 is an explanatory diagram showing the address management FIFO when multicasting by the packet switch.
Figure 10:
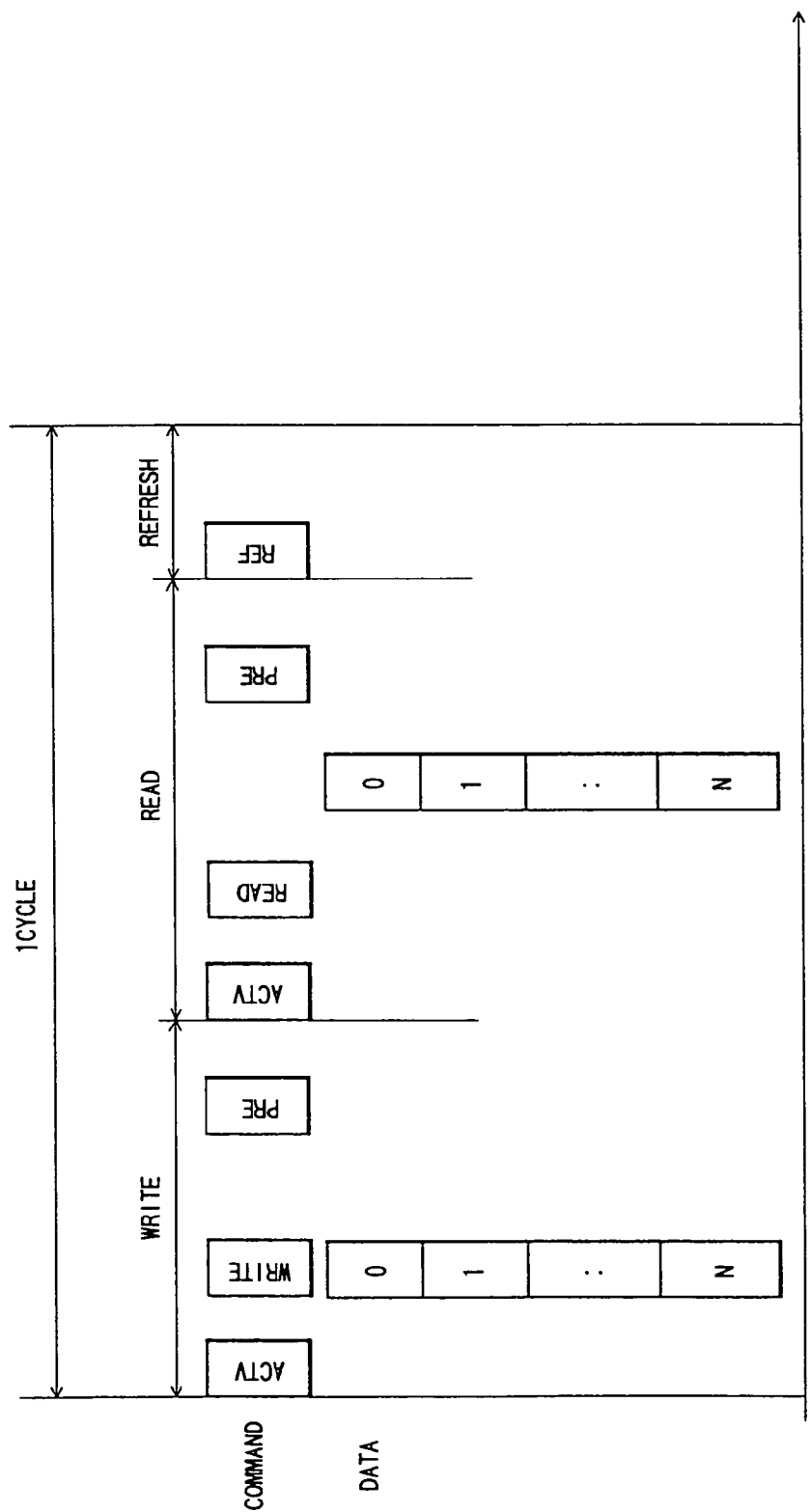
FIG. 10 is an explanatory diagram showing a parallel access relative to the DRAM of the packet switch.
Figure 11:
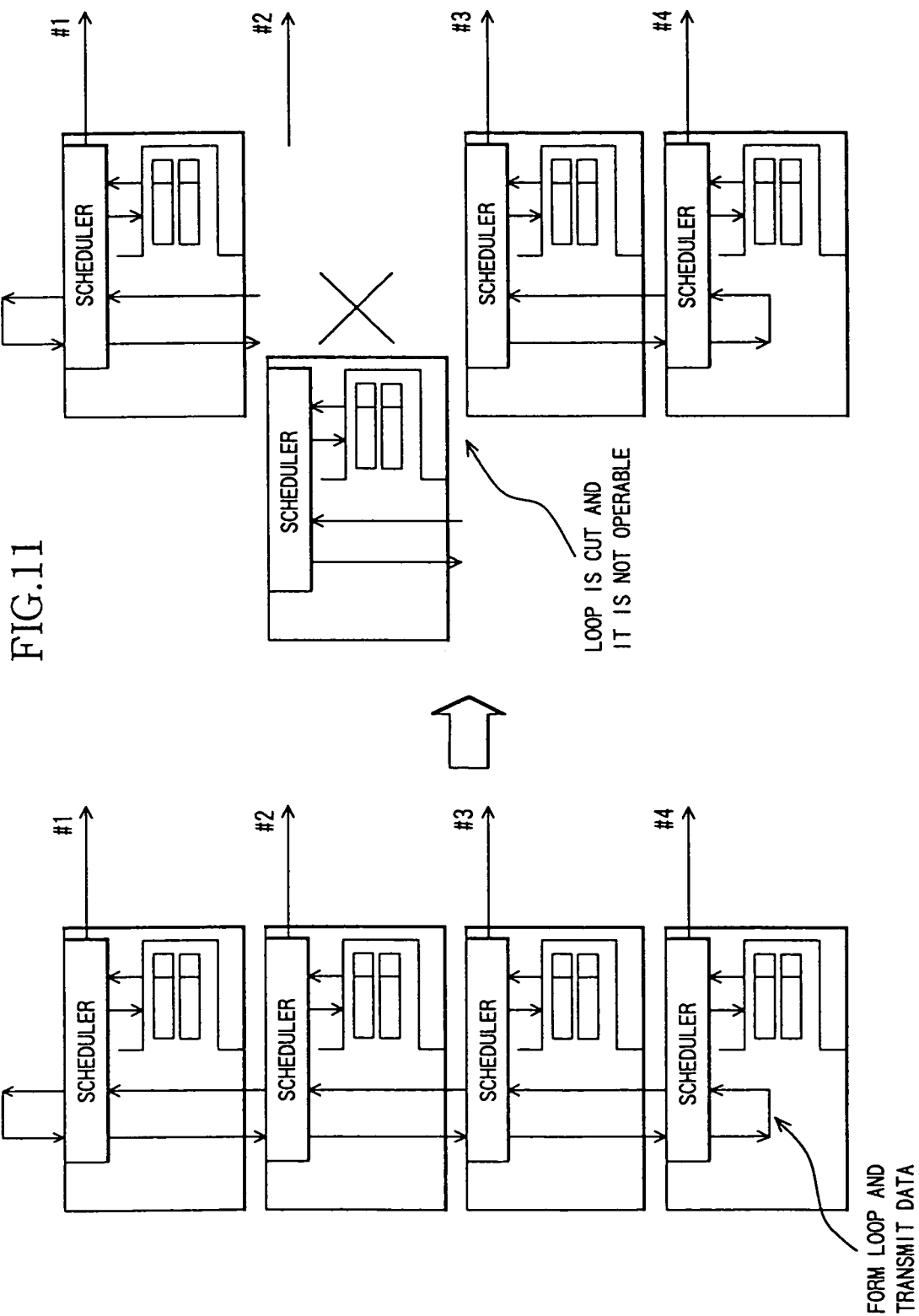
FIG. 11 is an explanatory diagram showing how a loop of scheduling data of packet switch is cut.
Figure 12:
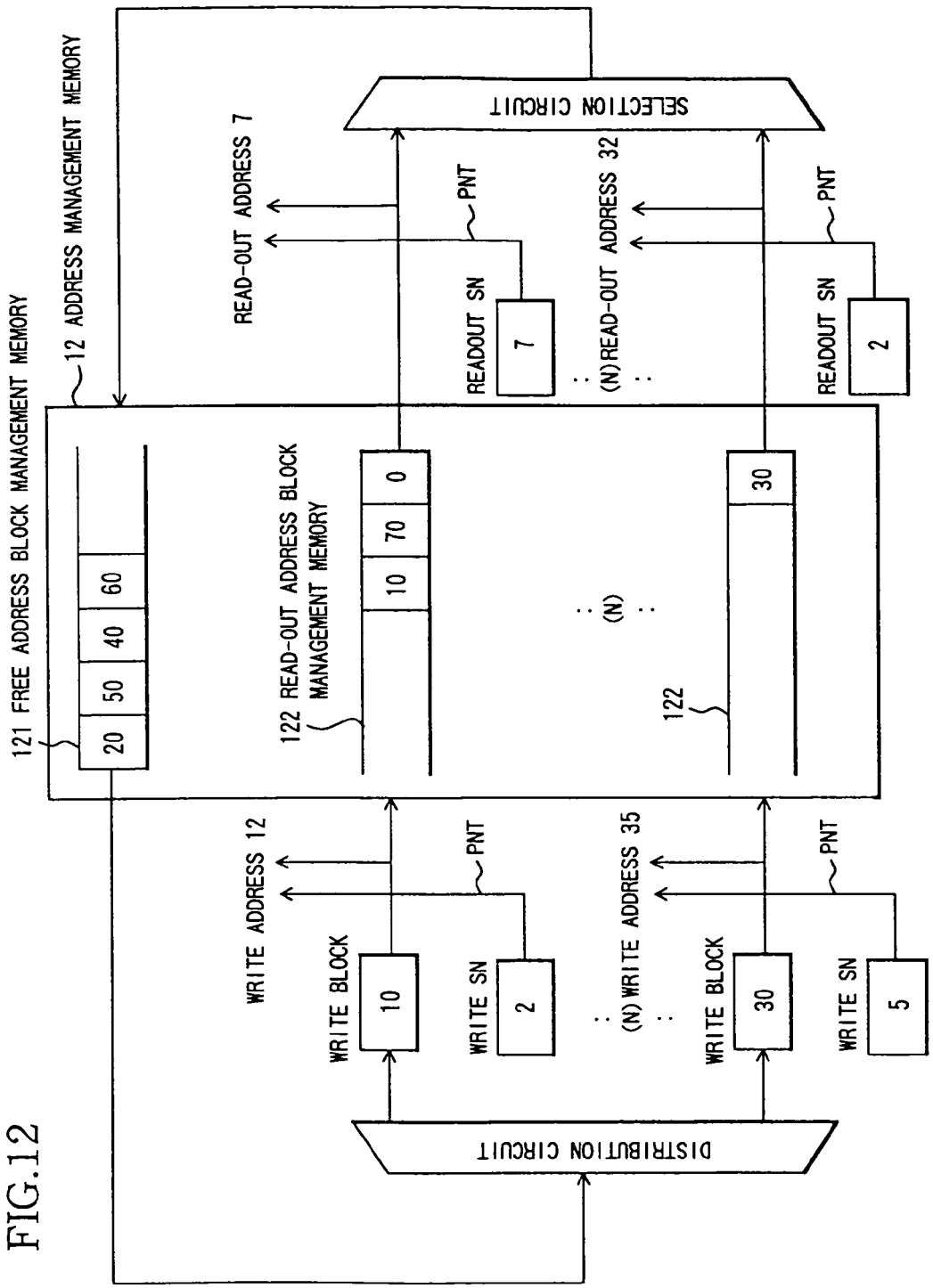
FIG. 12 is an explanatory diagram showing an address block managing method in the packet switch.

FIG. 12 shows a method of managing the addresses on the block basis. Block numbers are managed respectively by a free address block management memory (which may simply be referred to as a free address FIFO) 121 and a logic outgoing route address management (read-out address block management) memory (which may simply be referred to as a read-out address FIFO) 122, which constitute an address management memory 12. Further, sequence number (SN) management pointers PNT for pointing intra-block addresses, are prepared respectively for writing and for reading, corresponding to the lock outgoing route.

When in the writing process, a write address is issued based on a write sequence number (SN) and a write block address of a relevant logic outgoing route queue, and the write SN is incremented. When in the reading process, a read address is issued based on read-out sequence number (SN) and a read-out block address of a relevant logic outgoing route queue, and the read-out SN is incremented.

When in the reading or writing process, if the read-out or write SN makes one round, a next block address is acquired. With this operation, supposing that one block contains, e.g., 10 packets, a capacity of the address management memory 12 can be reduced down to ¹⁄₁₀. Herein, the read-out SN/write SN and the read-out block address/write block address may be prepared corresponding to the number of outgoing routes, and an increase quantity of the memory is small. Besides, when taking an address link mode, it is required that start pointers and end pointers be originally prepared corresponding to the outgoing routes. The number of the start/end pointers is the same as the memory capacity for the sequence numbers SN and the block addresses, and therefore an increase in the memory capacity does not occur.

Figure 13:
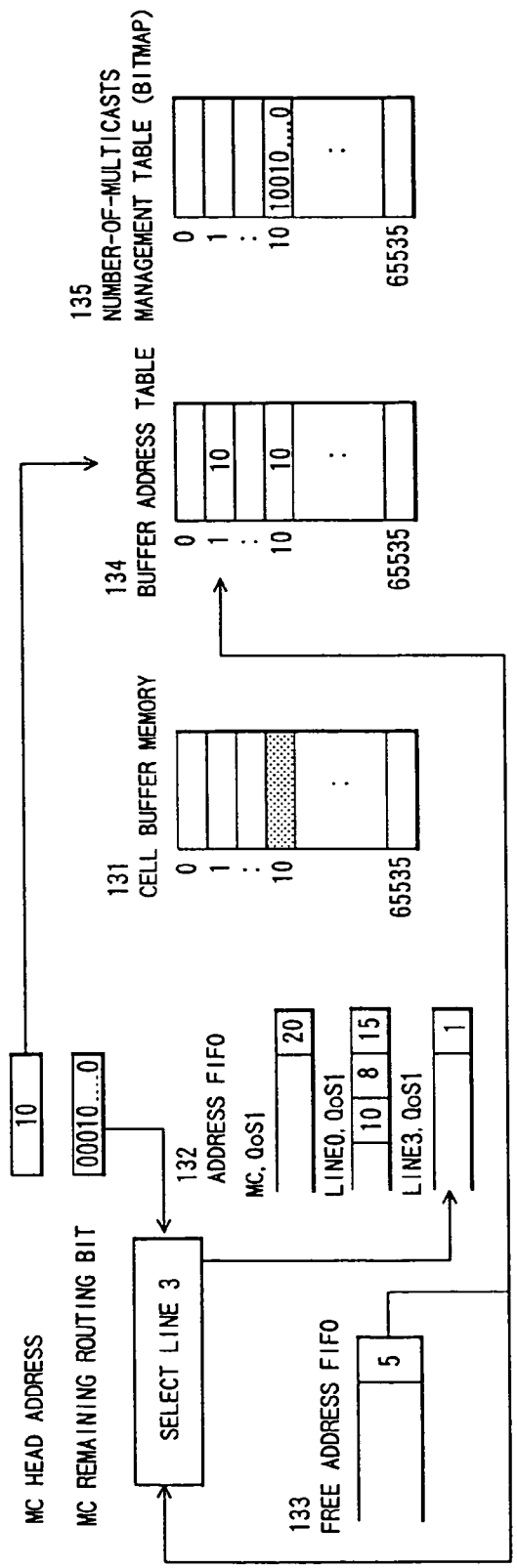
FIG. 13 is an explanatory diagram showing the multicast in the address link.

A multicast (MC) actualizing method in the address link mode will be described referring to FIG. 13. The multicast can be actualized by temporarily storing a multicast queue with multicast packets, and distributing the MC packets to the logic outgoing route queues of the respective outgoing routes. Herein, the packets themselves are not distributed in order to restrain an access speed of a buffer memory (a cell buffer memory 131) and only the addresses are distributed to the respective logic outgoing route address FIFOs 132. The logic outgoing route FIFO 132 is configured based on the address link, and hence the logic outgoing route FIFOs different from each other are incapable of using the same address.

Such being the case, when in the distributing process, the address is newly obtained from a free address FIFO 133, and there is prepared a buffer address table 134 for showing a correspondence of that address to the address here the packet is actually stored. When in the distributing process, this table 134 is set. In the reading process, the packet is read from the address shown in the buffer address table 134, thereby making it possible to actualize the multicast.

Herein, so far as there is not finished a process in which the same buffer address in the buffer address table 134 is read out in multicast to all the specified outgoing routes, there read-out address can not be returned to the free address FIFO 133. Then, a number-of-multicasts management table (bitmap) 135 for managing the number of read-outs is prepared corresponding to the buffer address, and just when the read-out to all the routes is finished, the read-out address is returned. This method is the same with a case where the address link is to applied.

Figure 14:
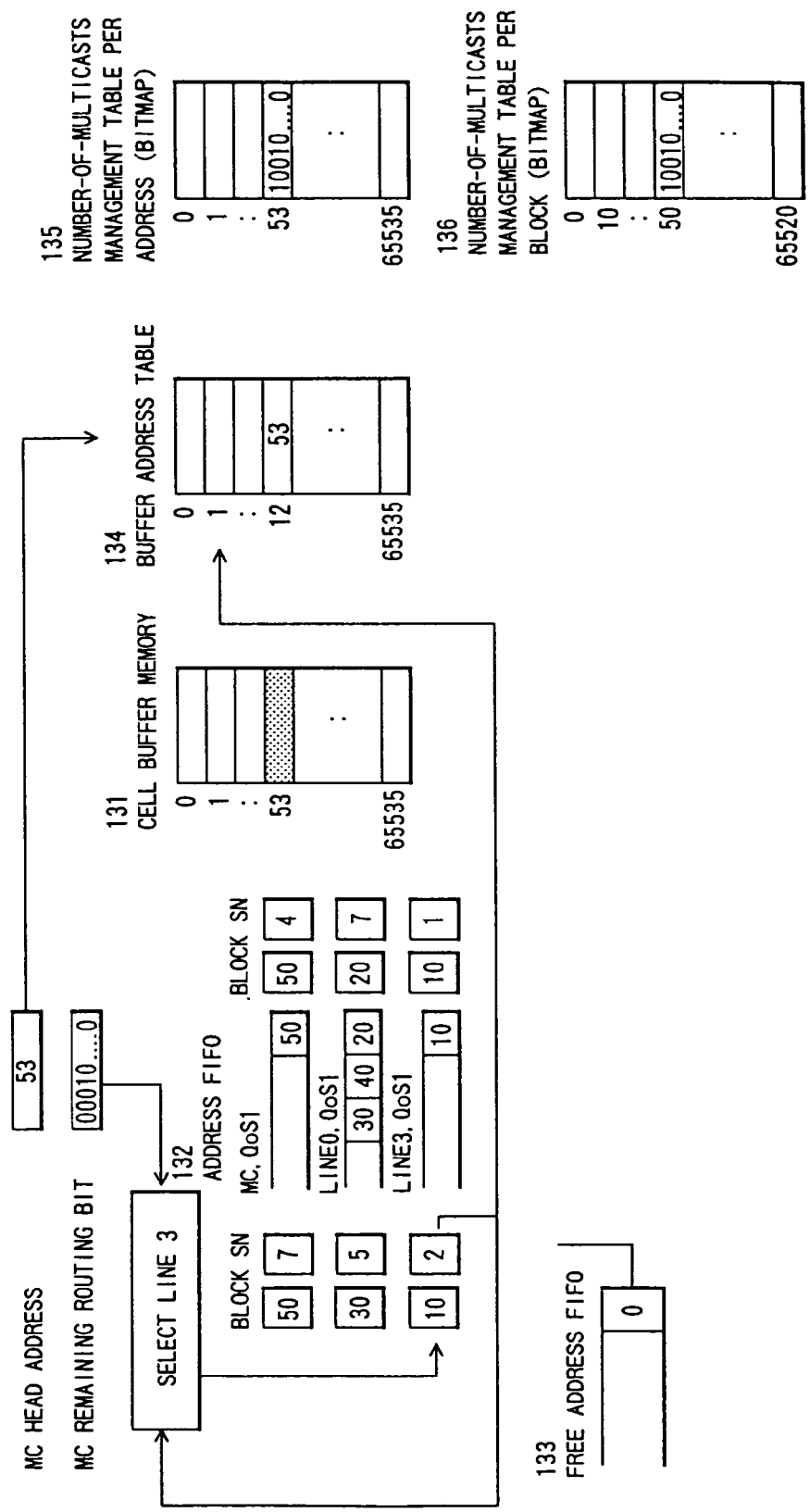
FIG. 14 is an explanatory diagram showing the multicast in the block managing method.

Next, a multicast method in the case of managing the addresses on the block basis, will be explained with reference to FIG. 14. This method is fundamentally the same as the multicast method demonstrated in FIG. 13, however, the addresses are managed on the block basis, and hence the addresses when distributed are obtained from the write block address and the write sequence number SN. Further, the block address can not be returned to the free address FIFO 133 unless the addresses contained in the same block are all multicast. Then, there is prepared a number-of-multicasts management table 136 for managing whether or not the read-out of each SN per block address is finished, and, just when finishing the read-out of all the sequence numbers SN, the block address is returned. The multicast based on the block address management can be actualized.

[Architecture of Packet (Cell) Buffer Memory]

Figure 15:
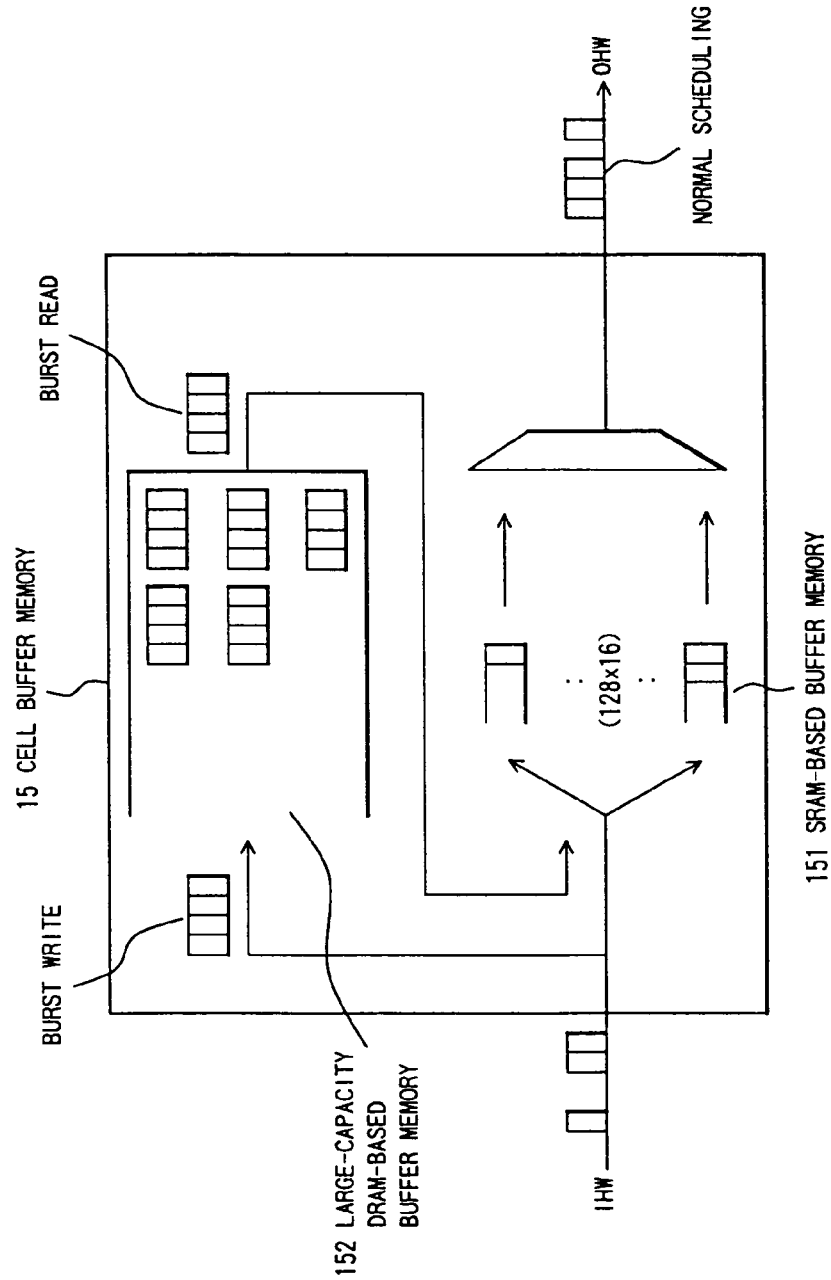
FIG. 15 is a block diagram showing an example of an architecture of a cell buffer memory.

FIG. 15 shows an example where a DRAM having a large capacity is used as a back-up in order to construct a packet (cell) buffer memory. A cell buffer memory 15 involves the use of an input buffer memory 151 normally composed of a small-capacity SRAM, and executes buffering of the cells (packets) forwarded from an input highway IHW. If the SRAM is full of the cell data, an input buffer memory 152 composed of a DRAM is temporarily stored with the cell data from the input highway IHW by a bust access. Just when the SRAM comes to have a free area for a length of burst, the operation is transferred from the DRAM to the SRAM. The large-capacity cell buffer memory 15 can be thereby constructed while actualizing the high-speed accessing.

Figure 16:
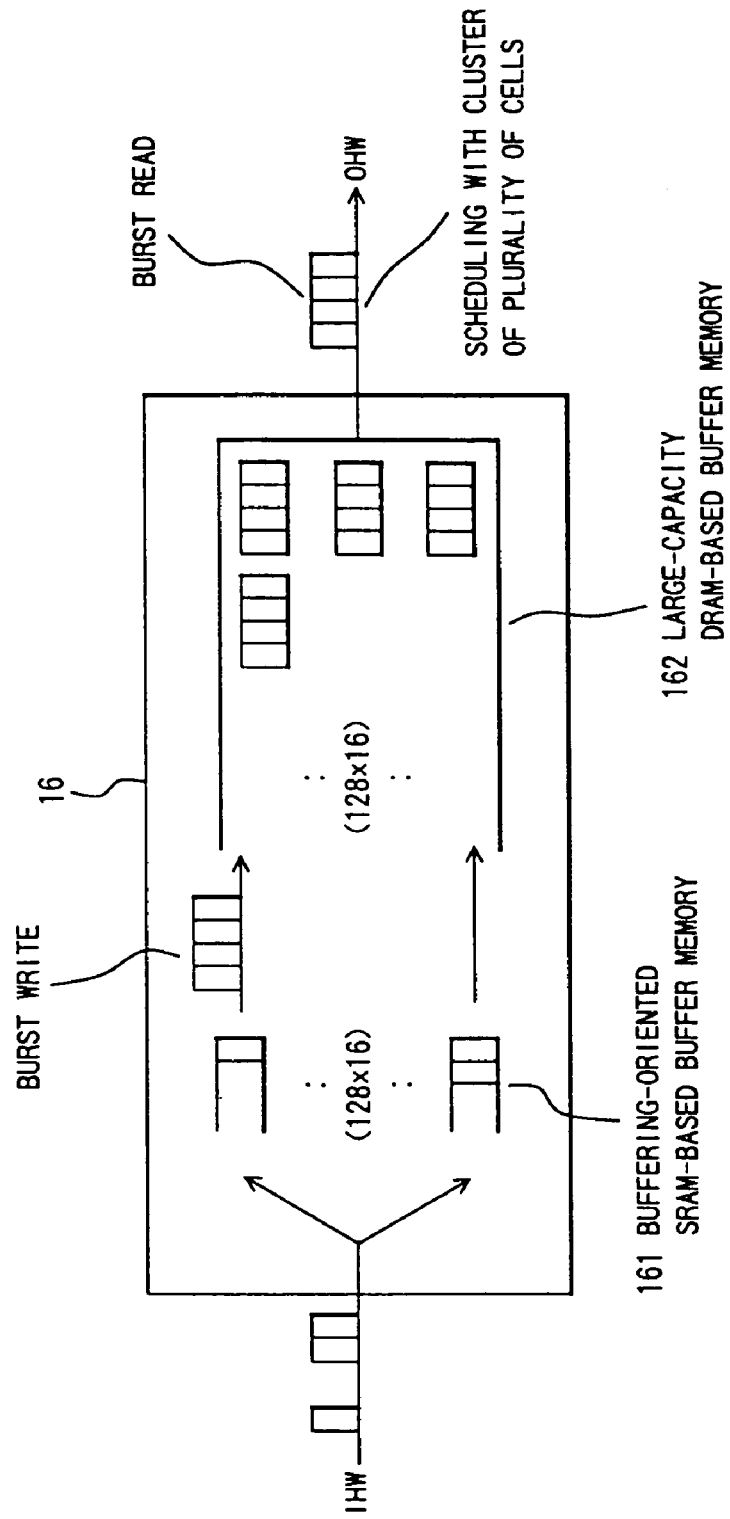
FIG. 16 is a block diagram showing an example of the architecture of the cell buffer memory.

Further, FIG. 16 shows an example of using the input buffer memory constructed of the SRAM for buffering the cells coming from the input highway IHW in order to construct the cell buffer memory. The cells from the input highway IHW are stored per logic outgoing route queue in a buffering-oriented input buffer memory 161 composed of the SRAM. Just when stored with the cells for the number of bursts per queue, the cell data are transferred to the input buffer memory 162 constructed of the large-capacity DRAM. The cell data corresponding to the number of bursts (the plurality of packets (cells)) are read batchwise from the DRAM. With this operation, the large-capacity cell buffer memory 16 can be constructed in a way of actualizing the high-speed accessing.

Herein, in a case of exhibiting a low load, there may be a possibility where it takes a considerable period of time till the cell data corresponding to the number of bursts are accumulated in the anterior SRAM. Measures for obviating this may be a method of providing a timer and writing the cell data to the posterior DRAM before being accumulated if over a predetermined period of time, and a method of setting the anterior SRAM as a scheduling target and reading the cell data accumulated at that point of time.

Figure 17:
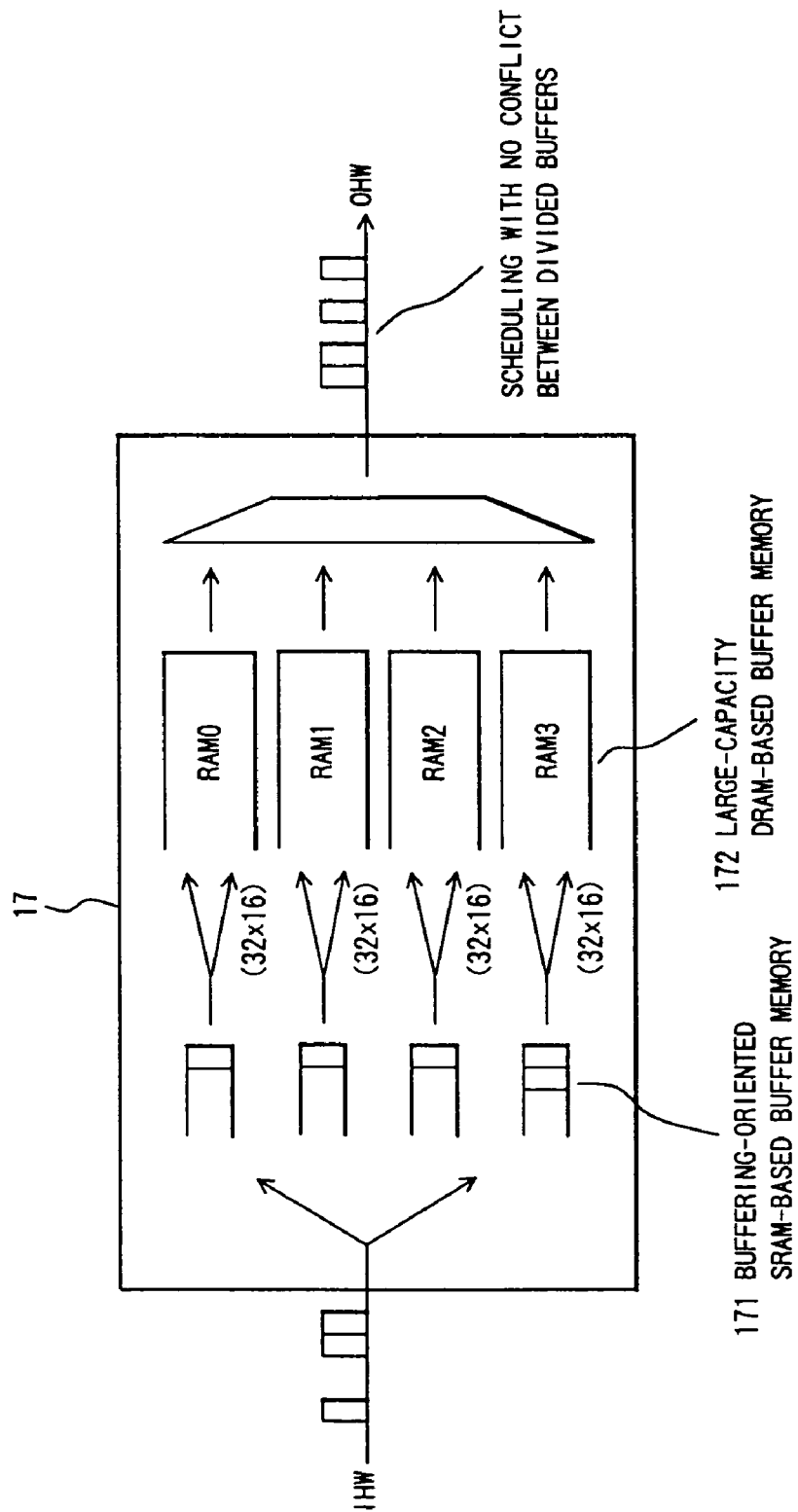
FIG. 17 is a block diagram showing an example of the architecture of the cell buffer memory.

FIG. 17 shows an example where a plurality of DRAMs are disposed in parallel in order to configure the cell buffer memory. The DRAMs to be used are allocated corresponding to the logic outgoing routes. In the case of the outgoing routes corresponding to totally, e.g., 128 lines, the outgoing route corresponding to the lines 0–31 is allocated to a logic outgoing route queue RAM0, the outgoing route corresponding to the lines 0–31 is allocated to a logic outgoing route queue RAM0, the outgoing route corresponding to the lines 32–63 is allocated to a logic outgoing route queue RAM1, the outgoing route corresponding to the lines 64–95 is allocated to a logic outgoing route queue RAM2, and the outgoing route corresponding to the lines 96–127 is allocated to a logic outgoing route queue RAM3.

The SRAMs constituting a buffering-oriented input buffer memory 171 are prepared in parallel in the same allocation mode anterior to the DRAMs constituting an input buffer memory 172. The cells inputted are written to the SRAM corresponding to the logic outgoing route and are transferred one by one to the DRAMs disposed in parallel. The reading from the DRAM is allocated so as not cause conflicts between the divided RAMs when scheduling. Namely, once a certain line is selected, a line on which the same RAMs as those of this selected line is not set as a target three times thereafter. With this contrivance, the large-capacity cell buffer memory 17 can be configured in a way of actualizing the high-speed accessing.

Figure 18:
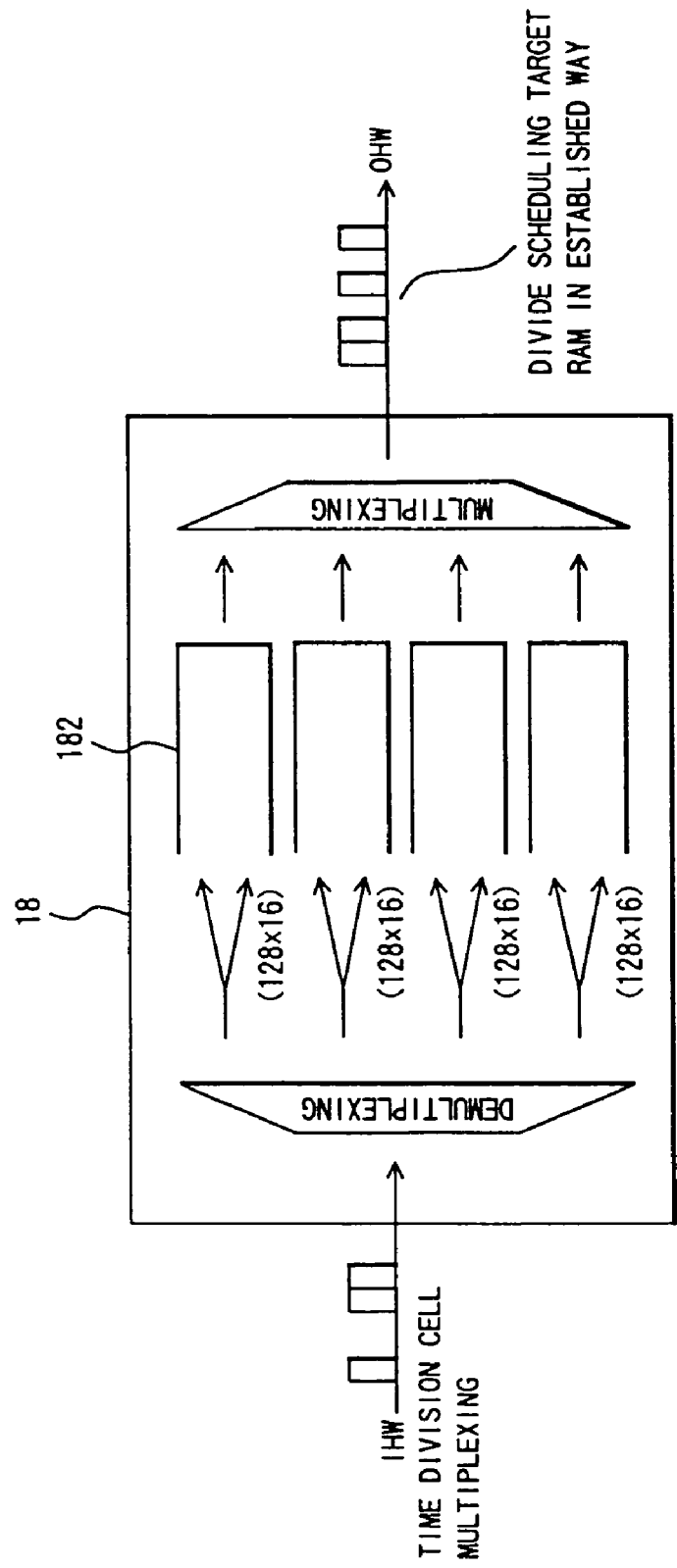
FIG. 18 is a block diagram showing an example of the architecture of the cell buffer memory.

FIG. 18 shows an example where the cells are time-division-multiplexed in established positions on an output highway OHW. This architecture is similar to the architecture shown in FIG. 17, however, it never happens that the cells corresponding to the DRAMs 182 disposed in parallel consecutively arrive because of being separated in the established manner. Hence, the SRAMs disposed at the previous stage become unnecessary. Instead, the cells are outputted to arbitrary outgoing routes from the respective DRAMs 182 disposed in parallel, thereby necessitating divisions of the individual DRAMs 182 with respect to the logic outgoing route queues. The large-capacity cell buffer memory 18 can be thereby constructed in a way of actualizing the high-speed accessing.

[Redundant Architecture]

Figure 19:
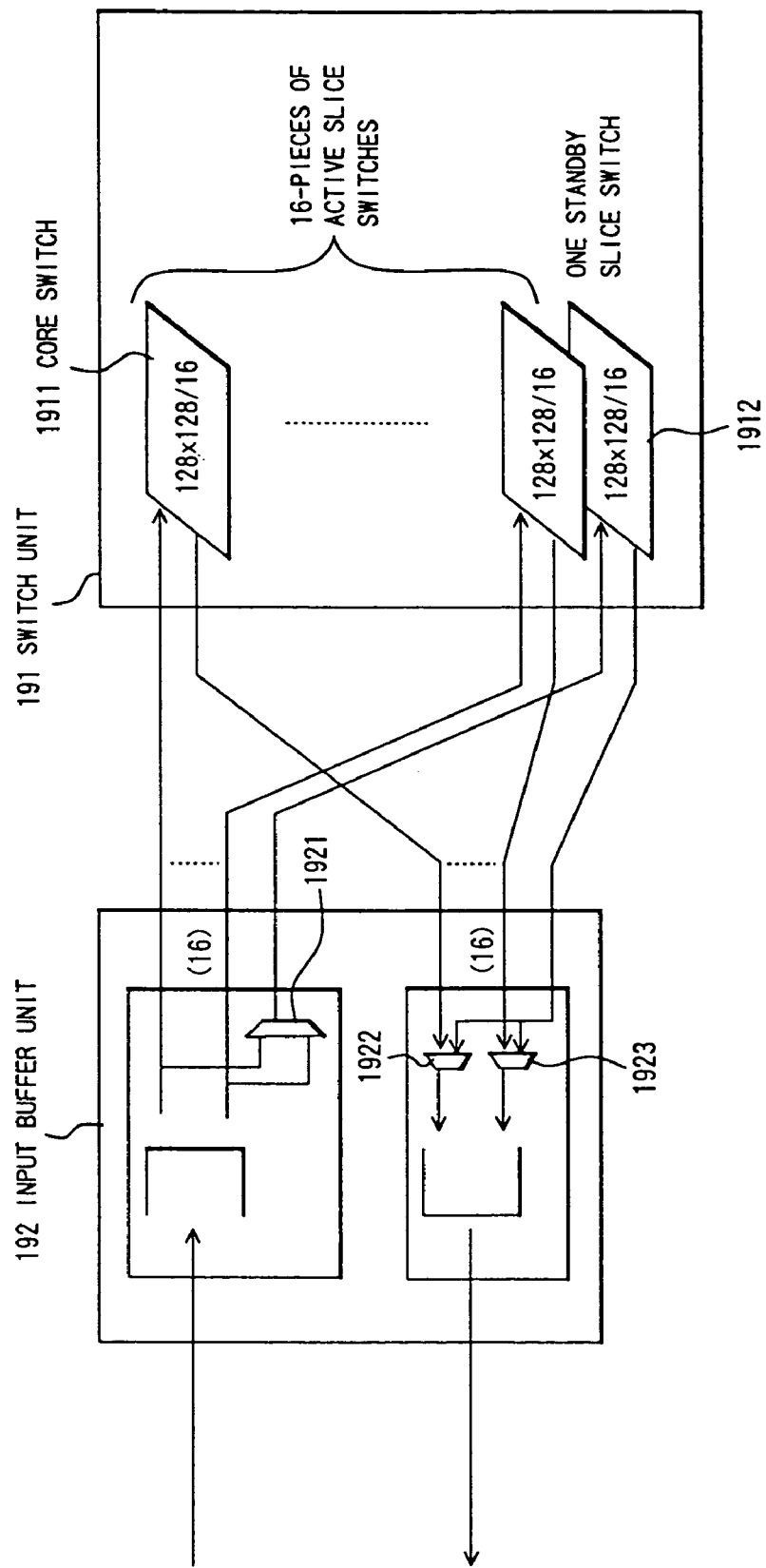
FIG. 19 is a block diagram showing an example of a redundant architecture of a core switch.

FIG. 19 shows an example of a redundant architecture of core switches of a switch unit. In a case where core switches 1911 of a switch unit 191 are configured based on an N+1 bit-slice architecture, it follows that a plurality (N=16) of the same slice switches 1911 are disposed in parallel. One or a plurality of extra slice switches 1911 are prepared, whereby the switching can be done. The switching can be attained by providing a selector 1921 for selecting which slice switch 1912 among N-pieces of the slice switches in an active mode is a redundant (standby) switch to which the data of arbitrary bits in an input buffer unit 192, and selectors 1922, 1923 for selecting the data coming from the redundant slice switch 1912 among pieces of data of the respective bits on the receiving side in the input buffer unit 192.

Further, if each of the selectors is so constructed as to be capable of switching to an arbitrary slice switch from arbitrary bits, it is also feasible to make the switching without being aware of which slice switch is the redundant slice switch.

Figure 20:
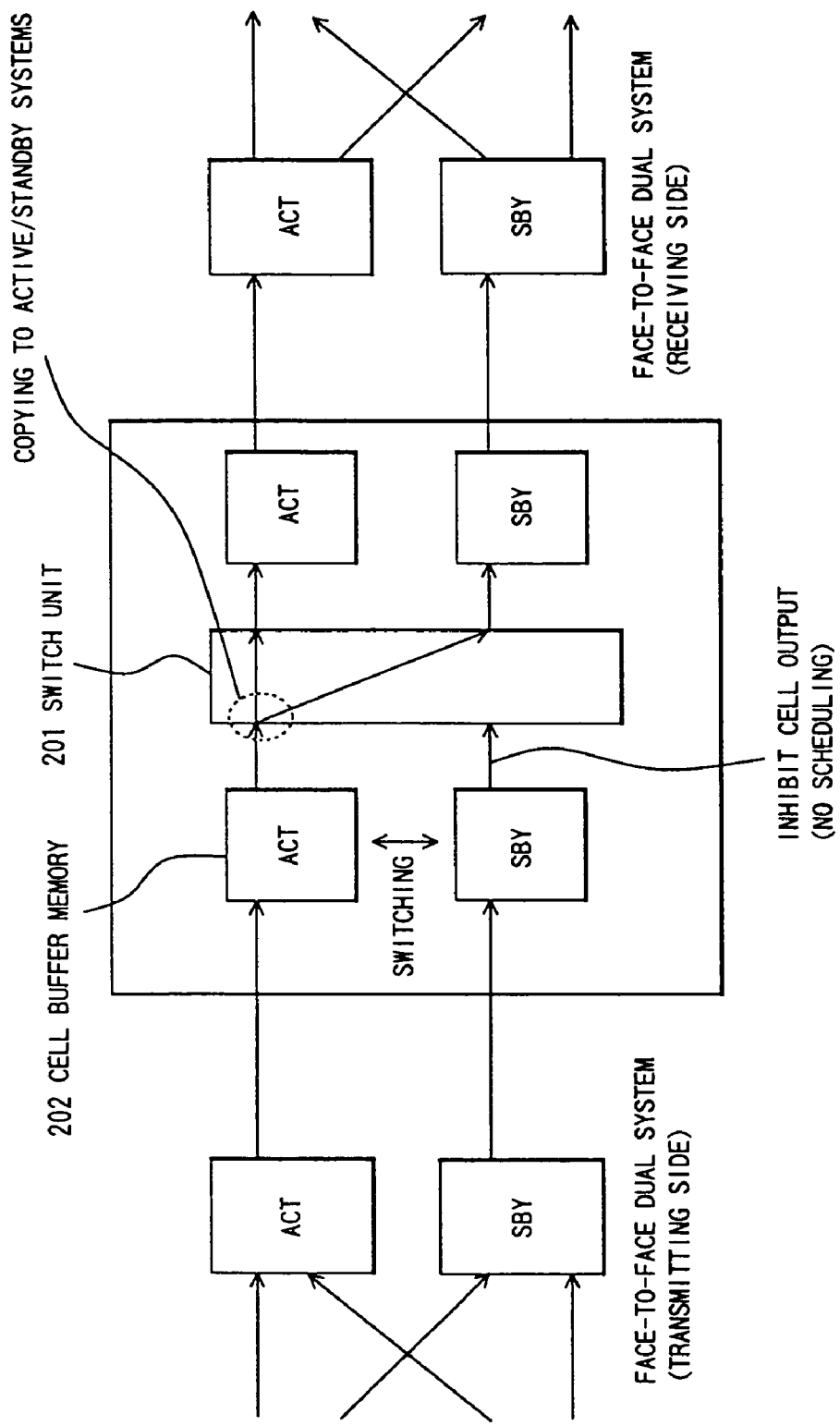
FIG. 20 is a block diagram showing an example of a redundant architecture of a cell buffer memory.

FIG. 20 shows a redundant architecture of a packet (cell) buffer memory 202 of the input buffer unit. There might be a case of attempting duplexes of transmitting and receiving lines in terms of a face-to-face dual system, however, the cores switches of the switch unit 201 take the N+1 redundant architecture, and hence cross-connections are unable to be provided. Such being the case, the core switch is given a copy function, and the switch unit 201 admits only the input cells from the active (ACT) system, thereby attaining the dual system. The copy method of the switch unit 201 may be categorized into a method of giving a copy control bit to the cell, and a method of setting the copy function in the switch unit itself.

Figure 21:
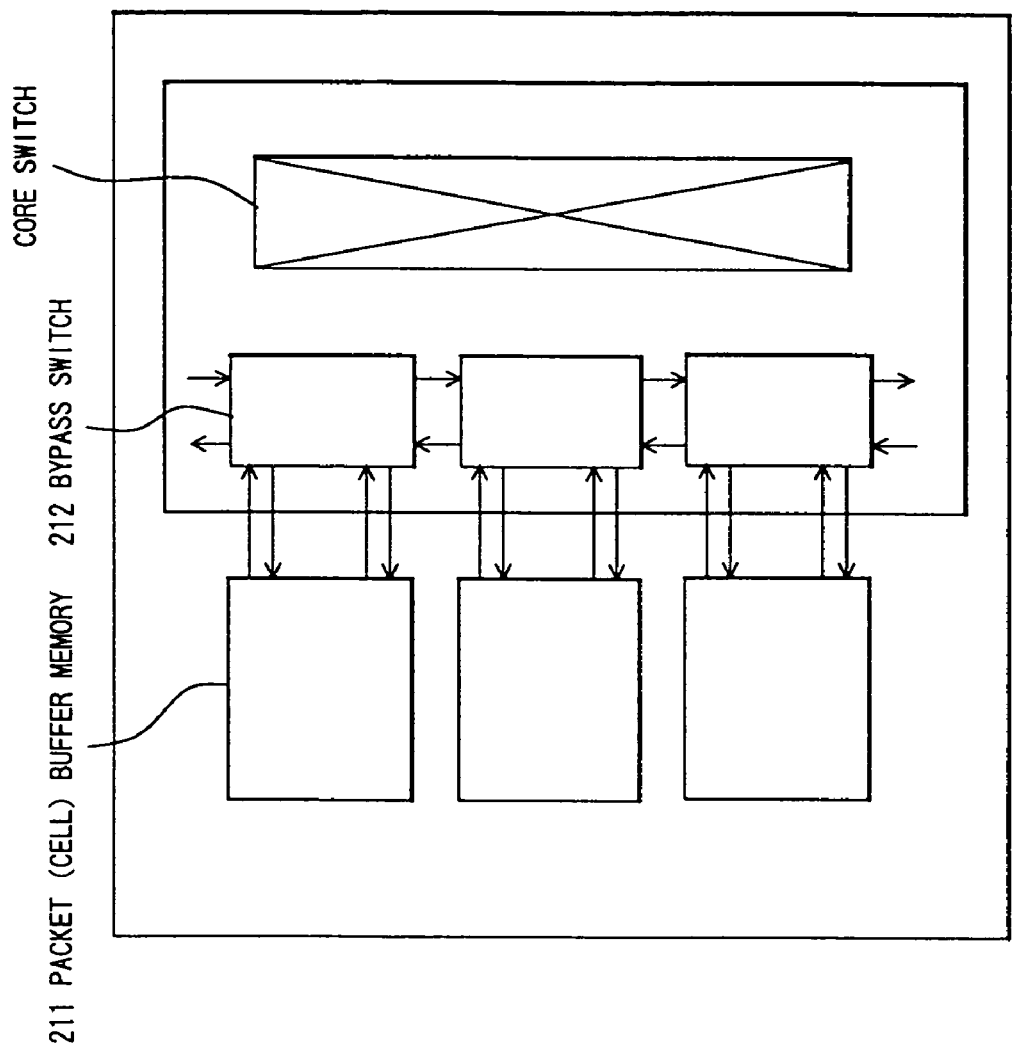
FIG. 21 is a block diagram showing an example of a switching architecture of the scheduling data.

FIG. 21 shows a configuration for switching the scheduling data. A bypass switch (a scheduling data switching unit) 212 is provided corresponding to a packet buffer memory 211 so that the scheduling data can be transferred and received even when removing the packaged packet buffer memory 211 of the input buffer unit. Then, when bypassing, it is possible to make switching without stopping the operation midways by adding a control delay in the packet (cell) buffer memory 211.

Figure 22:
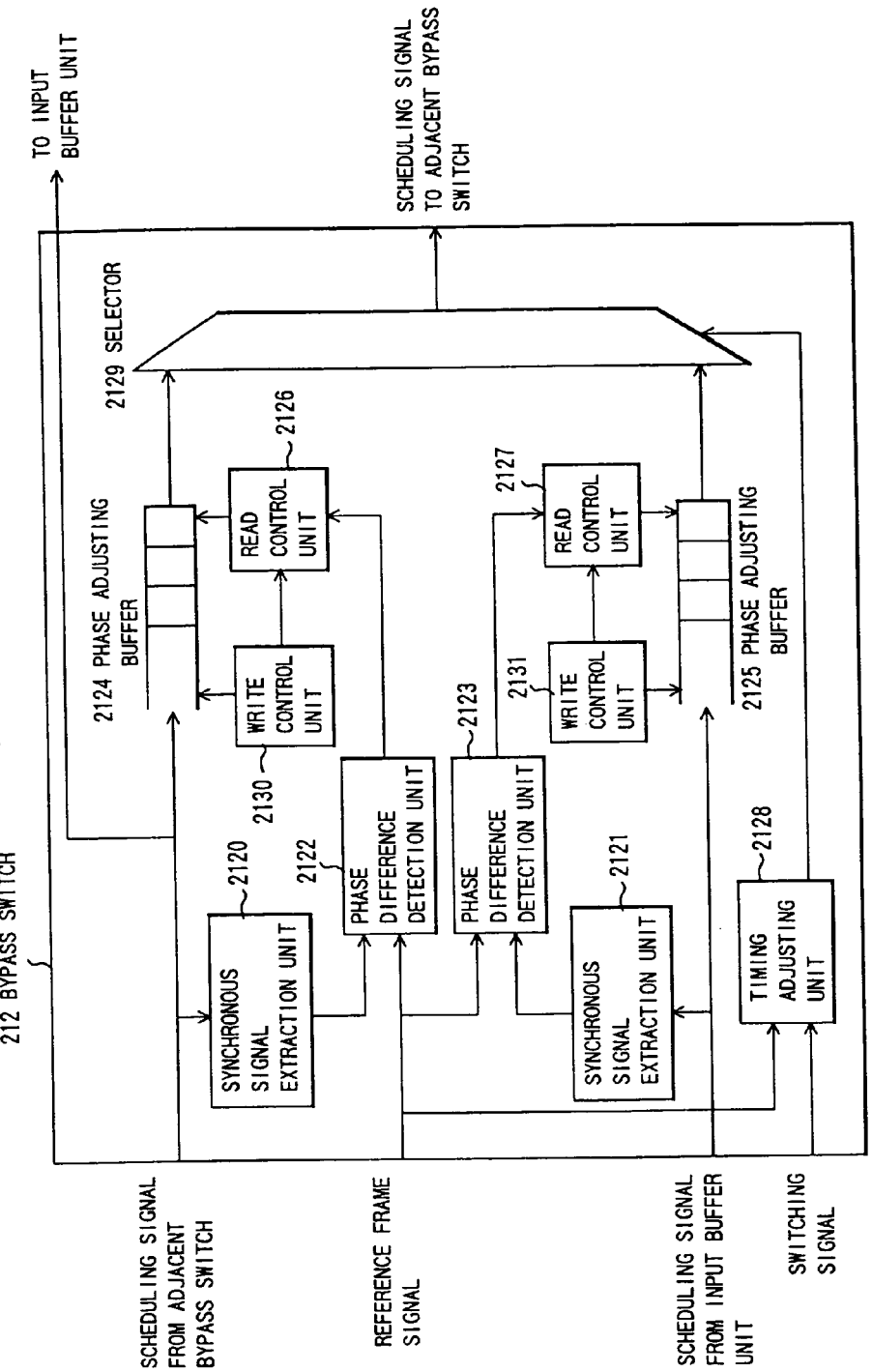
FIG. 22 is a block diagram showing a detailed configuration of a bypass switch.

FIG. 22 shows an example of a detailed configuration of the bypass switch 212 illustrated in FIG. 21. Referring to FIG. 22, scheduling signals from two systems, i.e., from the adjacent bypass switch and from the input buffer unit, are inputted to the bypass switch 212. Synchronous signal extraction units 2120, 2121 extract synchronous signals of the scheduling signals, and each of phase-difference detecting units 2122, 2123 detect a phase difference between a reference frame signal given from an unillustrated control unit and the extracted signal. Each of read-out control units 2126, 2127 of phase adjusting buffers 2124, 2125 is notified of a result of the detection, and absorbs the phase difference.

Further, a selector 2129 switches the output scheduling signal with a switching signal given from the control unit which has synchronized with the reference frame signal in a timing adjusting unit 2128. The synchronous signals of the scheduling signals may be exemplified by parallel run of the frame signals, periodic synchronous patterns (e.g., a fixed pattern and CRC) and so on. Write control units 2130, 2131 control writing of the scheduling signals to the phase adjusting buffers 2124, 2125.

Figure 23:
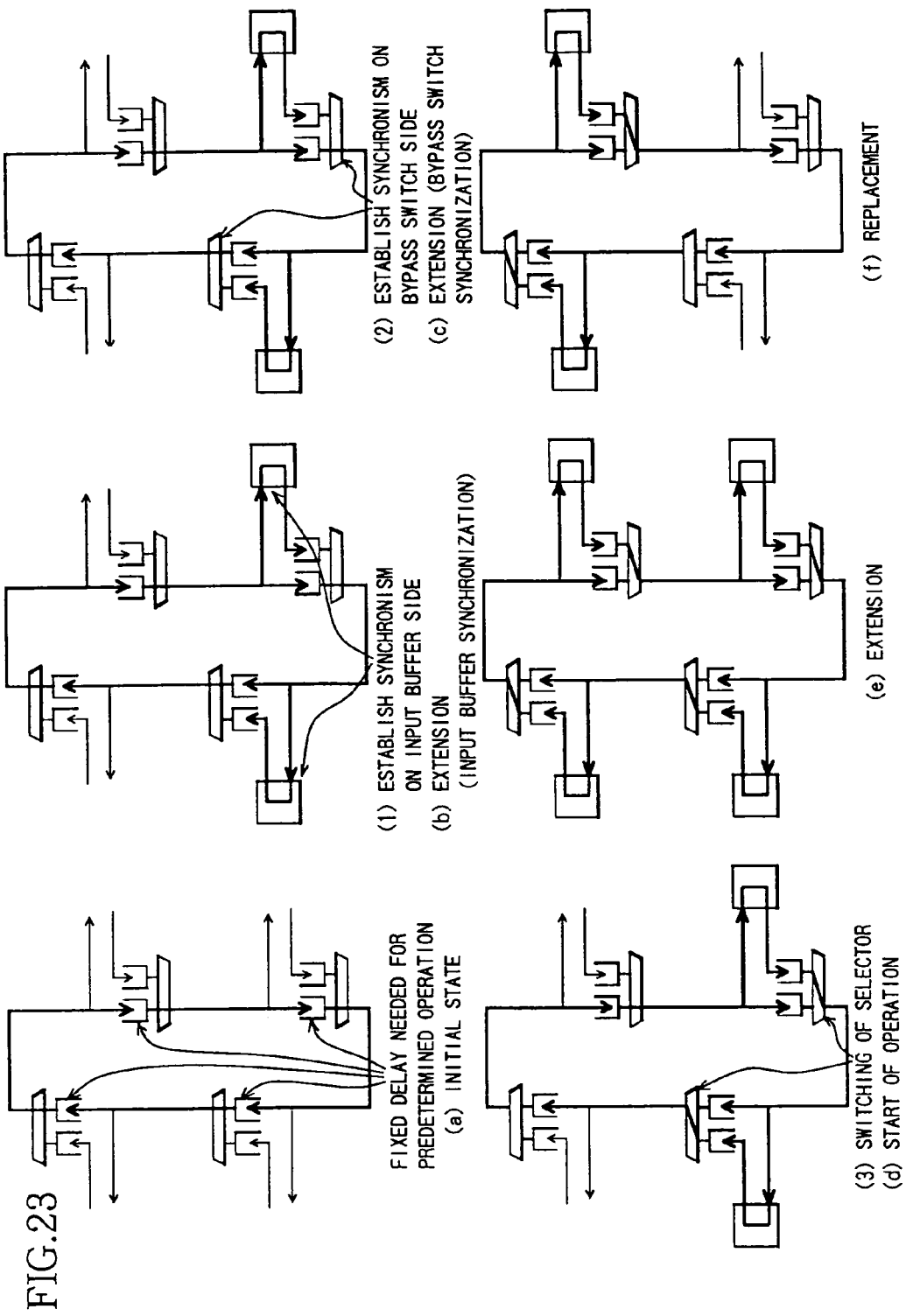
FIG. 23 is a block diagram showing an example of an operation of the bypass switch.

FIG. 23 shows an example of operation of the bypass switch 212.

(a) In an initial state, a loop is formed through the selector 2129 in accordance with the reference frame signal.

(b) When a new package constituting the input buffer unit is incorporated, to start with, the synchronism is established by a frame detection of the scheduling signal in the input buffer unit.

(c) Next, in the bypass switch 212, the synchronism is established by a frame detection of the scheduling signal on the side of the input buffer unit.

(d) After establishing the synchronism, the scheduling signal in the extended input buffer unit is transmitted by switching the selector 2129 of the bypass switch 212.

(e) When further extending a new package constituting the input buffer unit, the same procedures are taken.

(f) The package is replaced after switching the selector 2129 of the bypass switch 212.

[Architecture and Operation of First Scheduler]

Figure 24:
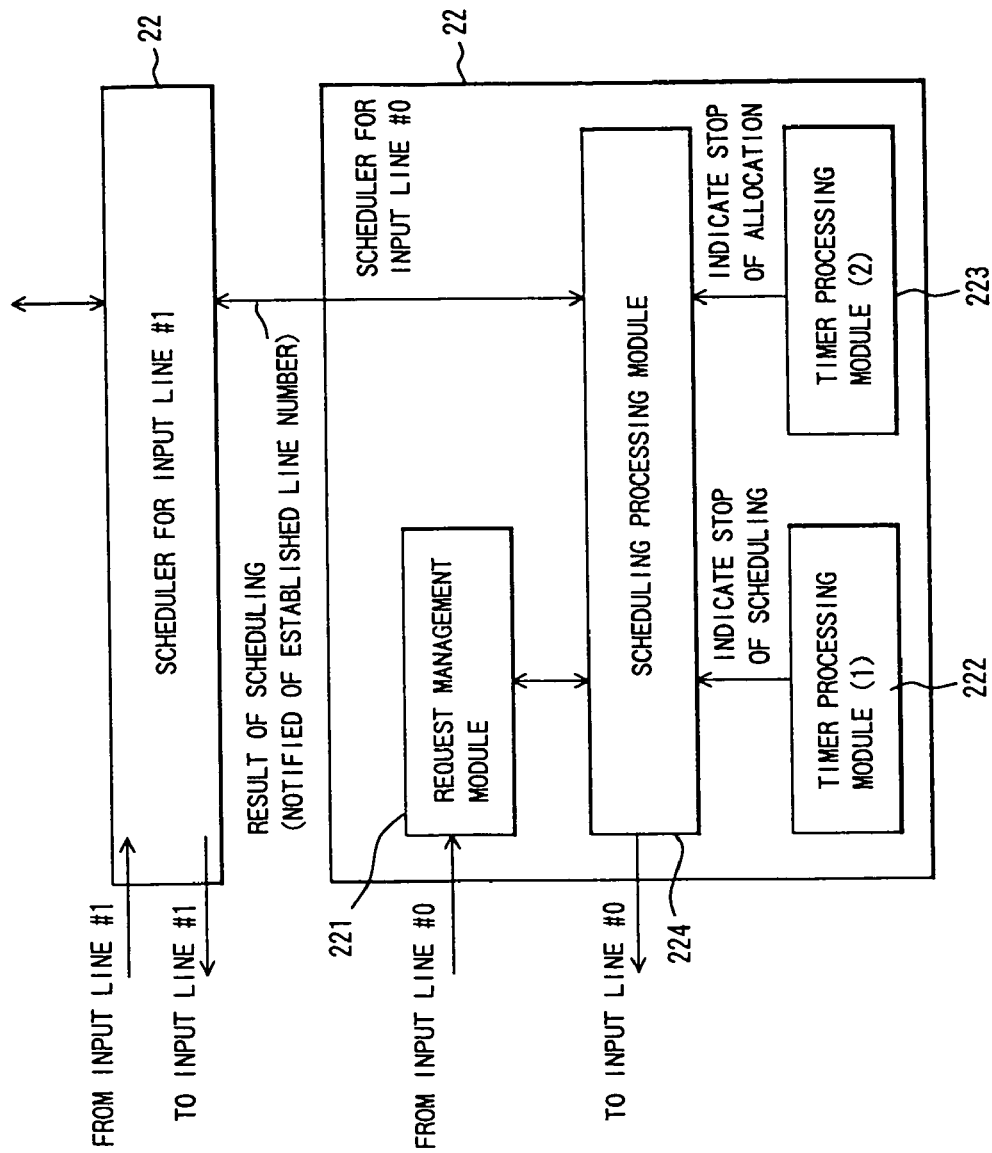
FIG. 24 is a block diagram showing an architecture of a first scheduler.

FIG. 24 shows an architecture of a scheduler of the input buffer unit in the packet switch in one embodiment of the present invention. Referring to FIG. 24, a request management module 221 manages the number of transmission requests which the input buffer memory notifies of. A first timer processing module (1) 222 measures a scheduling cycle with respect to a self input highway IHW. A second timer processing module (2) 223 is provided corresponding to each of the logic outgoing routes, and measures a scheduling allocation cycle with respect to the output highway thereof. A scheduling processing module 224 executes a scheduling process when judged to be possible of scheduling in the timer processing module (1) 222, and establishes an outgoing route in accordance with a scheduling algorithm among the outgoing routes each given an indication of being allocable in the timer processing module (2) 223 as well as among the output lines of which the transmission requests have been received by the request management module 221. The respective schedulers 22 are provided corresponding to the input lines (incoming routes) IHW.

In this architecture, when the scheduling process is executed for a certain input line, the timer processing module (1) 222 starts measuring a predetermined period of time (scheduling speed/input line speed). Then, till the predetermined time elapses, the timer processing module (1) 222 gives an impossible-of-scheduling stop indication to the scheduling processing module 224 so as not to perform scheduling at a speed equal to or higher than the input line speed. Accordingly, the input line speed may be a trigger with which the scheduler 22 notifies the input buffer memory of the transmission request, and, as a result, the high-speed input buffer memory becomes unnecessary for the low-speed line interface (Operational Example 1).

Moreover, in the course of the scheduling process for a certain input line, if a certain output line (outgoing route) OHW is established, the timer processing module (2) 223 starts measuring a predetermined period of time (scheduling speed/output line speed). Then, till the predetermined time elapses, the timer processing module (2) 223 gives an impossible-of-scheduling stop indication with respect to that output line to the scheduling processing module 224 so as not to perform scheduling at a speed equal to or higher than the output line speed. Accordingly, a cycle at which the scheduler 22 gives the input buffer memory an indication that the packets should be transmitted to that output line, is also equal to or lower than the output line speed. As a result, it is feasible to restrict a data inflow to the output line at a traffic over the line speed, thereby making the large-capacity input buffer memory unnecessary (Operational Example 2).

If the scheduling cycle is not completed within one length of unit time and a pipeline process is executed taking several lengths of unit time, and when the scheduling process for a certain input line on which a certain pipeline processing state exists is executed for carrying out the operation explained in the operational example 1, the schedulers provided at N (scheduling speed/input line speed)-stages anterior and posterior to that pipeline processing stage are given the impossible-of-scheduling with respect to that input line. As a consequence, it is possible to restrain the schedulers from giving reading indications to the input buffer memory at a speed equal to or higher than the input line speed (Operational Example 3).

Further, if the scheduling cycle is not completed within one length of unit time and the pipeline process is executed taking several lengths of unit time, and when a certain output line is established in the scheduling process for a certain input line on which a certain pipeline processing stage exists in order to perform the operation explained in the operational example 2, the scheduler 22 at that pipeline stage is given an impossible-of-allocating indication with respect to that output line during N (scheduling speed/output line speed) pipeline cycles. As a result, the data do not flow to the output line at a traffic over the line speed, thereby making the large-capacity input buffer memory unnecessary (Operational Example 4).

Triggering for the measurement of the timer processing modules (1) 222 and (2) 223 is effected cyclically, which is a scheme for relieving loads of these timer modules. Consequently, as compared with the operational examples 2 and 4 given above, though a burst characteristic of the output traffic flow tends to increase, there is no necessity for notifying other schedulers which output line is unable to be established because of relieving the loads of the timer processing modules and of the scheduling being cyclically done or of the occurrence of the impossible-of-allocating indication. It is therefore feasible to reduce a quantity of the data transferred and received between the schedulers (Operational Example 5).

[Operations of Packet Switch]

Figure 26:
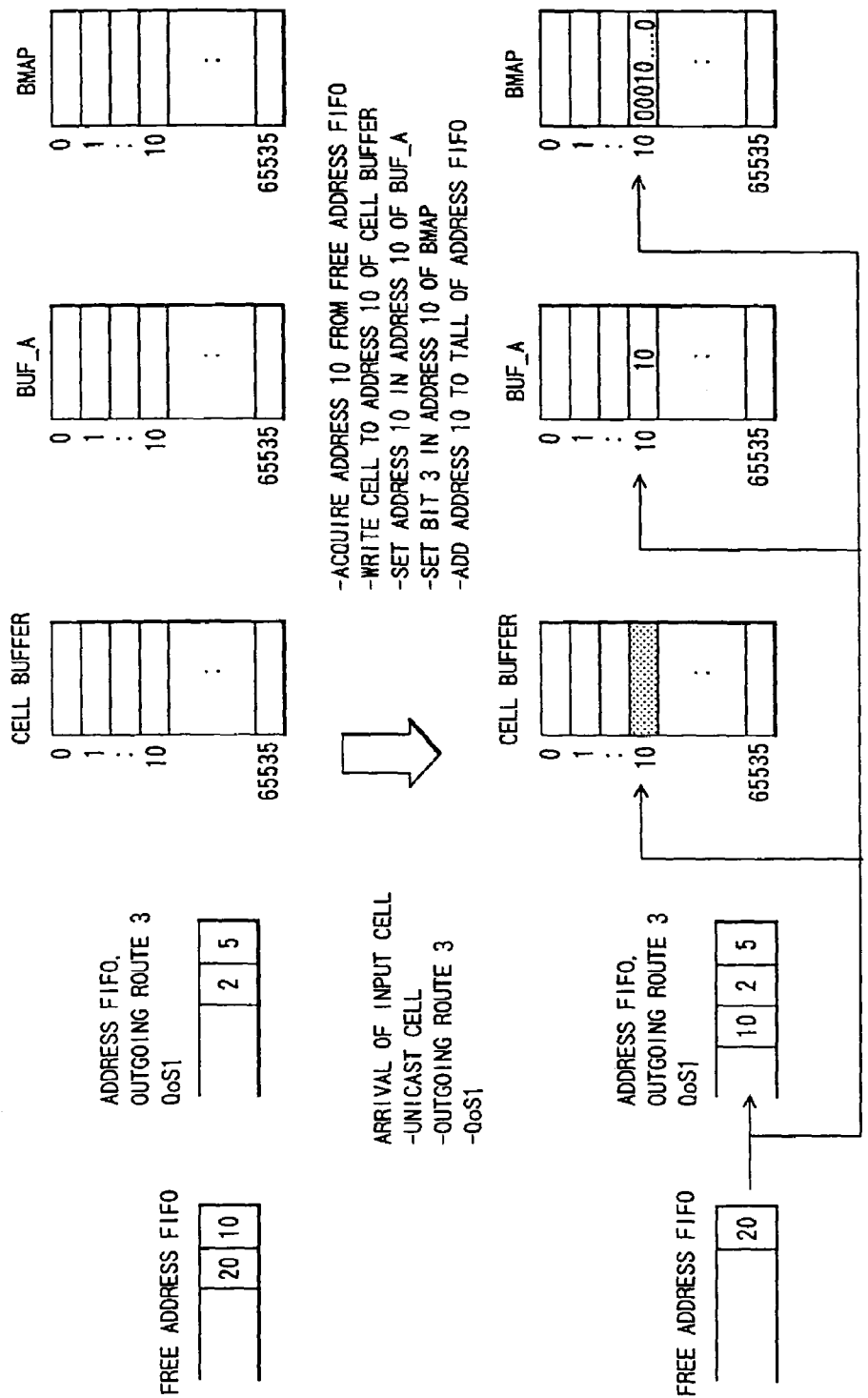
FIG. 26 is an explanatory diagram showing a uni-cast writing operation.
Figure 27:
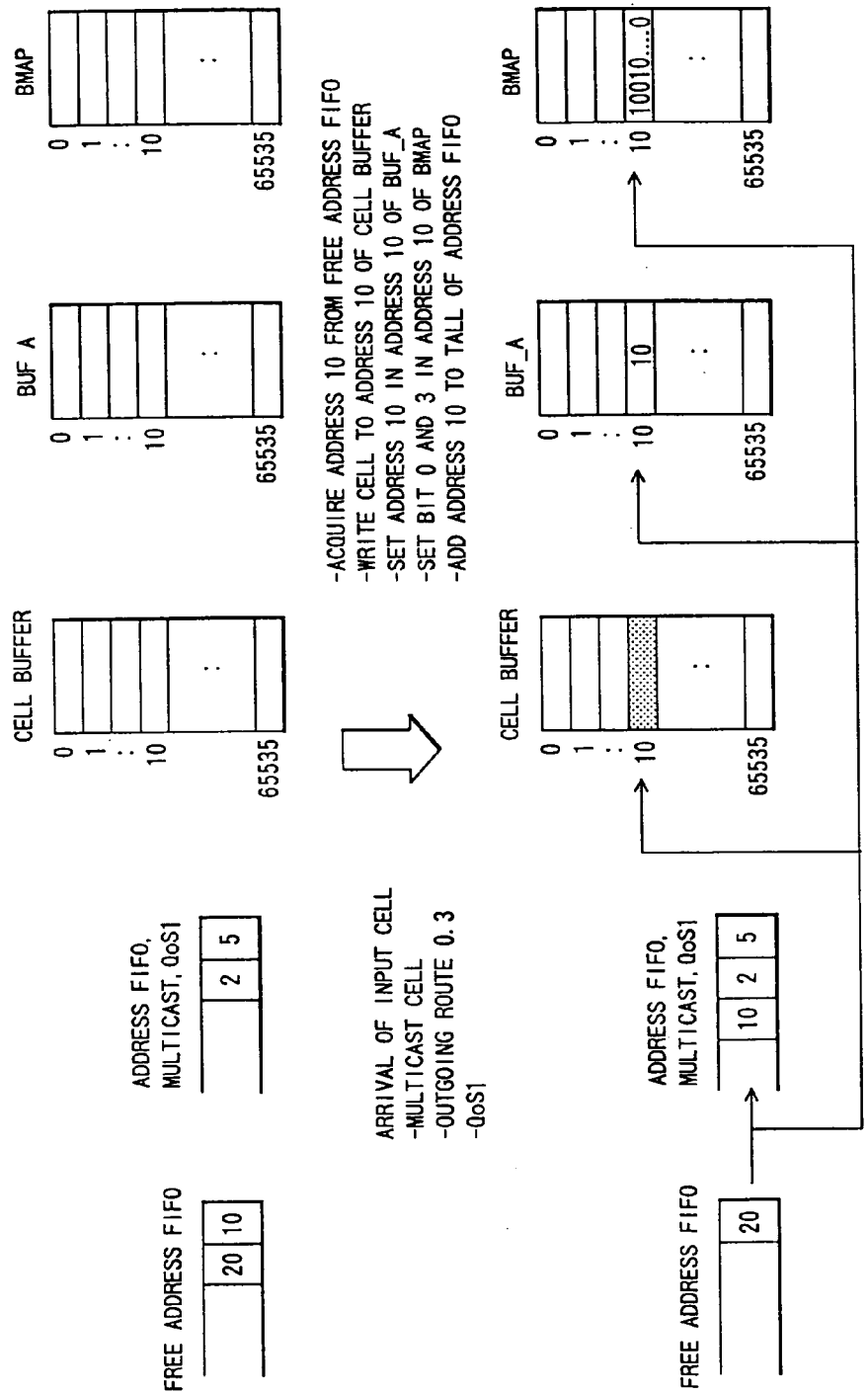
FIG. 27 is an explanatory diagram showing a multicast writing operation.
Figure 32:
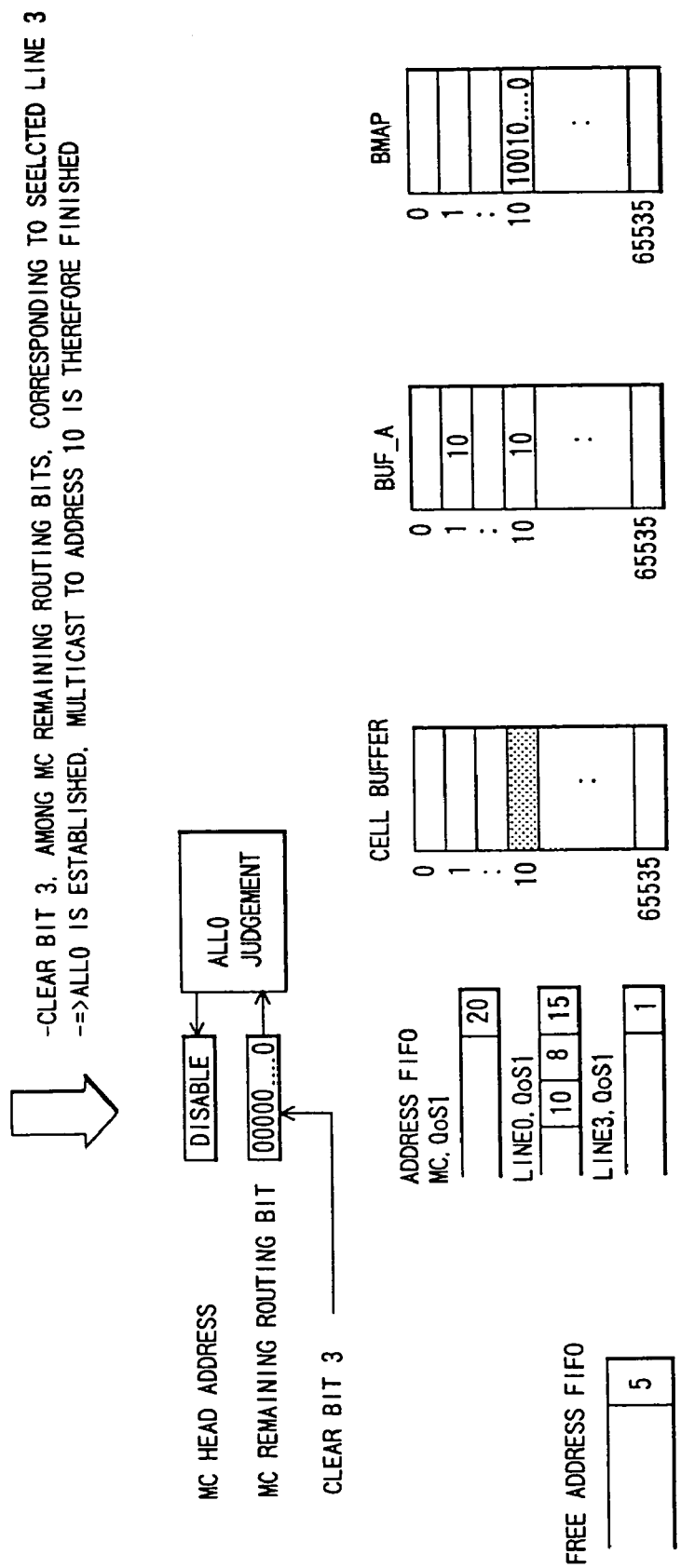
FIG. 32 is an explanatory diagram showing the multicast distribution.
Figure 34:
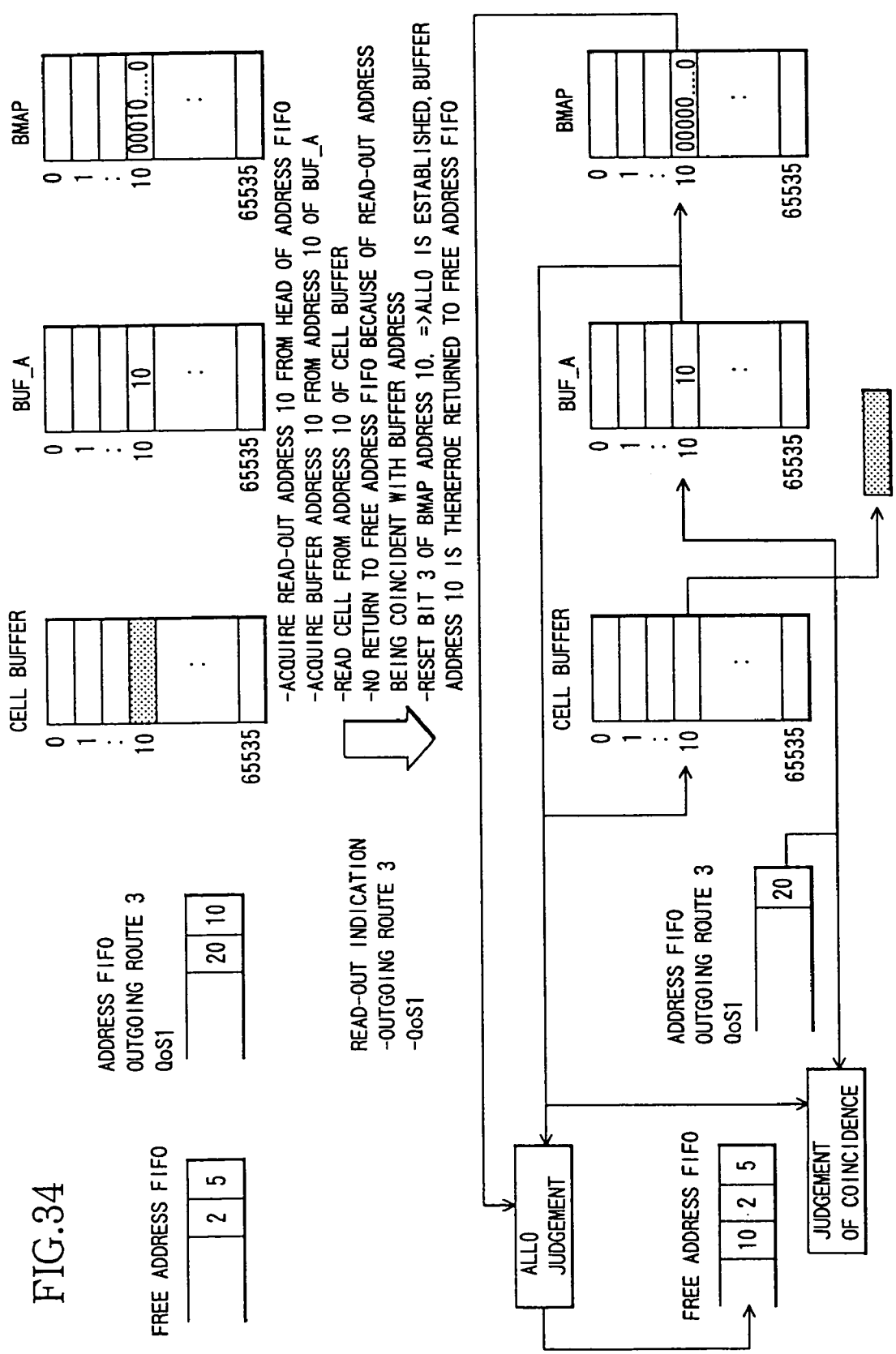
FIG. 34 is an explanatory diagram showing the reading operation.
Figure 35:
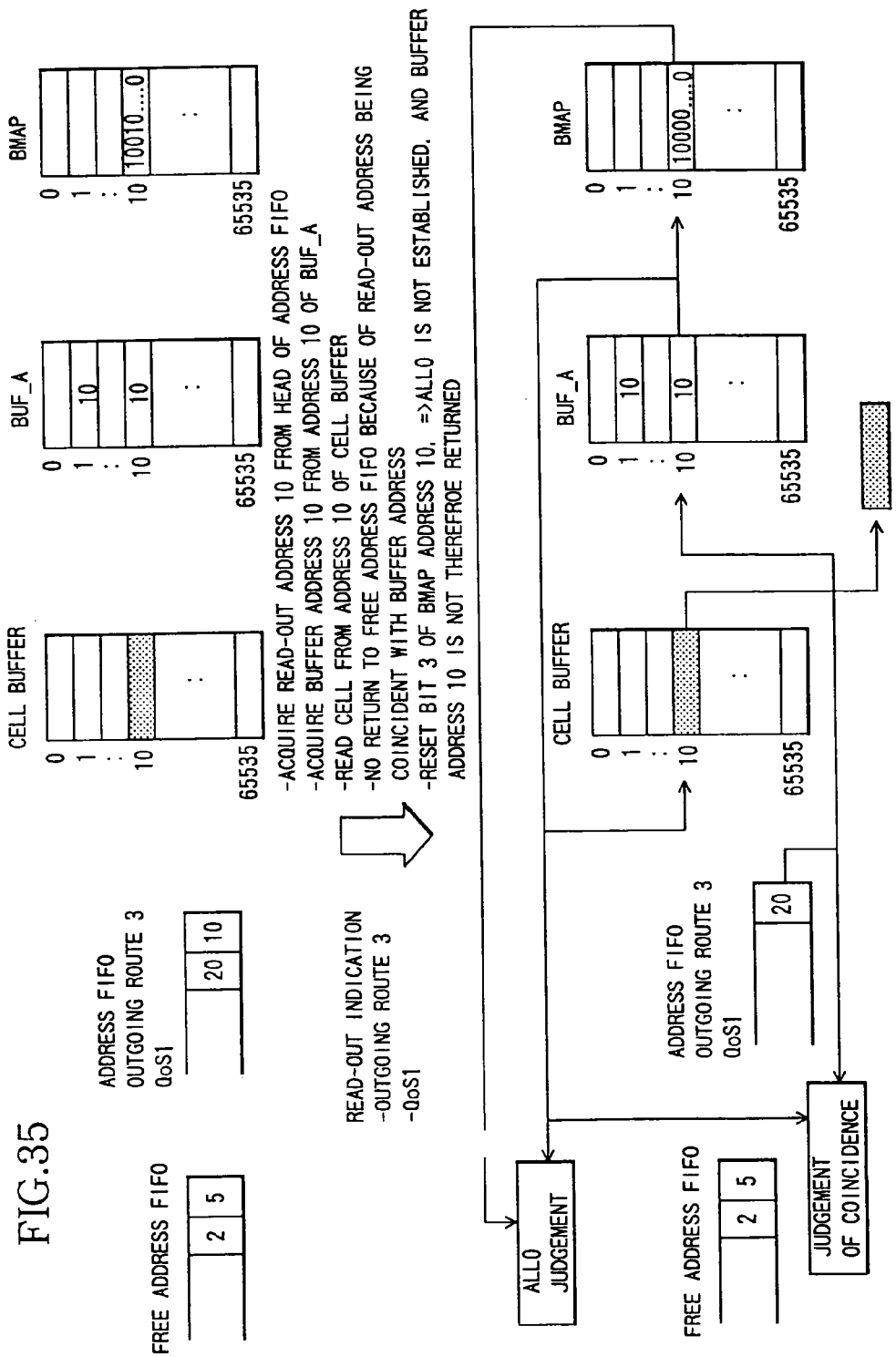
FIG. 35 is an explanatory diagram showing the reading operation.
Figure 36:
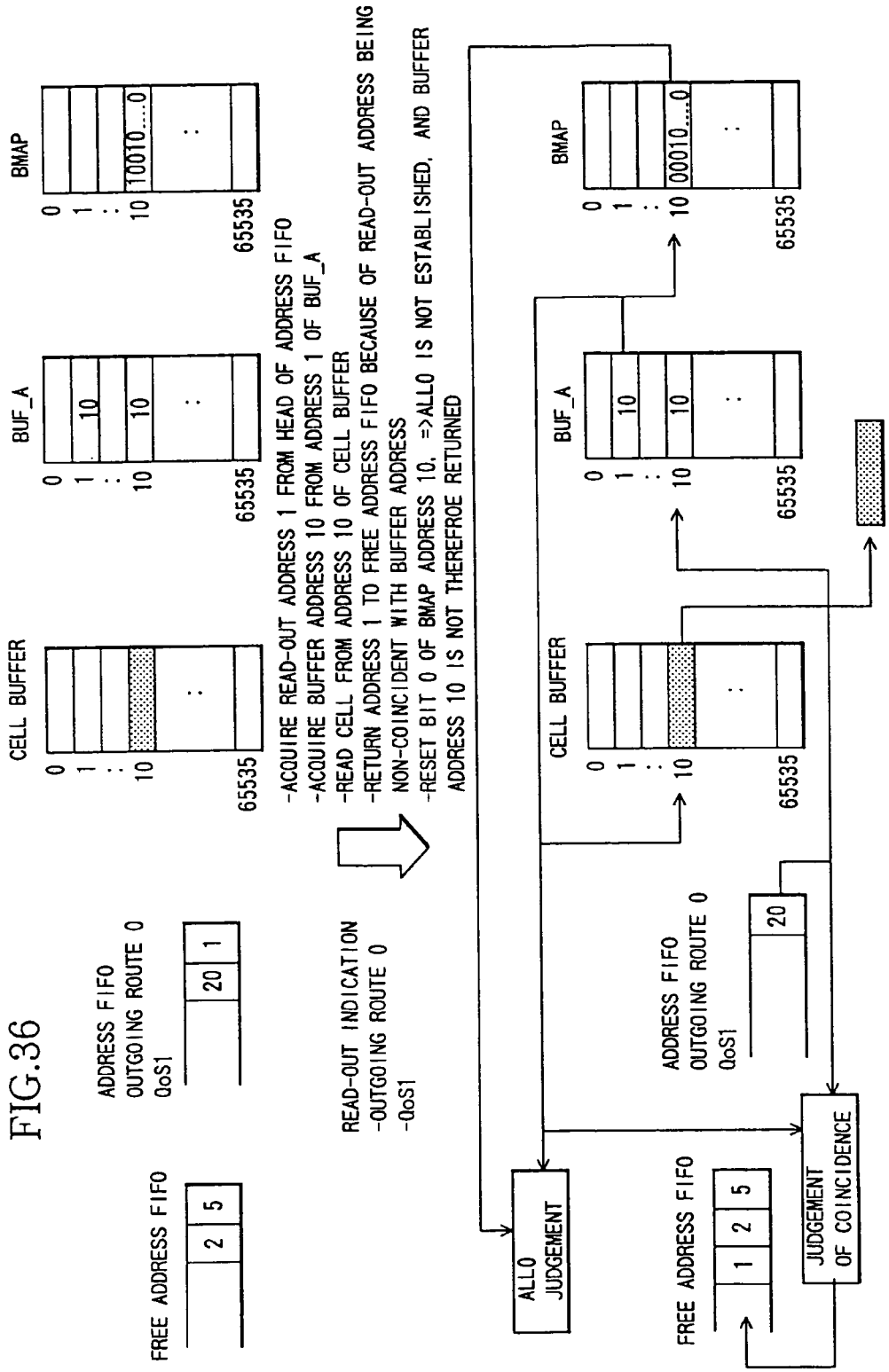
FIG. 36 is an explanatory diagram showing the reading operation.
Figure 37:
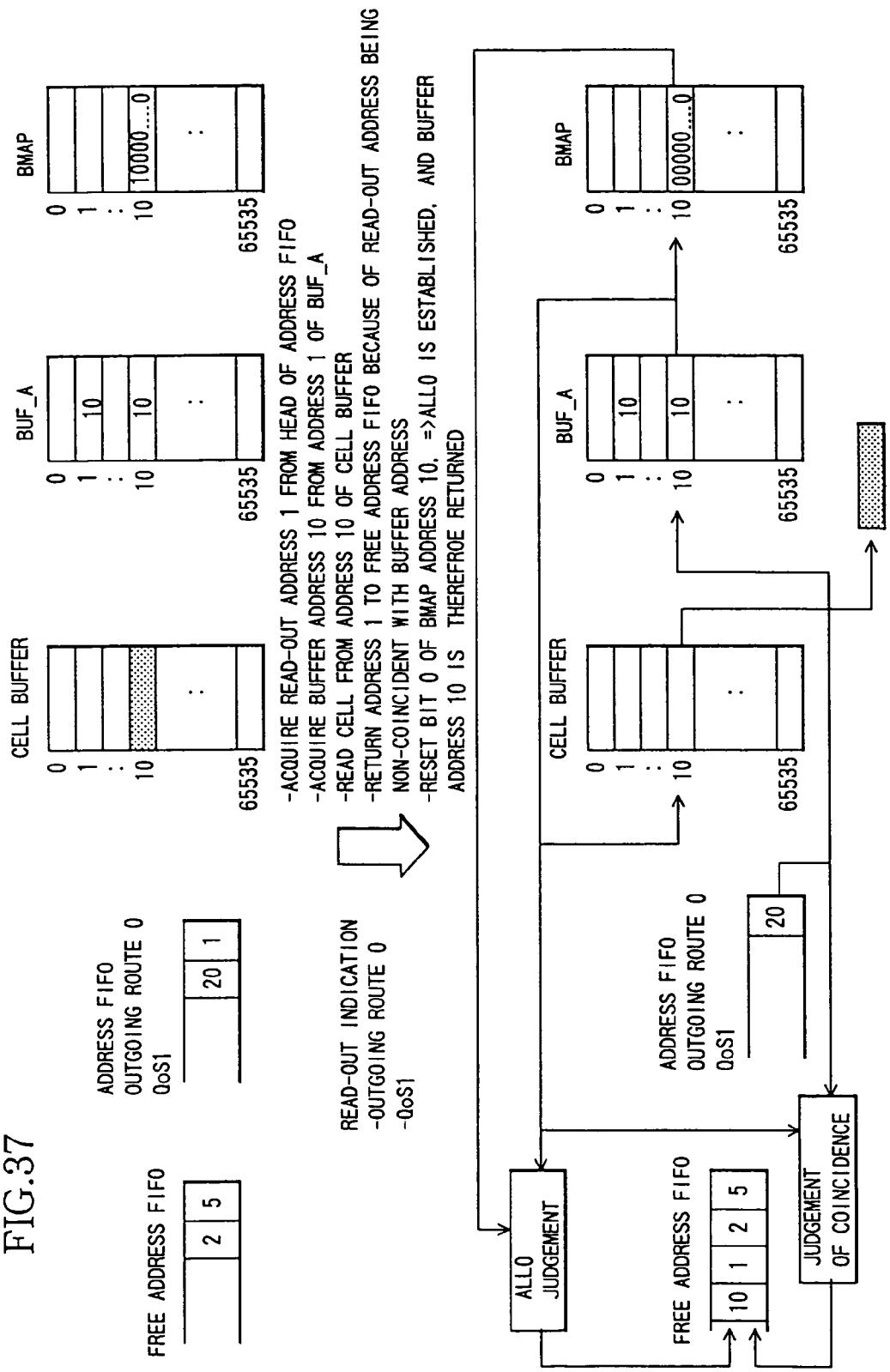
FIG. 37 is an explanatory diagram showing the reading operation.

Operations of the packet switch in one embodiment of the present invention will be described referring to FIGS. 25 through 37 in sequence. FIG. 25 shows a procedure of a writing operation. FIGS. 26 and 27 show examples of the writing operation. FIG. 28 shows a procedure of multicasting. FIGS. 29 through 32 show examples of the multicasting. FIG. 33 shows a procedure of a reading operation. FIGS. 34 through 37 show examples of the reading operation.

(Pointer Basic Process)

To begin with, an adding operation to the address FIFO and the reading operation from the address FIFO will be explained.

(1) Adding Operation to Address FIFO:

When the address FIFO is free, an address to be added is set to a start (START) pointer S-PNT and to an end (END) pointer E-PNT, respectively. While on the other hand, when the address FIFO has no free area, an address to be added to the address link pointed by the END pointer, is set. Further, an address to be added to the END pointer is set.

(2) Reading Operation from Address FIFO:

An address pointed by the START pointer is acquired. A NEXT address is acquired from the address link pointed by the START pointer. Further, the NEXT address is set in the START pointer.

Whether the address FIFO is free or not is judged from a queue length counter. The free address FIFO (a free address block management memory) does not have the queue length counter. Then, the management is conducted in the following manner so that the free address FIFO does not necessarily become free. Namely, an address "0" is initially allocated to the free address FIFO. A free address generating counter generates write addresses from an address "1". If the START pointer is equal to the END pointer when acquiring the write address, the input cell is discarded.

(Writing Operation)

The cell arrived is written to the cell buffer memory, and an address link of a corresponding logic outgoing route queue is updated. The write address is obtained from the head of the free address FIFO. In the initial state, nothing is set in the free address FIFO. Then, there is provided a counter for generating the write address for the initial operation, i.e., an initial address generating counter INI-CNT. Till the initial address generating counter INI-CNT comes to a maximum value (MAX), the write address is acquired from this counter. When reaching the value MAX, the counter is stopped, and from this onwards the write address is acquired from the free address FIFO.

If the write address can not be obtained from the free address FIFO, the input cell is discarded. Further, for matching with the multicast (MC) operation, the write address is retained in a buffer address area. Moreover, a value with which an outgoing route number is converted into the bitmap is retained in an MC routing bit area in the case of a uni-cast cell, and, in the case of a multicast cell, MC routing bits are retained therein.

The writing steps are S1 to S7 which follow. Steps S1~S7 are:

S1: The write address is acquired.
S2: The cell arrived is written to the cell buffer memory corresponding to the write address.
S3: The write address is added to the address FIFO of a logic queue corresponding to header data of the cell arrived.
S4: The write address is retained in the buffer address area.
S5: When the input cell is classified as the uni-cast cell, the MC routing bit corresponding to the outgoing route number is set.
S6: When the input cell is the multicast, the MC routing bit is retained.
S7: A value of the queue length counter of the corresponding logic queue in the common buffer (cell buffer memory) is incremented.

(Multicasting)

The MC address is read from the address FIFO of the logic multicast queue, and retained as a MC head address in a register. Next, the corresponding MC routing bit is read from an SSRAM and held as an MC remaining routing bit in the register. Then, the addresses are distributed to the corresponding logic outgoing route queues referring to the MC remaining routing bits. The distribution of the addresses is conducted per outgoing route for a 1-packet (cell) time. As for the addresses to be distributed, the MC head address is distributed to the first outgoing route, and, from the second time onwards, MC added addresses newly obtained from the free address FIFO are used.

The actual cells are, however, written to the cell buffer memory corresponding to the MC head address, and hence the MC head address is retained as a buffer address per address newly obtained. It is judged from an MC head address effective register whether or not it is the first cell of the multicast.

The multicast processing steps are S11 to A18 and S21 to S26 which follow:

First Cell:
S11: the MC address of the logic multicast queue is retained in the MC head address register.
S12: The MC routing bit corresponding to the MC head address is retained in the MC remaining routing bit register.
S13: The latest line among the lines where the MC remaining bit is set, is selected.
S14: The MC head address is added to the address FIFO of the logic queue corresponding to the selected line.
S15: The MC head address is set in the buffer address area corresponding to the MC head address.
S16: The bit corresponding to the selected line is updated to [0] with respect to the MC remaining routing bit.
S17: A value of the queue length counter of the corresponding MC queue is decremented.
S18: A value of the queue length counter of the corresponding logic queue is incremented.

From Second Cell Onward:
S21: The MC added address is acquired from the free address FIFO.
S22: The latest line among the lines where the MC remaining routing bit, is set.
S23: The MC added address is added to the address FIFO of the logic queue corresponding to the selected line.
S24: The MC head address is set in the buffer address area corresponding to the MC added address.
S25: The bit corresponding to the selected line is updated to [0] with respect to the MC remaining routing bit.
S26: A value of the queue length counter of the corresponding logic queue in the common buffer is incremented.

This operation continues till all the MC remaining routing bits become [0]. When all becomes [0], the multicast of that cell comes to an end, and the MC head address effective register is reset. A new MC address is obtained from the logic multicast queue at a next slot, and the processing loops back to the first operation. Whereas if the address is not acquired from the free address FIFO, the multicasting at that slot is stopped, and the processing waits till the address is obtained.

(Reading Operation)

A read-out address is acquired from the address FIFO of the corresponding logic outgoing route queue, and the cell is read from the cell buffer memory in the buffer address corresponding to the read-out address. Thereafter, only when the read-out address is not identical with the buffer address, the read-out address is returned. Further, the bit corresponding to the read-out line of the MC bitmap corresponding to the buffer address is cleared. As a result, if all is [0], it is judged that the read-out of all the corresponding cells is completed, and the buffer address is returned to the free address FIFO.

The reading steps are S31 through S36 which are shown as follows:

S31: Th read-out address is obtained from the address FIFO of the logic outgoing route queue.
S32: The cell is read out of the buffer address corresponding to the read-out address.
S33: If the buffer address is not coincident with the read-out address, the read-out address is added to the address FIFO, the value of the queue length counter of the common buffer is decremented.
S34: The bit corresponding to the read-out line is cleared with respect to the MC bitmap corresponding to the buffer address.
S35: If MC bitmap after being cleared is all [0], the buffer address is added to the address FIFO, and the value of the queue length counter of the common buffer is decremented.
S36: The value of the queue length counter of corresponding logic queue is decremented.

[Architecture and Operation of Second Scheduler]

Figure 38:
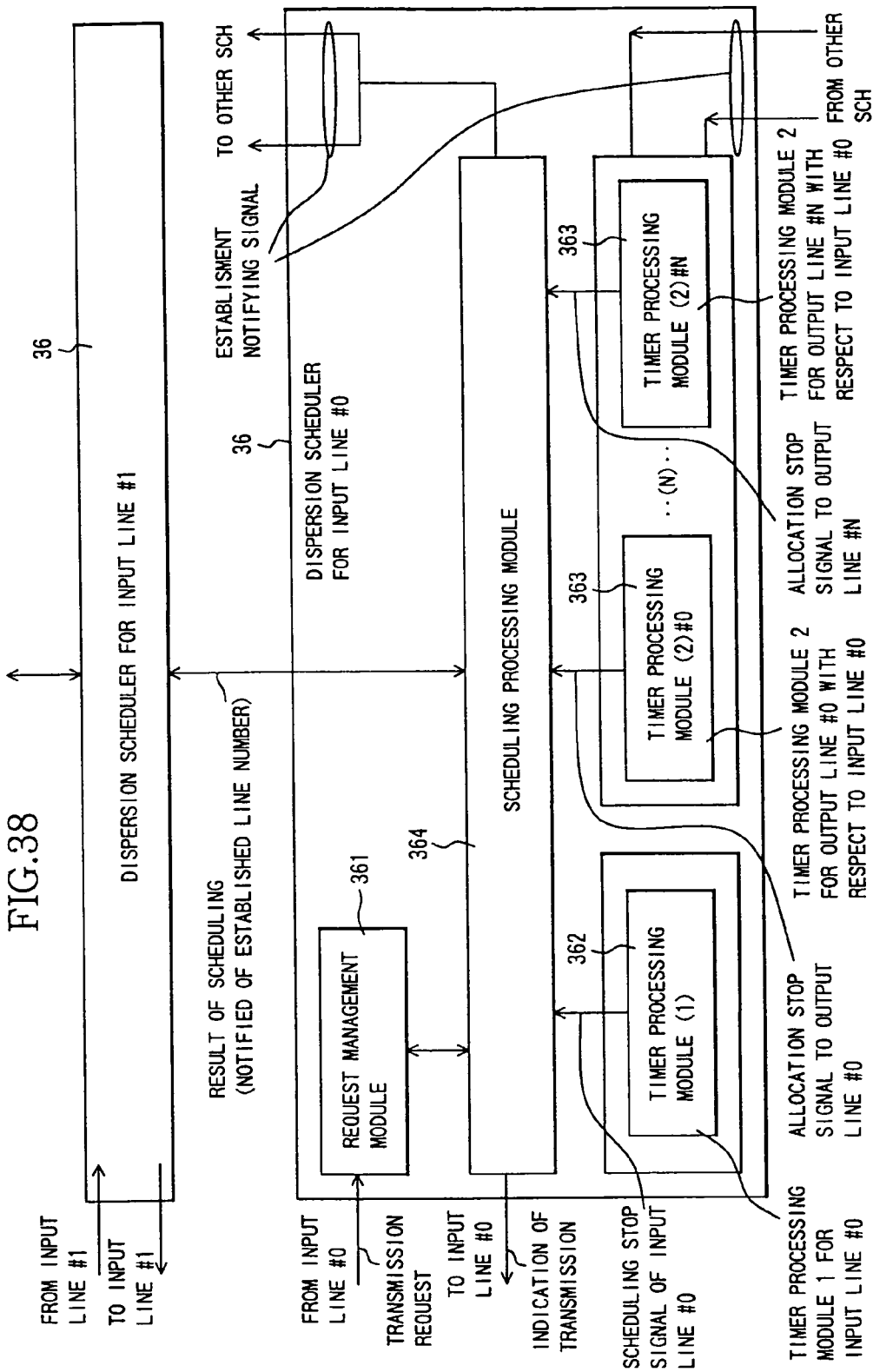
FIG. 38 is a block diagram showing an architecture of a second scheduler.

FIG. 38 shows an architecture of a scheduler of the input buffer unit in the packet switch in one embodiment of the present invention. Referring to FIG. 38, a request management module 361 manages the number of transmission requests which the input buffer memory notifies of. A first timer processing module (1) 362 measures a scheduling cycle with respect to a self input highway. A second timer processing module (2) 363 is provided corresponding to each of the logic outgoing routes, and measures a scheduling allocation cycle with respect to the output highway thereof. A scheduling processing module 364 executes the scheduling process when judged to be possible of scheduling in the timer processing module (1) 362, and establishes an outgoing route in accordance with the scheduling algorithm among the outgoing routes each given an indication of being allocable in the timer processing module (2) 363 as well as among the output lines of which the transmission requests have been received by the request management module 361.

The respective schedulers (SCH) 36 are provided corresponding to the input highways (incoming routes) IHW, and establish the output highways in accordance with the scheduling algorithm in order to determine packet forwarding routes on the self input highways so as not cause conflicts between the outgoing routes on the respective input highways within one-unit time, herein, within one-packet (cell) time.

(Necessity for Input Line Speed Scheduling)

Figure 39:
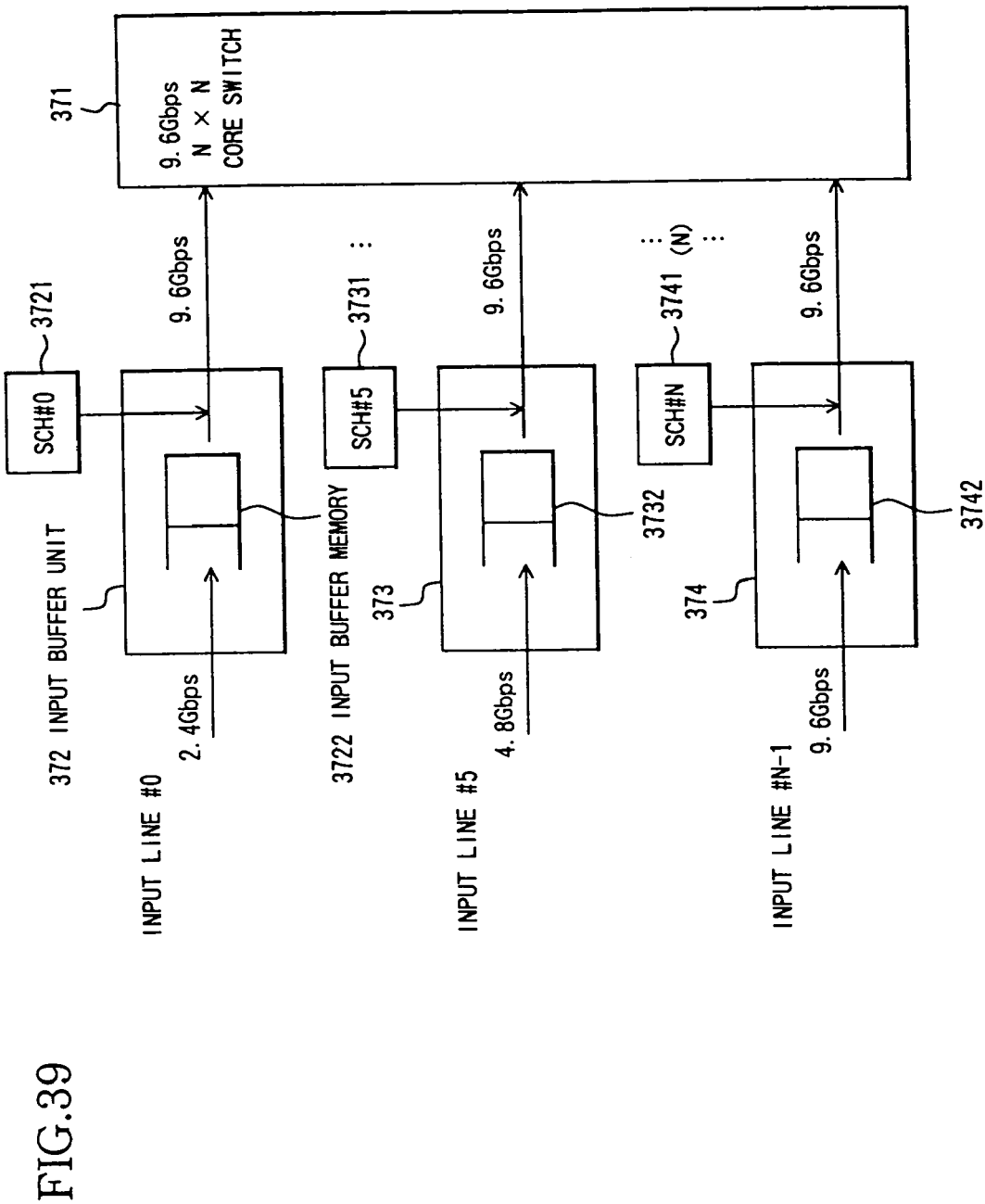
FIG. 39 is an explanatory diagram showing a problem in terms of a processing capability of the input buffer unit.

FIG. 39 shows an example in which an N×N core switch (switch unit) 371 having ports of 9.6 Gbps accommodates input lines exhibiting different transmission speeds via input buffer units 372, 373, 374. In this example, an input line #0 of an interface having a transmission speed of 2.4 Gbps and an input line #5 of an interface having a transmission speed of 4.8 Gbps, are accommodated as the input lines having different transmission speeds.

In this mode of accommodating the input lines, if none of speed control is done, it follows that the schedulers (SCH) 3721, 3731 perform scheduling for the respective input lines at a speed (herein, 9.6 Gbps) of the unit time, and that a transmission indication is sent at a speed of 9.6 Gbps to the input line "0 having a buffering capability as low as 2.4 Gbps and the input line #5 having a buffering capability of 4.8 Gbps. Namely, the input buffer units 372, 373 need a high-speed input buffer memories 3722, 3732.

(Scheduling at Input Line Speed)

Figure 40:
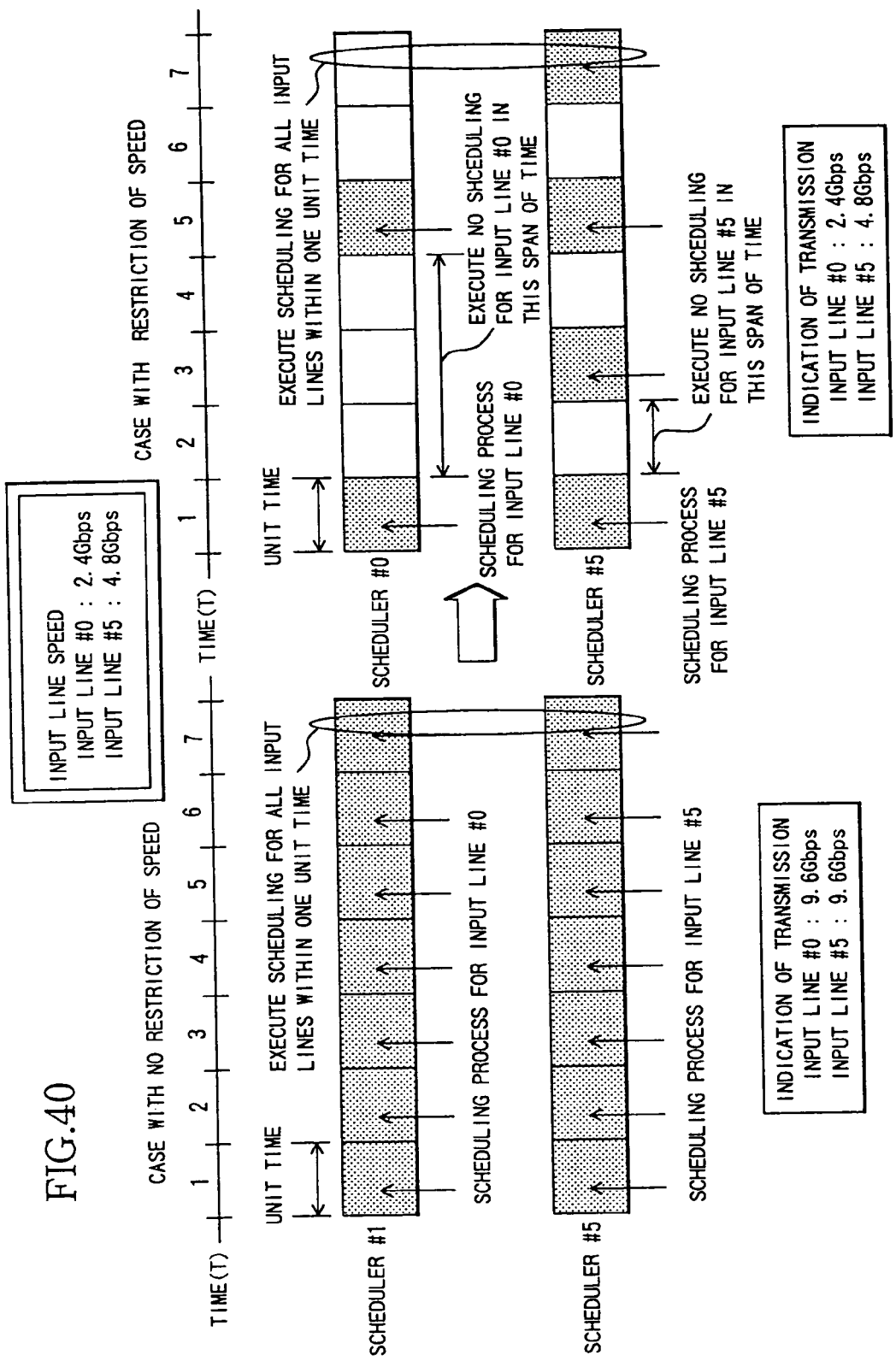
FIG. 40 is an explanatory diagram showing a scheduling process corresponding to an input line speed.

An example of how the scheduling at the input line speed is conducted, will be explained referring to FIG. 40. The scheduling for the input lines must be executed at a packet (cell) time interval or larger so as not to install the high-speed buffer memories in the input buffer units.

Input line #0: 4-packet time (=9.6 Gbps/2.4 Gbps)
Input line #5: 2-packet time (=9.6 Gbps/4.8 Gbps)

Supposing that the scheduling process for the input line #0 is executed when the time T=1, however, it is not a matter of question whether the allocation thereof is actually made as a result of the scheduling. In this case, the timer processing module (1) 362 (see FIG. 39) of the scheduler #0 starts measuring a predetermined interval, and notifies the scheduling processing module 364 of a scheduling stop signal. The measurement of the predetermined time can be attained by a simple counter circuit for incrementing a value of the counter at an interval of the packet time. Then, the scheduling stop signal is set when the scheduling process is executed, and released just when a predetermined measuring time elapses.

The predetermined time does not yet elapse when the time T=2, namely, the scheduling stop signal assumes a Low (0) level, and hence the scheduling is unable to be done. Thus, the scheduling processing module 364 uses the scheduling stop signal as an enable signal of the scheduling process, and does not execute the scheduling process when the stop signal takes the Low level.

The scheduling stop signal on the input line #0 is released when the time T=5, i.e., assume a High (1) level, and therefore the scheduling processing module is capable of scheduling the input line #0 when the time T=5. Under the control described above, a scheduling processing cycle of the input line #0 becomes a 4-packet time interval. Referring to FIG. 40, time slots when the scheduling process is executed are indicated by hatching.

The processing for the input line #5 is the same as what has been described above. Supposing that the scheduling process for the input line #5 is executed when the time T=1, the timer processing module (1) 362 of the scheduler #5 starts measuring the predetermined time and transmits the scheduling stop signals till an elapse of the time T=2. The scheduler 364 does not perform scheduling for the input line #5 when the time T=2.

As discussed above, during the predetermined time since the scheduling process has been executed, the timer processing module (1) 362 notifies the scheduling processing module 364 of the scheduling stop signal, because of the scheduling trigger being given at a cycle of the input line speed, and a trigger for a read-out indication to the input buffer unit from the scheduler 36 inevitably becomes the input line speed. Consequently, what is provided as a sufficient requirement in the input buffer unit may be only the buffer memory capable of reading at the same speed as the input line speed.

Figure 41:
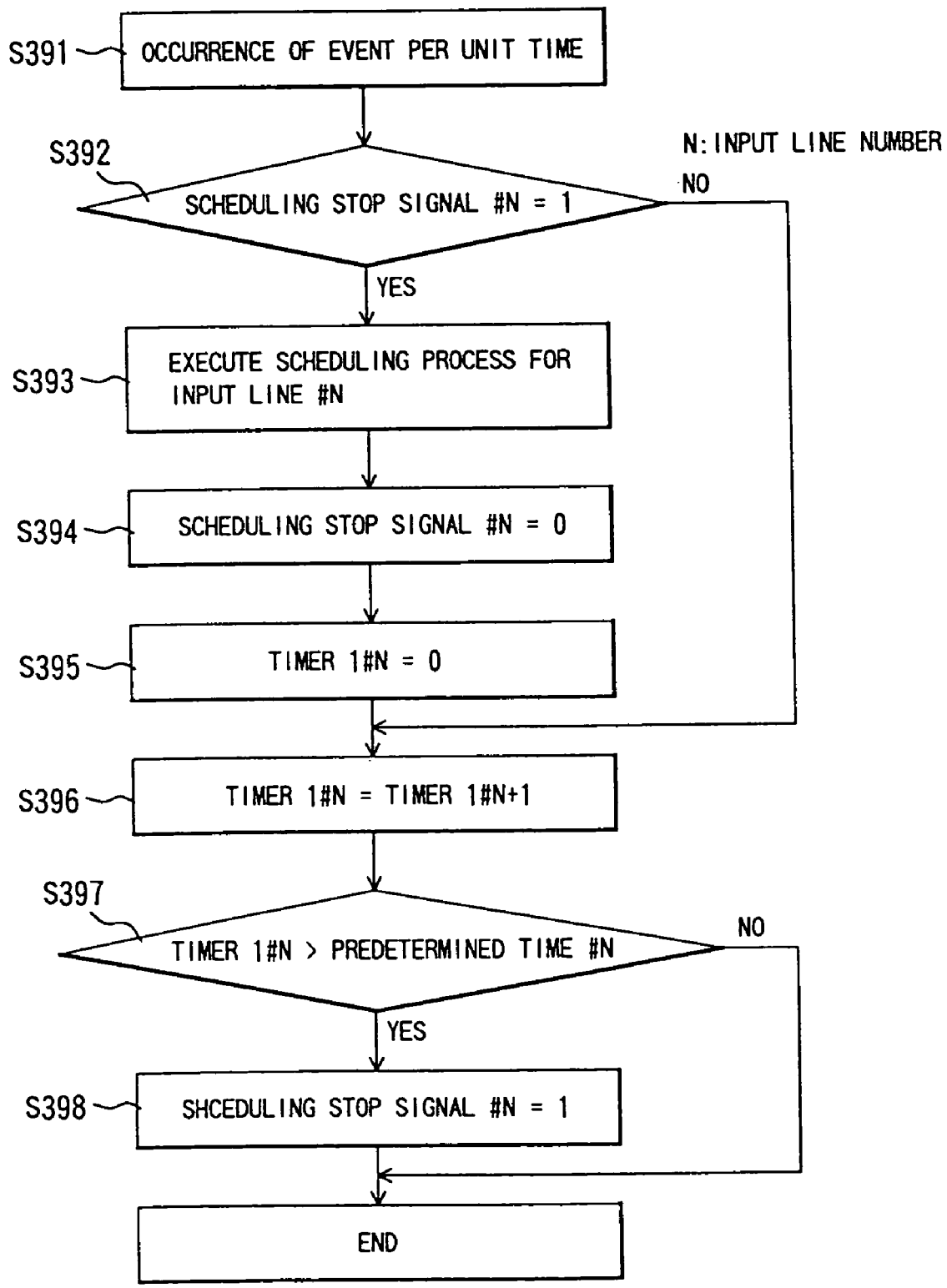
FIG. 41 is an explanatory diagram showing the scheduling process corresponding to the input line speed.

FIG. 41 shows processing steps S391 through S398 of the scheduling corresponding to the input line speed. Steps S392 through S395 are the scheduling processes. When an even occurs at an interval of the unit time (S391), a present scheduling state is judged with a logic of the scheduling stop signal in S392. If judged to be [1] as a result thereof, viz., if in a possible-of-scheduling state, the processes from S393 down to S395 are executed. On the other hand, if judged to be [0] (which indicates an impossible-of-scheduling state), the scheduling process is not executed.

In the case where the judged result is [1], the scheduling process for a predetermined input line is implemented in S393, and a timer (timer 1) for managing the scheduling stop signal and a scheduling stop interval is set to [0]. Steps S396 to S398 are processes of updating the scheduling stop signal. A timer value is incremented at an interval of the packet time (S396), and it is judged whether or not the incremented value exceeds a predetermined time (S397). If the timer value exceeds the predetermined time, the scheduling stop signal is set to [1] (S398).

Thus, with this timer process, the scheduling stop signal is set to [0] during the predetermined time (=1/input line speed). As a result, no scheduling process is executed during the predetermined time, and hence it is possible to effect the control so that the scheduling process is not executed at a speed equal to or higher than the input line speed.

(Necessity for Output Line Speed Scheduling)

Figure 42:
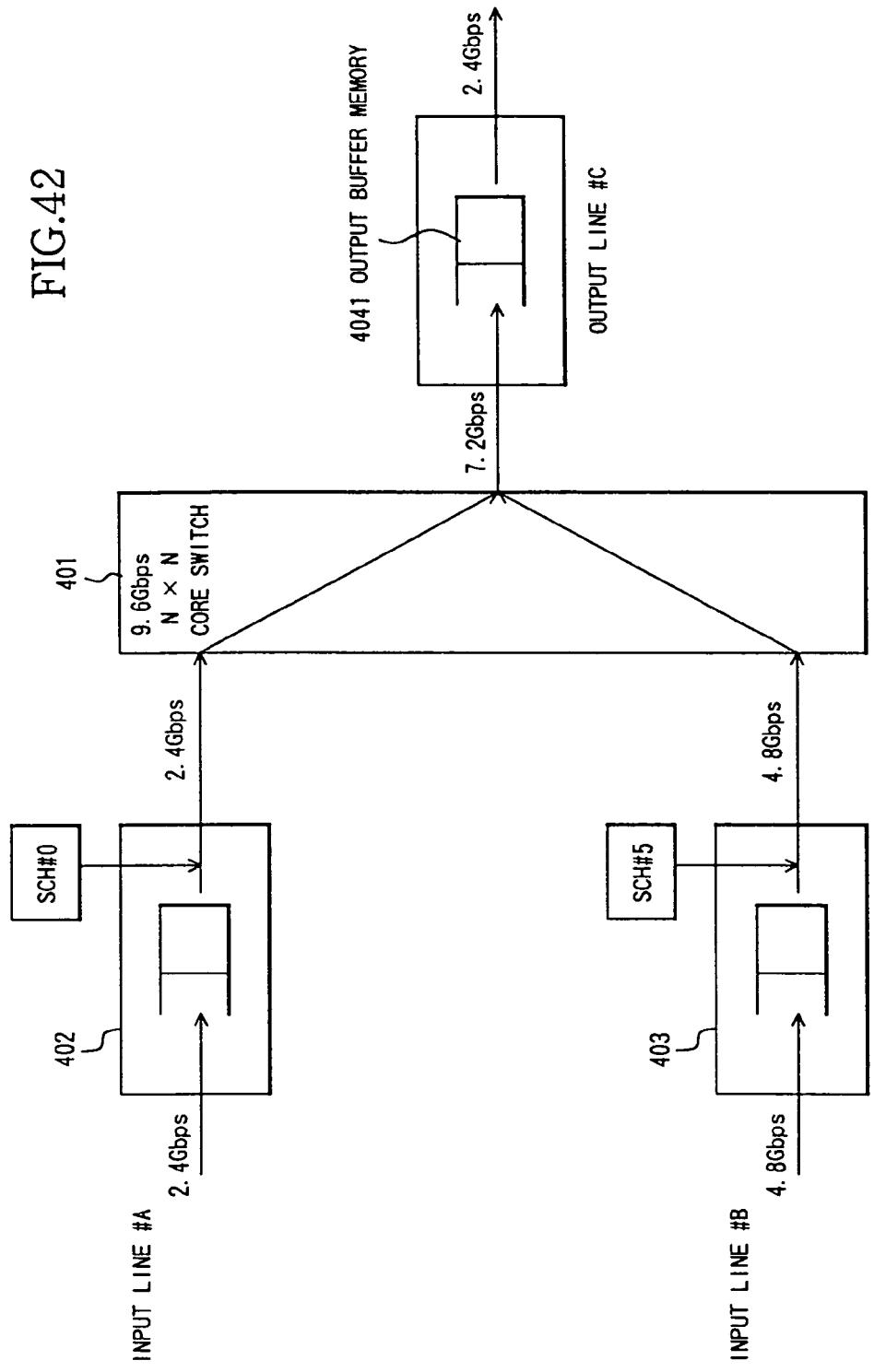
FIG. 42 is an explanatory diagram showing a problem in terms of an output traffic.

FIG. 42 shows an example in which the packets are forwarded to an output line #C having a transmission speed 2.4 Gbps via a core switch 401 from an input line #A having a transmission speed 2.4 Gbps and from an input line #B having a transmission speed 4.8 Gbps. In this case, the packets are forwarded at the transmission speed of 2.4 Gbps to the core switch 401 from the input buffer unit 402 corresponding to the input line #A. Then, the packets are forwarded at the transmission speed of 4.8 Gbps to the core switch 401 from an input buffer unit 403 corresponding to the input line #B, with the result that the packets flow at a traffic of totally 7.2 Gbps to an output buffer memory 4041 of an output buffer unit 404 corresponding to the output line #C.

The output buffer unit 404 corresponding to the output line #C, which receives the traffic flow on the order of 7.2 Gbps, has a reading speed as low as 2.4 Gbps, and the large-capacity output buffer memory 4041 is needed for avoiding the packet discard.

(Operation for Establishing Scheduling Process at Output Line Speed)

A scheduling operation corresponding to the output line speed will be described referring to FIG. 43. A decrease in buffer memory capacity on the output side must involve restraining a traffic inflow to that output line down to an output line speed or lower. Accordingly, in this example, it is required that a scheduling allocation interval to each of the output lines be set to the following packet time in order to control an interval at which the packets are forwarded to one single output line so that this interval becomes the output line speed in all the input lines.

Output line #2: 2-packet time (=9.6 Gbps/4.8 Gbps)
Output line #4: 4-packet time (=9.6 Gbps/2.4 Gbps)

It is assumed that the scheduling process for the input line #1 be executed and the output line #2 be established when the time T=2. In this case, the scheduler for the input line #1 notifies all other schedulers that the output line #2 has been established. Then, each of the schedulers receiving this notification starts a measurement of the timer, corresponding to the output line (#2 in this example), of the self timer processing module (1), and notifies the self scheduling processing module of an allocation stop signal. As by the timer processing module (1), a timer processing module (2) is also capable of measuring the predetermined time by use of a counter circuit for making an increment at the interval of the packet time.

The allocation stop signal is set when the scheduling allocation is implemented or when notified of the establishment from other schedulers, and is released after an elapse of the predetermined time in the timer processing module (2). The scheduling processing module establishes forwarding to the output line that is not notified of this allocations top signal (i.e., not in a stop state).

When the time T=3 in this example, because of being notified of the allocation stop signal (Low level) of the output line #2, any schedulers can not make the allocation to the output line #2. Then, when the time T=4, the measurement of the timer processing module (2) is completed, and the allocation stop signal to the output line #2 is canceled. As a result, in the input line #5 when the time T=4, the allocation to the output line #2 is newly made. Referring to FIG. 43, the allocation to the output line #2 is indicated by oblique lines.

On the other hand, the allocation to the output line #4 also is executed in the same steps. When the time T=2, the scheduling process for the input line #5 is carried out. When establishing the output line #4, all the schedulers are notified of the establishment of the output line #4. As described above, the timer processing module (2) of each scheduler starts measuring the predetermined time with respect to the output line #4, and notifies the scheduling processing module of the allocation stop signal of the output line #4. Referring again to FIG. 43, the allocation to the output line #4 is indicated by hatching.

As discussed above, in this example, when the time T=3, the allocations to the output lines #2 and #4 cannot be effected. Further, when the time T=4 and T=5, there is made no allocation to the output line #4.

Figure 43:
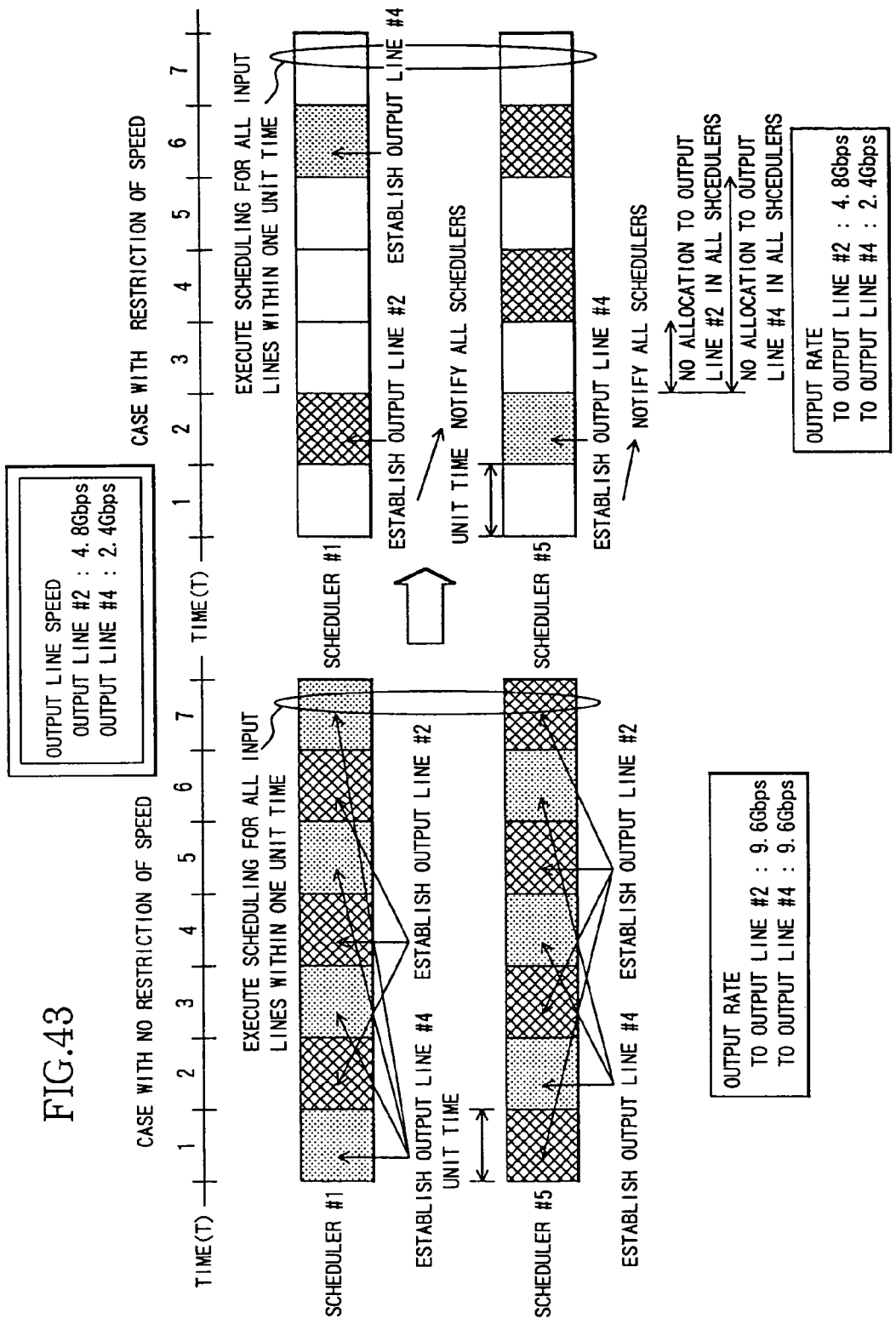
FIG. 43 is an explanatory diagram showing a scheduling process corresponding to an output line speed.

Looking individually at the portions indicated by the oblique line and hatching in FIG. 43, a trigger for the allocation to the output line #2 has an interval of at least two- or more-packet time, and a trigger for the allocation to the output line #4 has an interval of four- or more-packet time. This time interval is equivalent to an interval at which the packet arrives at each output line, and implies that the traffic to each outgoing route can be restrained to the output line speed or lower.

FIG. 44 shows steps S4201 through S4214 of the scheduling corresponding to the output line speed. An initializing sequence of allocation stop timer processes consists of S4204 through S4204. Upon an occurrence of event at the interval of the unit time (S4201), when notified of the establishment from other schedulers in S4202, a self-scheduler allocation stop signal is set to [0] (S4203), and the timer (timer 2) is set to [0] (S4204). If not notified of the establishment, none of those processes is done.

Steps S4205 through S4208 are the scheduling process and an initializing sequence of the allocation stop timer processes after the scheduling process. In S4205, the scheduling process is executed to establish a forwarding line among the output line where a self-scheduler allocation stop signal #N_M (N: input line number, M: output line number) is set to [1]. Then, after the scheduling process has been established, an allocation stop signal #N_M (N: established input line number, M: established output line number) corresponding to the established output line and the corresponding timer (N: established input line number, M: established output line number), are set to [0] (S4207, S4208).

A sequence of updating the scheduling stop signal at a next time includes S4209 through S4213. It is judged in S4209 whether or not the processes for the number (K) of the input lines are finished. After finishing the process of updating all the input lines, an output line number m is set to [0] (S4214), and the processing comes to an end. In FIG. 44, the processes are executed in series and may also be implemented in parallel. Step 4210 is a counter process of counting as to whether or not the processes for the number (K) of the input lines are carried out, and is not required when the parallel processing is implemented.

Steps S4211 to S4213 form a sequence of updating the scheduling stop signal. In S4211, a timer value is incremented at the interval of the packet time (S4211), and it is judged whether or not the incremented value exceeds a predetermined time (=1/output line rate) (S4212). It is judged in S4212 that the incremented value exceeds the predetermined time, the corresponding allocation stop signal is set to [1] (S4213).

Thus, from S4211 to s4213, the allocation stop signal is set to [0] during the predetermined time (=1/output line rate). In S4205, each scheduler performs the control so that there is made neither the allocation to each output line at the output line rate or higher, nor the allocation to the output line in which the allocation stop signal is set to [0].

[Architecture and Operation of Third Scheduler]

Figure 45:
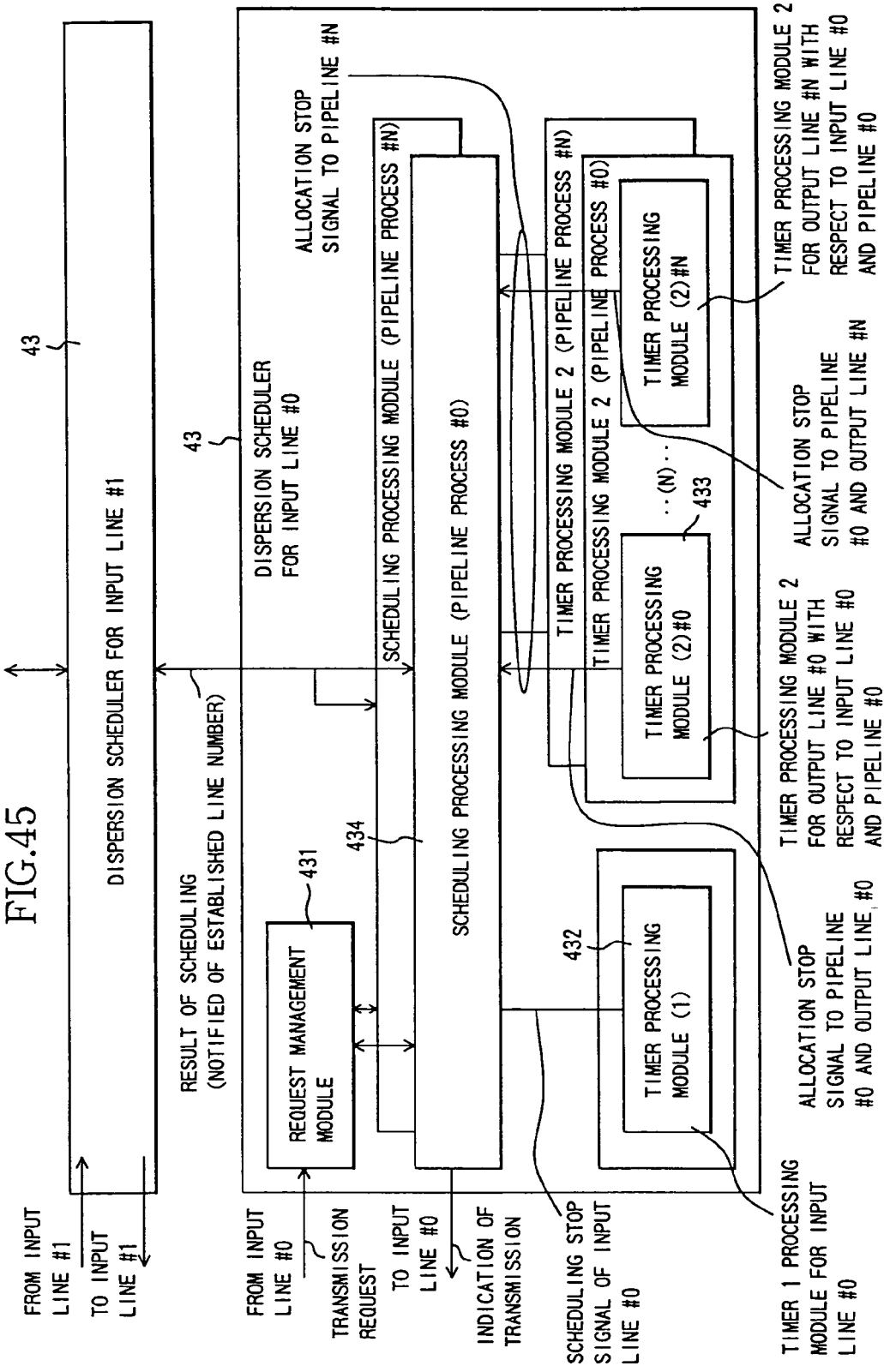
FIG. 45 is a block diagram showing an architecture of a third scheduler.

FIG. 45 shows an architecture of the scheduler of the input buffer unit in the packet switch in one embodiment of the present invention. Referring to FIG. 45, a scheduler 43 includes a scheduling processing module 434 and a timer processing module (2) 433 for every pipeline process. A request management module 431 and a timer processing module (1) 432 operate in the same way as the second scheduler does.

Given next is an explanation of a scheduling mode corresponding to the line speed when the scheduling is conducted in pipeline, wherein one scheduling process takes an M-packet time.

Figure 46:
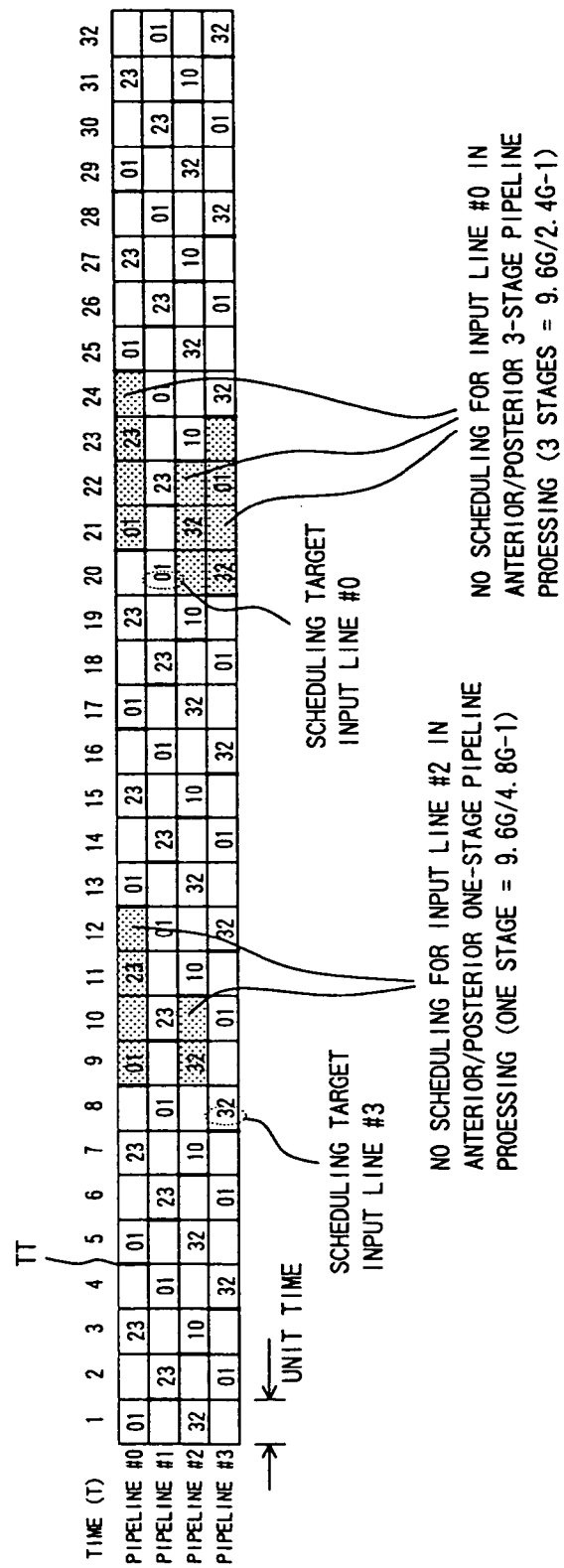
FIG. 46 is an explanatory diagram showing the scheduling process corresponding to the input line speed.

FIG. 46 shows a pipeline sequence. Referring to FIG. 46, a numeral framed in square corresponding to the time (T) indicates a scheduling target input line number. It is herein assumed that a 4×4 switch be provided, and an example of completing one scheduling in a 4-packet time, will be explained. A pipeline architecture having a 4-fold parallelism is taken for obtaining a result at the interval of the packet time by executing the scheduling process spending the 4-packet time.

Each scheduler 43 executes the scheduling process in a position shown by a self input line number. For example, when the time T=1, the scheduling process is conducted in a way of executing a pipeline process #0 of the input line #0, the pipeline process #0 of the input line #1, a pipeline process #2 of the input line #3 and the pipeline process #2 of the input line #2. A bold line TT in FIG. 46 represents that the scheduler 43 notifies the input buffer memory of a forwarding indication, and implies that when the time T=4, the corresponding input buffer memory is notified of a result of scheduling the pipeline processes #0 when the time T=1 to 3. It is also indicated that the scheduling process is not implemented at the time having a blank.

(Scheduling Allocation Method Corresponding to Input Line Speed)

In the pipeline architecture shown in FIG. 46, it is presumed that the scheduling process for the input line #3 be executed in the pipeline process #3 when the time T=, e.g., 8. The input line #3 has a line speed o the order of 4.8 Gbps, and hence the scheduling interval must be restricted to a 2-packet time (scheduling speed/input line speed=9.6 Gbps/ 4.8 Gbps). The input buffer memory is notified of a result established herein when the time T=11, and it is therefore required that the read-out indication to the input line #3 is not given when the time T=0 and T=12.

Hence, after executing the scheduling process when the time T=8, if the scheduling process for the input line #3 is carried out so as not to execute the scheduling process for the input line #3 within the pipeline process of N-stages (N is obtained by Scheduling Speed/Input Line Speed, and is herein "1") anterior and posterior to that pipeline processing stage, one front state and one rear stage, i.e., the pipeline #2 and the pipeline #0, are notified of the impossible-of-scheduling signal with respect to the input line #3. In FIG. 46, the hatching represents an impossible-of-scheduling section with respect to the input line #3.

Similarly, in the case of the input line #0 also, the pipeline processing N-stages (N=3) anterior and posterior thereto are notified of the scheduling stop signal since the input line #0 has subjected to the scheduling process, thereby effecting the control so that the scheduling for the input line "0 is not conducted.

Thus, when taking the pipeline architecture also, the N-stages of scheduling processing modules 434 in front and rear of that pipeline stage are notified of the scheduling stop signal, whereby the scheduling corresponding to the input line speed can be performed.

(Scheduling at Input Line Speed)

Figure 47:
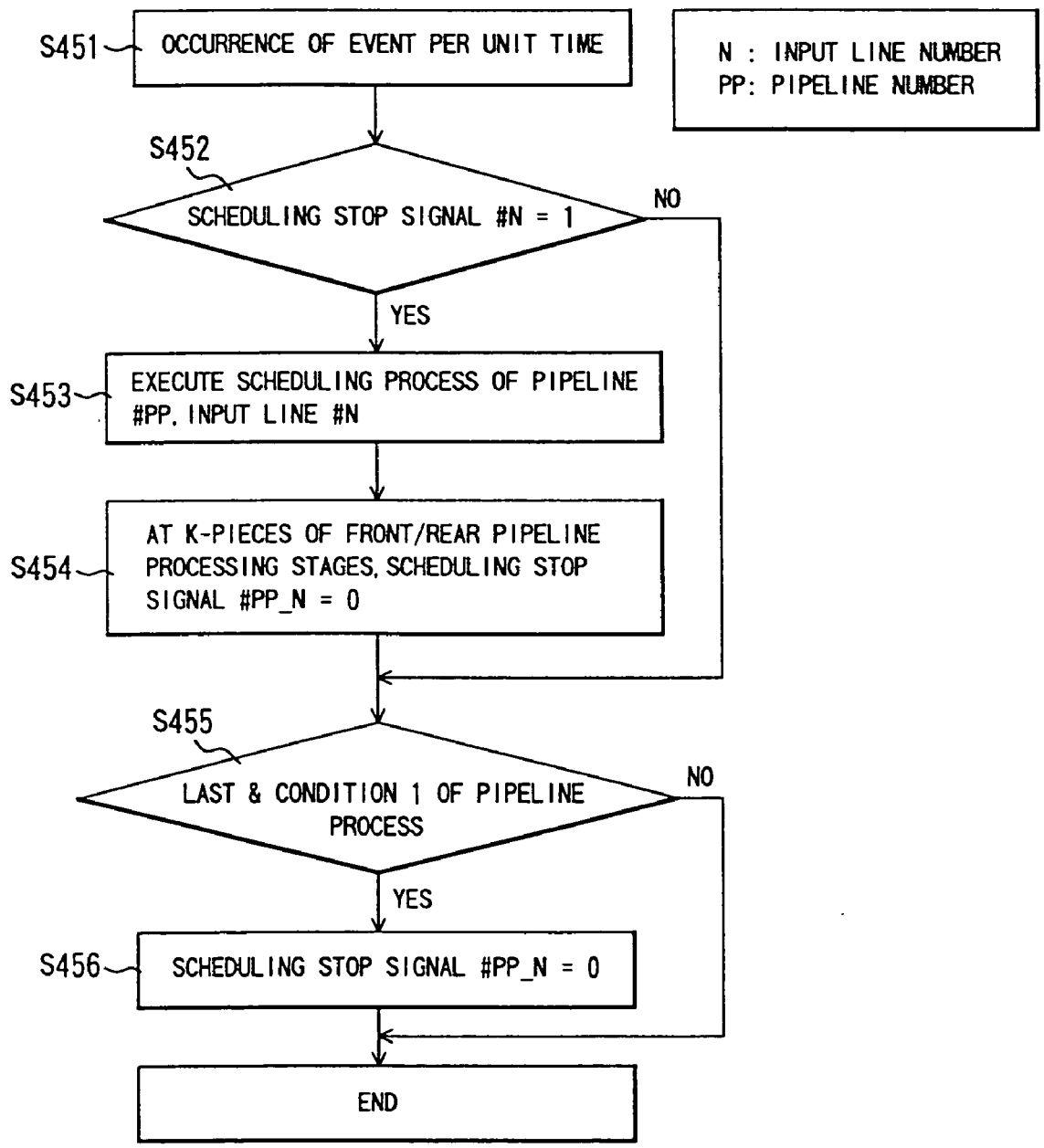
FIG. 47 is an explanatory diagram showing the scheduling process corresponding to the input line speed.

FIG. 47 is a flowchart showing processing steps S451 through S456 of the scheduling corresponding to the input line speed. Referring to FIG. 47, a condition 1 represents a scheduling cycle at which the stop signal is transmitted. For example, it is assumed that the scheduling for the input line #1 having a transmission speed of 622 Mbps when the time T=20 in FIG. 46. In this case, as discussed above, the halt of the scheduling must be done during the pipeline processes of 16 stages (9.6 Gbps/622 Mbps) before and after the scheduling established point.

Then, a stop pipeline cycle indicating how long a pipeline processing time the individual pipeline processing module (timer processing module) must wait for, is given by the following formula:

Stop Pipeline Cycle=$(FstPPL+K-PP)/PPLN$ where
FstPPL: a pipeline number with which the scheduling process is executed,
K: a scheduling speed/input line speed,
PP: a self-pipeline number, and
PPLN: a total pipeline number.

The respective stop pipeline cycles in this example are given such as:
Pipeline #0: (1+16−0)/4=4.25=4 cycles
Pipeline #1: (1+16−1)/4=4.00=4 cycles
Pipeline #2: (1+16−2)/4=3.75=3 cycles
Pipeline #3: (1+16−3)/4=3.50=3 cycles (Scheduling Allocation Method Corresponding to Output Line Speed)

Figure 48:
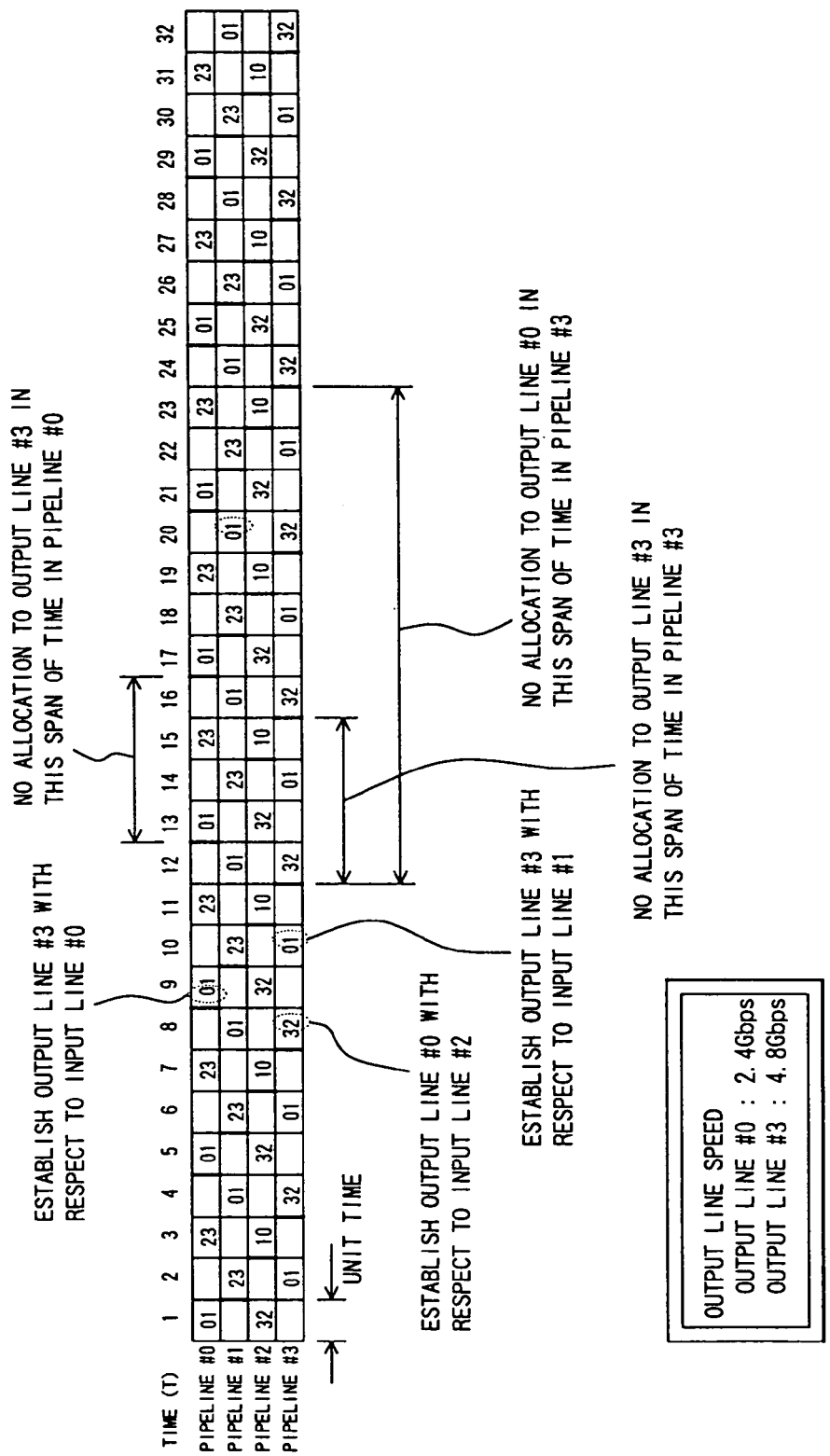
FIG. 48 is an explanatory diagram showing the scheduling process corresponding to the output line speed.

When taking the pipeline architecture, the control executed so as to keep an output speed independently for every pipeline process. The scheduling process corresponding to the output line speed will be explained referring to FIG. 48. For instance, when a result of the scheduling for the input line #2 in the pipeline process #3 when the time T=8 is established in the output line #0, during an N-pipeline cycle next to that pipeline cycle, no allocation to the output line #0 is made in the pipeline process #3. The line speed of the output line #2 is 2.4 Gbps, and hence the above N cycle is obtained by the following formula:

$N$=Scheduling Speed/Output Line Speed ($N$=9.6 Gbps/ 2.4Gbps=4)

In a case where the output line #3 is established in the scheduling process of the input line #1 as well as in the pipeline process #3 when the time T=10, the allocation to the output line #3 is not effected in the pipeline process #3 during next one cycle in the same way. Herein, the allocation to the same output line #3 is performed in the scheduling process for the input line #0 as well as in the pipeline process #0 also when the time T=9. As a result, the packets flows to the output line #3 consecutively when the time T=11 and T=12. In terms of a long cycle, however, the packets are forwarded at a rate of the output line speed on the average.

As discussed above, in the pipeline architecture, the allocation is implemented at the predetermined interval in every pipeline process, whereby the packets flows to the output line at the speed equal to or lower than the output line speed on the average. This may leads to a less capacity of the output buffer memory.

Figure 49:
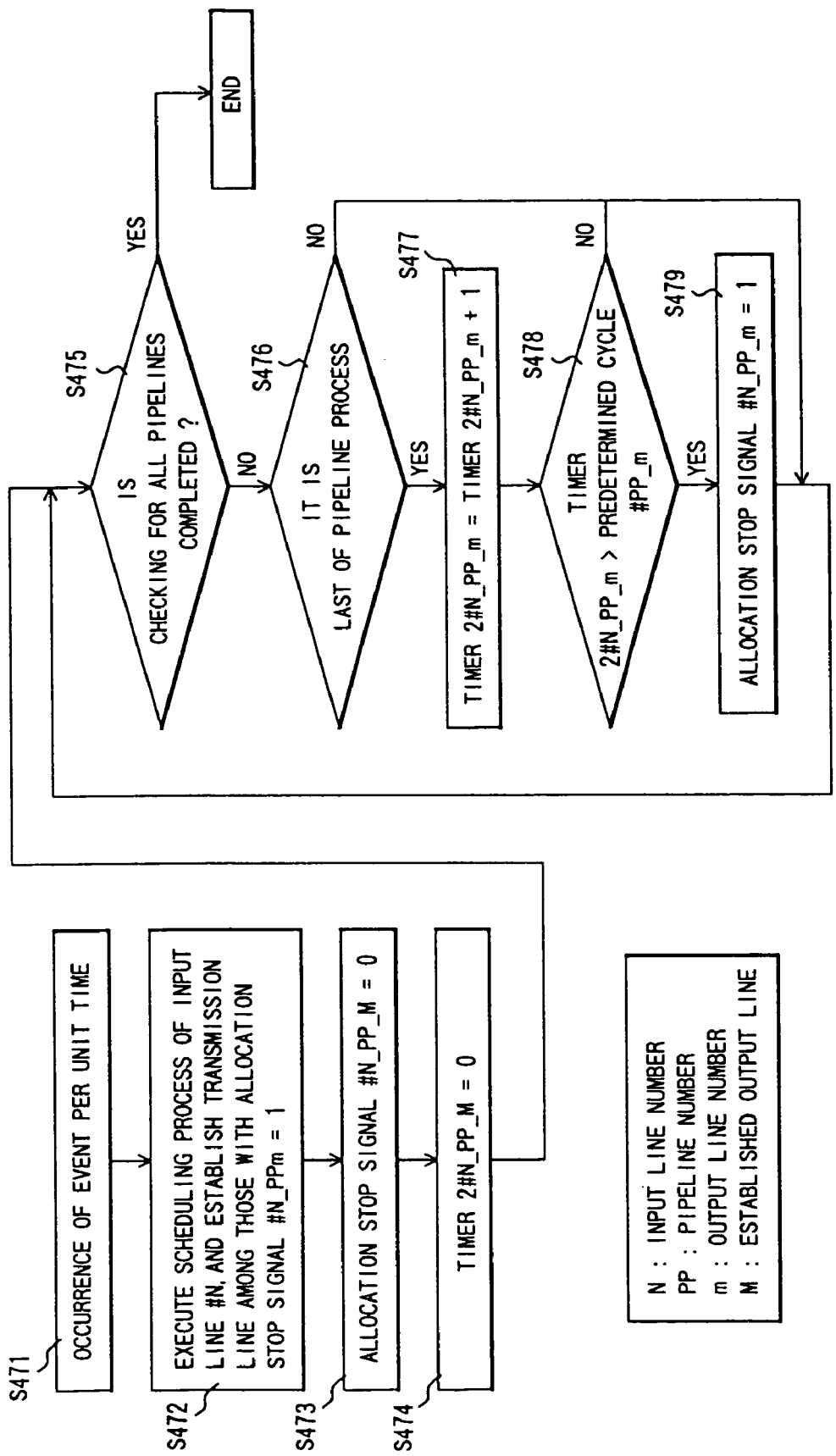
FIG. 49 is an explanatory diagram showing the scheduling process corresponding to the output line speed.

FIG. 49 is a flowchart showing processing steps S471 to S479 of the scheduling corresponding to the output line speed. Steps S472 through S474 are the scheduling process, an allocation stop signal process after the scheduling has been established, and a timer initializing sequence. Upon an occurrence of event at the interval of the unit time (S471), in S472, there is established a forwarding line among the output lines where the allocation stop signal is set to [1] with respect to a scheduling target input line at the present time. Then, the allocation stop signals corresponding to the established pipeline processing stage, input line and output line, are given, and the timer value is set to [0] (S473, S474).

Steps S475 to S479 form a process of updating the allocation stop signal. it is judged in S475 whether or not the processes for all the pipeline processing stages are finished. After completing the processes for all the pipeline processing stages, the processing comes to an end. Step S476 is a process of judging whether it is an end of the pipeline processing or not. Normally, if there are N-pieces of pipeline processing stages, one single pipeline process is competed in an N-unit time. This process is executed for judging a final time of each pipeline process. The final time may be judged when a counter value of the counter provided for every pipeline process comes to N, or the final time of the pipeline process may also be indicated from outside.

A process of updating the allocation stop signal consists of S477 through s479. A corresponding timer value is incremented at the final time of the pipeline process in S476 (S477), and it is judged whether or not this incremented value exceeds a predetermined cycle (=1/output line rate) (S478). If over the predetermined cycle, a corresponding allocation stop signal is set to [1].

Thus, from S477 to S479, during the predetermined cycle, the allocation stop signal is set to [0]. In S472 where the scheduling process of each pipeline processing stage is executed, the scheduler implements the control so that there is made neither the allocation to each output line at the output line rate or higher, nor the allocation to the output line in which the allocation stop signal is set to [0]. This control is done independently for every pipeline processing stage, thereby making it feasible to control so that the allocation is not made at the predetermined output line rate or higher on the average.

[Architecture and Operation of Fourth Scheduler]

According to the third scheduler, the timer processing module (2) starts the timer measurement upon the scheduling allocation as a trigger, and the measurement is carried out after reading the packet. Therefore, as viewed at an entering port of the output line, the traffic exhibits a low burst characteristic. There is, however, a necessity for giving the different schedulers within the same pipeline process a piece of information as to how much the stop signals should be transmitted onwards. Thus, it is required that the adjacent scheduler be notified of the information.

Figure 50:
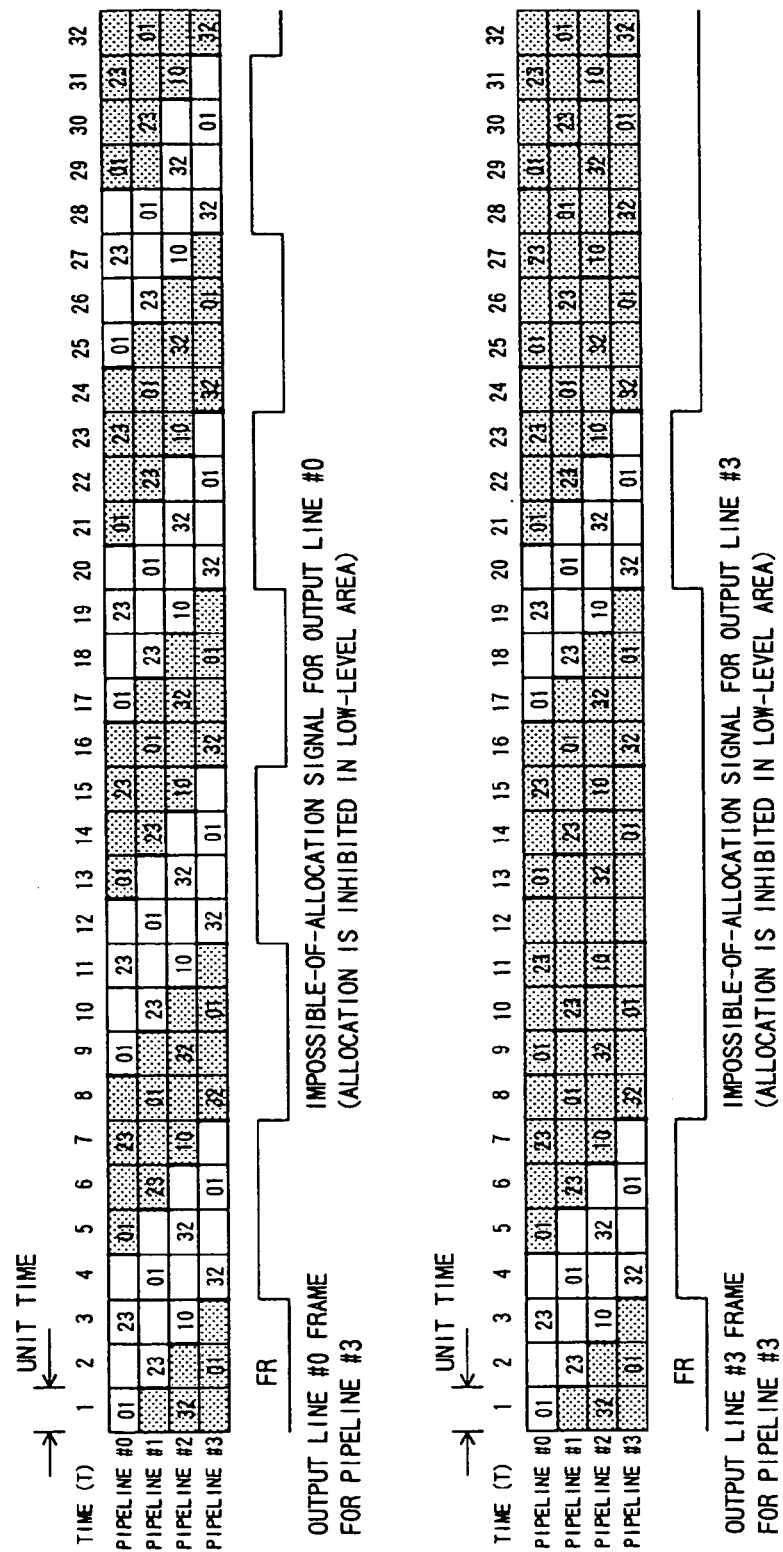
FIG. 50 is an explanatory diagram showing the scheduling process corresponding to the output line speed in a forth scheduler.

In a fourth scheduler which will be described next, a frame signal common to all the scheduler is provided, and the allocation to the output line is conducted in accordance with this frame signal in order to reduce that notification of the information. FIG. 50 shows a format of the frame signal. note that an architecture of the fourth scheduler is the same as the third scheduler.

(Scheduling Process Corresponding to Output Line Speed)

Each scheduler has a fixed frame signal corresponding to the output line speed, of which a phase is shifted at an interval of one-packet time for every pipeline process. A frame signal FR in FIG. 50 serves for the pipeline process #3. A High level area of this signal is set as an area where the scheduling allocation to the output line can be made, and a Low level area is set as a stop area, thereby making unnecessary the transmission of the information between the schedulers. Referring again to FIG. 50, the low level area of the frame signal in each pipeline process is indicated by hatching. As can be understood from FIG. 50, however, N-pieces (N: the number of pipelines) of allocations can be made consecutively to one single output line, and hence N-pieces of packets are consecutively forwarded, resulting in an enhanced burst characteristic of the traffic flow.

[Modified Example]

In the embodiment discussed above, the input line numbers in the pipeline processes are arranged in one row but may also be arranged in any forms. Further, in accordance with the embodiment discussed above, the scheduling corresponding to the input line speed and the scheduling corresponding to the output line speed, have been individually explained. it is, however, possible to execute the scheduling corresponding to both of the I/O line speeds by determining the scheduling target input line in accordance with the input line speed and establishing the scheduling allocation in accordance with the output line speed.

Figure 51:
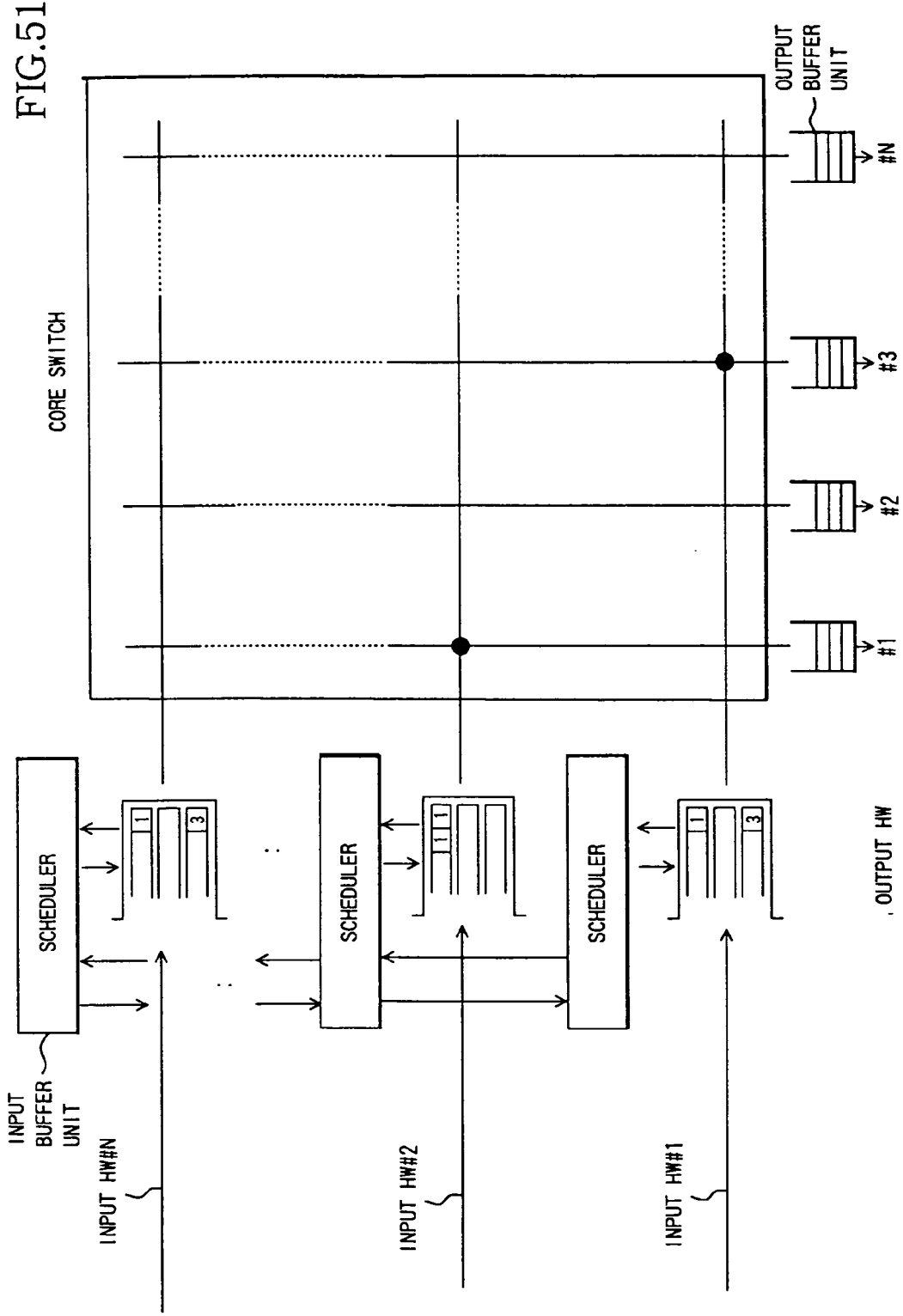
FIG. 51 is a block diagram showing an example of an architecture of an I/O buffer type switch.

Moreover, the input buffer type switch has been described in details in the embodiment discussed above. The present invention can, however, be applied to an I/O buffer type switch (see FIG. 51) applying the same architecture as the input buffer unit to the output buffer unit.

Although only a few embodiments of this invention have been described in detail above, those skilled in the art will readily appreciate that many modifications are possible in the preferred embodiments without departing from the novel teachings and advantages of this invention. Accordingly, all such modifications are intended to be included within the scope of this invention as defined by the following claims.

What is claimed is:

1. A packet switch comprising:
an input buffer memory unit having a logic queue corresponding to an output line;
a control module for a first pointer indicating a scheduling start input line;
a control module for a second pointer indicating a scheduling start output line of scheduling target outlines;
a request management control module for retaining transmission request data about a desired output line;
a scheduling processing module for starting a retrieval from within plural pieces of transmission request data from the output line indicated by the second pointer, and selecting an output line that is not ensured by other input lines;
a packet buffer memory unit for temporarily storing a plurality of fixed-length packets and sequentially outputting the fixed-length packets;
a common switch unit for switching the fixed-length packets outputted from said packet buffer memory unit; and
an address management unit for segmenting an address of said packet buffer memory unit into fixed-length blocks for a plurality of packets, and managing the address on a block basis.

2. A packet switch according to claim 1, wherein said address management unit manages sequence numbers pointing to the addresses in the block and flags indicating which data of the addresses pointed to by each sequence number in the block a multicast is completed with.

3. A packet switch according to claim 1, wherein said packet buffer memory executes time-division-multiplexing of the fixed-length packets of the plurality of input lines onto one signal input line in an established manner, and includes memories disposed in parallel corresponding to every input line before being multiplexed, and
the writing and reading to and from said respective memories are executed in parallel.

4. A packet switch according to claim 1, wherein said common switch unit is based on a bit-slice architecture and has slice switches of which at least one slice switch is used as a redundant switch, and
switching to said redundant slice switch can be thereby done every time said slice switch receives maintenance and comes to a fault.

5. A packet switch according to claim 1, wherein said packet buffer memory unit is set dual on the input side and the output side of said common switch unit,
packet data are distributed to said packet buffer memory unit disposed on the output side along a route preset in said common switch unit, and
the switching can be thereby done when in maintenance and in fault.

6. A packet switch comprising:
an input buffer memory unit having a logic queue corresponding to an output line;
a control module for a first pointer indicating a scheduling start input line;
a control module for a second pointer indicating a scheduling start output line of scheduling target outlines;
a request management control module for retaining transmission request data about a desired output line;
a scheduling processing module for starting a retrieval from within plural pieces of transmission request data from the output line indicated by the second pointer selecting an output line that is not ensured by other input lines;
a packet buffer memory unit for temporarily storing a plurality of fixed-length packets and sequentially outputting the fixed-length packets;
a common switch unit for switching the fixed-length packets outputted from said packet buffer memory unit; and
an address management unit for temporarily writing the packets to a multicast-oriented memory for multicasting to a plurality of output lines, reading the packets corresponding to the number of multicasts, with a scheme to distribute the packets to a desired FIFO memory, retaining the number of multicasts and addresses thereof according to the addresses after being distributed in order to logically actualize the distribution of not the packets but by use of only the addresses, and thus making an address management of said packet buffer memory unit.

7. A packet switch according to claim 6, wherein said packet buffer memory unit has a large-capacity memory that is high-speed accessible only when in a burst access and is disposed at a front stage, and a high-speed random accessible memory disposed at a rear stage,
only said rear-stage memory is normally used,
when said rear-stage memory is full of packet data, the packet data are temporarily stored in said front-stage memory, and
the packet data are transferred back to said rear-stage memory when a free area comes out.

8. A packet switch according to claim 6, wherein said packet buffer memory unit has a queue memory using a small-capacity high-speed random accessible memory disposed at a front stage, and a large-capacity low-speed access memory disposed in parallel at a rear stage,
a writing operation to said rear-stage memory is effected in parallel from said front-stage memory, and
a reading operation from said rear-stage memory is effected by selecting only a queue memory with no conflict.

9. A packet switch according to claim 6, wherein said packet buffer memory unit has a queue memory using a small-capacity high-speed random accessible memory disposed at a front stage, and a queue memory using a large-capacity memory that is high-speed accessible only when in a burst access and disposed at a rear stage,
a writing operation to said rear-stage memory is effected batchwise just when a plurality of packets are accumulated in said front-stage memory, and
the plurality of packets are read batchwise from said rear-stage memory.

10. A packet switch according to claim 6, wherein said packet buffer memory executes time-division-multiplexing of the fixed-length packets of the plurality of input lines onto one signal input line in an established manner, and includes memories disposed in parallel corresponding to every input line before being multiplexed, and
the writing and reading to and from said respective memories are executed in parallel.

11. A packet switch according to claim 6, wherein said common switch unit is based on a bit-slice architecture and has slice switches of which at least one slice switch is used as a redundant switch, and
switching to said redundant slice switch can be thereby done every time said slice switch receives maintenance and comes to a fault.

12. A packet switch according to claim 6, wherein said packet buffer memory unit is set dual on the input side and the output side of said common switch unit,
packet data are distributed to said packet buffer memory unit disposed on the output side along a route preset in said common switch unit, and
the switching can be thereby done when in maintenance and in fault.

13. A packet switch according to claim 6, wherein schedulers each including said control modules of the first and second pointers, said request management control module and said scheduling processing module, are disposed in dispersion,
a switch unit for selecting scheduling data between adjacent input buffer units among said input buffer units including said input buffer memory units, is further provided, and
the switching can be thereby done when in maintenance and in fault.

14. A packet switch comprising:
an input buffer memory unit having a logic queue corresponding to an output line;
a control module for a first pointer indicating a scheduling start input line;
a control module for a second pointer indicating a scheduling start output line of scheduling target outlines;
a request management control module for retaining transmission request data about a desired output line;
a scheduling processing module for starting a retrieval from within plural pieces of transmission request data from the output line indicated by the second pointer, and selecting an output line that is not ensured by other input lines;
a packet buffer memory unit having, a large-capacity memory that is high-speed accessible only when in a burst access and is disposed at a front stage, and a high-speed random accessible memory disposed at a rear stage, for temporarily storing a plurality of fixed-length packets and sequentially outputting the fixed-length packets, wherein only said rear-stage memory is normally used, when said rear-stage memory is full of packet data, the packet data are temporarily stored in said front-stage memory, and the packet data are transferred back to said rear-stage memory when a free area comes out,
a common switch unit for switching the fixed-length packets outputted from said packet buffer memory unit; and
an address management unit for segmenting an address of said packet buffer memory unit into fixed-length blocks for a plurality of packets, and managing the address on a block basis.

15. A packet switch comprising:
an input buffer memory unit having a logic queue corresponding to an output line;
a control module for a first pointer indicating a scheduling start input line;
a control module for a second pointer indicating a scheduling start output line of scheduling target outlines;
a request management control module for retaining transmission request data about a desired output line;
a scheduling processing module for starting a retrieval from within plural pieces of transmission request data from the output line indicated by the second pointer, and selecting an output line that is not ensured by other input lines;

a packet buffer memory unit having a queue memory using a small-capacity high-speed random accessible memory disposed at a front stage, and a large-capacity low-speed access memory disposed in parallel at a rear stage, for temporarily storing a plurality of fixed-length packets and sequentially outputting the fixed-length packets, wherein a writing operation to said rear-stage memory is effected in parallel from said front-stage memory, and a reading operation from said rear-stage memory is effected by selecting only a queue memory with no conflict, a common switch unit for switching the fixed-length packets outputted from said packet buffer memory unit; and an address management unit for segmenting an address of said packet buffer memory unit into fixed-length blocks for a plurality of packets, and managing the address on a block basis.

16. A packet switch comprising:

an input buffer memory unit having a logic queue corresponding to an output line;

a control module for a first pointer indicating a scheduling start input line;

a control module for a second pointer indicating a scheduling start output line of scheduling target outlines;

a request management control module for retaining transmission request data about a desired output line;

a scheduling processing module for starting a retrieval from within plural pieces of transmission request data from the output line indicated by the second pointer, and selecting an output line that is not ensured by other input lines;

a packet buffer memory unit having a queue memory using a small-capacity high-speed random accessible memory disposed at a front stage, and a queue memory using a large-capacity memory that is high-speed accessible only when in a burst access and disposed at a rear stage, for temporarily storing a plurality of fixed-length packets and sequentially outputting the fixed-length packets, wherein a writing operation to said rear-stage memory is effected batchwise just when a plurality of packets are accumulated in said front-stage memory, and the plurality of packets are read batchwise from said rear-stage memory, a common switch unit for switching the fixed-length packets outputted from said packet buffer memory unit; and an address management unit for segmenting an address of said packet buffer memory unit into fixed-length blocks for a plurality of packets, and managing the address on a block basis.

17. A packet switch comprising:

an input buffer memory unit having a logic queue corresponding to an output line;

a control module for a first pointer indicating a scheduling start input line;

a control module for a second pointer indicating a scheduling start output line of scheduling target outlines;

a request management control module for retaining transmission request data about a desired output line;

a scheduling processing module for starting a retrieval from within plural pieces of transmission request data from the output line indicated by the second pointer, and selecting an output line that is not ensured by other input lines;

a packet buffer memory unit for temporarily storing a plurality of fixed-length packets and sequentially outputting the fixed-length packets;

a common switch unit for switching the fixed-length packets outputted from said packet buffer memory unit; and an address management unit for segmenting an address of said packet buffer memory unit into fixed-length blocks for a plurality of packets, and managing the address on a block basis, wherein schedulers each including said control modules of the first and second pointers, said request management control module and said scheduling processing module, are disposed in dispersion, a switch unit for selecting scheduling data between adjacent input buffer units among said input buffer units including said input buffer memory units, is further provided, and the switching can be thereby done when in maintenance and in fault.

18. A packet switch comprising:

an input buffer memory unit having a logic queue corresponding to an output line;

a control module for a first pointer indicating a scheduling start input line;

a control module for a second pointer indicating a scheduling start output line of scheduling target outlines;

a request management control module for retaining transmission request data about a desired output line;

a scheduling processing module for starting a retrieval from within plural pieces of transmission request data from the output line indicated by the second pointer, and selecting an output line that is not ensured by other input lines;

a packet buffer memory unit for temporarily storing a plurality of fixed-length packets and sequentially outputting the fixed-length packets;

a common switch unit for switching the fixed-length packets outputted from said packet buffer memory unit; and an address management unit for performing an address management of said packet buffer memory unit, wherein said packet buffer memory unit has a large-capacity memory that is high-speed accessible only when in a burst access and is disposed at a front stage, and a high-speed random accessible memory disposed at a rear stage, only said rear-stage memory is normally used, when said rear-stage memory is full of packet data, the packet data are temporarily stored in said front-stage memory, and the packet data are transferred back to said rear-stage memory when a free area comes out.

19. A packet switch according to claim 18, wherein said common switch unit is based on a bit-slice architecture and has slice switches of which at least one slice switch is used as a redundant switch, and switching to said redundant slice switch can be thereby done every time said slice switch receives maintenance and comes to a fault.

20. A packet switch according to claim 18, wherein said packet buffer memory unit is set dual on the input side and the output side of said common switch unit, packet data are distributed to said packet buffer memory unit disposed on the output side along a route preset in said common switch unit, and the switching can be thereby done when in maintenance and in fault.

21. A packet switch according to claim 18, wherein schedulers each including said control modules of the first and second pointers, said request management control module and said scheduling processing module, are disposed in dispersion,
- a switch unit for selecting scheduling data between adjacent input buffer units among said input buffer units including said input buffer memory units, is further provided and
- the switching can be thereby done when in maintenance and in fault.

22. A packet switch comprising:
- an input buffer memory unit having a logic queue corresponding to an output line;
- a control module for a first pointer indicating a scheduling start input line;
- a control module for a second pointer indicating a scheduling start output line of scheduling target outlines;
- a request management control module for retaining transmission request data about a desired output line;
- a scheduling processing module for starting a retrieval from within plural pieces of transmission request data from the output line indicated by the second pointer, and selecting an output line that is not ensured by other input lines;
- a packet buffer memory unit for temporarily storing a plurality of fixed-length packets and sequentially outputting the fixed-length packets;
- a common switch unit for switching the fixed-length packets outputted from said packet buffer memory unit; and
- an address management unit for performing an address management of said packet buffer memory unit,
- wherein said packet buffer memory unit has a queue memory using a small-capacity high-speed random accessible memory disposed at a front stage, and a large-capacity low-speed access memory disposed in parallel at a rear stage,
- a writing operation to said rear-stage memory is effected in parallel from said front-stage memory, and
- a reading operation from said rear-stage memory is effected by selecting only a queue memory with no conflict.

23. A packet switch according to claim 22, wherein said common switch unit is based on a bit-slice architecture and has slice switches of which at least one slice switch is used as a redundant switch, and
- switching to said redundant slice switch can be thereby done every time said slice switch receives maintenance and comes to a fault.

24. A packet switch according to claim 22, wherein said packet buffer memory unit is set dual on the input side and the output side of said common switch unit,
- packet data are distributed to said packet buffer memory unit disposed on the output side along a route preset in said common switch unit, and
- the switching can be thereby done when in maintenance and in fault.

25. A packet switch according to claim 22, wherein schedulers each including said control modules of the first and second pointers, said request management control module and said scheduling processing module, are disposed in dispersion,
- a switch unit for selecting scheduling data between adjacent input buffer units among said input buffer units including said input buffer memory units, is further provided and
- the switching can be thereby done when in maintenance and in fault.

26. A packet switch comprising:
- an input buffer memory unit having a logic queue corresponding to an output line;
- a control module for a first pointer indicating a scheduling start input line;
- a control module for a second pointer indicating a scheduling start output line of scheduling target outlines;
- a request management control module for retaining transmission request data about a desired output line;
- a scheduling processing module for starting a retrieval from within plural pieces of transmission request data from the output line indicated by the second pointer, and selecting an output line that is not ensured by other input lines;
- a packet buffer memory unit for temporarily storing a plurality of fixed-length packets and sequentially outputting the fixed-length packets;
- a common switch unit for switching the fixed-length packets outputted from said packet buffer memory unit; and
- an address management unit for performing an address management of said packet buffer memory unit,
- wherein said packet buffer memory unit has a queue memory using a small-capacity high-speed random accessible memory disposed at a front stage, and a queue memory using a large-capacity memory that is high-speed accessible only when in a burst access and disposed at a rear stage,
- a writing operation to said rear-stage memory is effected batchwise just when a plurality of packets are accumulated in said front-stage memory, and
- the plurality of packets are read batchwise from said rear-stage memory.

27. A packet switch according to claim 26, wherein said common switch unit is based on a bit-slice architecture and has slice switches of which at least one slice switch is used as a redundant switch, and
- switching to said redundant slice switch can be thereby done every time said slice switch receives maintenance and comes to a fault.

28. A packet switch according to claim 26, wherein said packet buffer memory unit is set dual on the input side and the output side of said common switch unit,
- packet data are distributed to said packet buffer memory unit disposed on the output side along a route preset in said common switch unit, and
- the switching can be thereby done when in maintenance and in fault.

29. A packet switch according to claim 26, wherein schedulers each including said control modules of the first and second pointers, said request management control module and said scheduling processing module, are disposed in dispersion,
- a switch unit for selecting scheduling data between adjacent input buffer units among said input buffer units including said input buffer memory units, is further provided and
- the switching can be thereby done when in maintenance and in fault.

30. A packet switch comprising:

an input buffer memory unit having a logic queue corresponding to an output line;

a control module for a first pointer indicating a scheduling start input line;

a control module for a second pointer indicating a scheduling start output line of scheduling target outlines;

a request management control module for retaining transmission request data about a desired output line;

a scheduling processing module for starting a retrieval from within plural pieces of transmission request data from the output line indicated by the second pointer, and selecting an output line that is not ensured by other input lines;

a packet buffer memory unit for temporarily storing a plurality of fixed-length packets and sequentially outputting the fixed-length packets;

a common switch unit for switching the fixed-length packets outputted from said packet buffer memory unit; and an address management unit for performing an address management of said packet buffer memory unit, wherein said packet buffer memory executes time-division-multiplexing of the fixed-length packets of the plurality of input lines onto one signal input line in an established manner, and includes memories disposed in parallel corresponding to every input line before being multiplexed, and the writing and reading to and from said respective memories are executed in parallel.

31. A packet switch according to claim 30, wherein said common switch unit is based on a bit-slice architecture and has slice switches of which at least one slice switch is used as a redundant switch, and switching to said redundant slice switch can be thereby done every time said slice switch receives maintenance and comes to a fault.

32. A packet switch according to claim 30, wherein said packet buffer memory unit is set dual on the input side and the output side of said common switch unit, packet data are distributed to said packet buffer memory unit disposed on the output side along a route preset in said common switch unit, and the switching can be thereby done when in maintenance and in fault.

33. A packet switch according to claim 30, wherein schedulers each including said control modules of the first and second pointers, said request management control module and said scheduling processing module, are disposed in dispersion, a switch unit for selecting scheduling data between adjacent input buffer units among said input buffer units including said input buffer memory units, is further provided and the switching can be thereby done when in maintenance and in fault.

* * * * *